United States Patent
Fukuda et al.

(10) Patent No.: US 11,814,815 B2
(45) Date of Patent: Nov. 14, 2023

(54) WORKING MACHINE

(71) Applicant: KUBOTA CORPORATION, Osaka (JP)

(72) Inventors: Yuji Fukuda, Osaka (JP); Kohei Nagao, Osaka (JP); Hiroaki Nakagawa, Osaka (JP); Ryota Hamamoto, Osaka (JP); Kazuki Ueda, Osaka (JP); Yudai Koga, Osaka (JP); Kohei Kurachi, Osaka (JP)

(73) Assignee: KUBOTA CORPORATION, Osaka (JP)

(*) Notice: Subject to any disclaimer, the term of this patent is extended or adjusted under 35 U.S.C. 154(b) by 112 days.

(21) Appl. No.: 17/394,645

(22) Filed: Aug. 5, 2021

(65) Prior Publication Data

US 2022/0049466 A1    Feb. 17, 2022

(30) Foreign Application Priority Data

Aug. 15, 2020  (JP) ................................ 2020-137180
Oct. 28, 2020  (JP) ................................ 2020-180868
Jul. 21, 2021  (JP) ................................ 2021-120850

(51) Int. Cl.
*E02F 9/22* (2006.01)
*F16H 61/4157* (2010.01)
*F16H 61/421* (2010.01)
*F16H 61/448* (2010.01)
(Continued)

(52) U.S. Cl.
CPC ............ *E02F 9/2246* (2013.01); *E02F 9/226* (2013.01); *E02F 9/2253* (2013.01); *E02F 9/2296* (2013.01); *F16H 61/0206* (2013.01); *F16H 61/4157* (2013.01); *F16H 61/421* (2013.01);
(Continued)

(58) Field of Classification Search
CPC .... E02F 9/2253; E02F 9/226; F16H 61/4157; F16H 61/4165; F16H 61/421
See application file for complete search history.

(56) References Cited

U.S. PATENT DOCUMENTS 10,316,493 B2 *  6/2019  Fukuda ................. E02F 9/2246
10,435,867 B2 * 10/2019  Fukuda ................. E02F 9/2253
10,920,881 B2 *  2/2021  Fukuda ................... E02F 9/226
(Continued)

FOREIGN PATENT DOCUMENTS

DE   102019201135 A1 *  7/2020  ......... F16H 61/4165
JP       2013-117254 A      6/2013
JP       2022-33074 A       2/2022

*Primary Examiner* — Michael Leslie
(74) *Attorney, Agent, or Firm* — Greenblum & Bernstein, P.L.C.

(57) ABSTRACT

A working machine includes a prime mover, a traveling motor a speed shifting valve configured to shift an output speed of the traveling motor between a first speed and a second speed faster than the first speed, an actuation valve to change a hydraulic pressure applied to the speed shifting valve, a brake shiftable between a braking state to brake the traveling motor and a braking releasing state to release the braking, and a controller configured or programmed to control the actuation valve and the brake, and being capable of activate a warm-up mode. The controller, when activating the warm-up mode, shifts the brake into the braking state, and controls the actuation valve so as to make the hydraulic pressure applied to the speed shifting valve equal to or greater than a value corresponding to the second speed.

17 Claims, 18 Drawing Sheets

(51) Int. Cl.
    *F16H 61/444*    (2010.01)
    *F16H 61/02*    (2006.01)
(52) U.S. Cl.
    CPC ......... *F16H 61/444* (2013.01); *F16H 61/448* (2013.01)

(56) References Cited

U.S. PATENT DOCUMENTS

| | | | |
|---|---|---|---|
| 11,001,990 B2 * | 5/2021 | Fukuda | ................. E02F 9/2292 |
| 2022/0049460 A1 | 2/2022 | Fukuda et al. | |

* cited by examiner

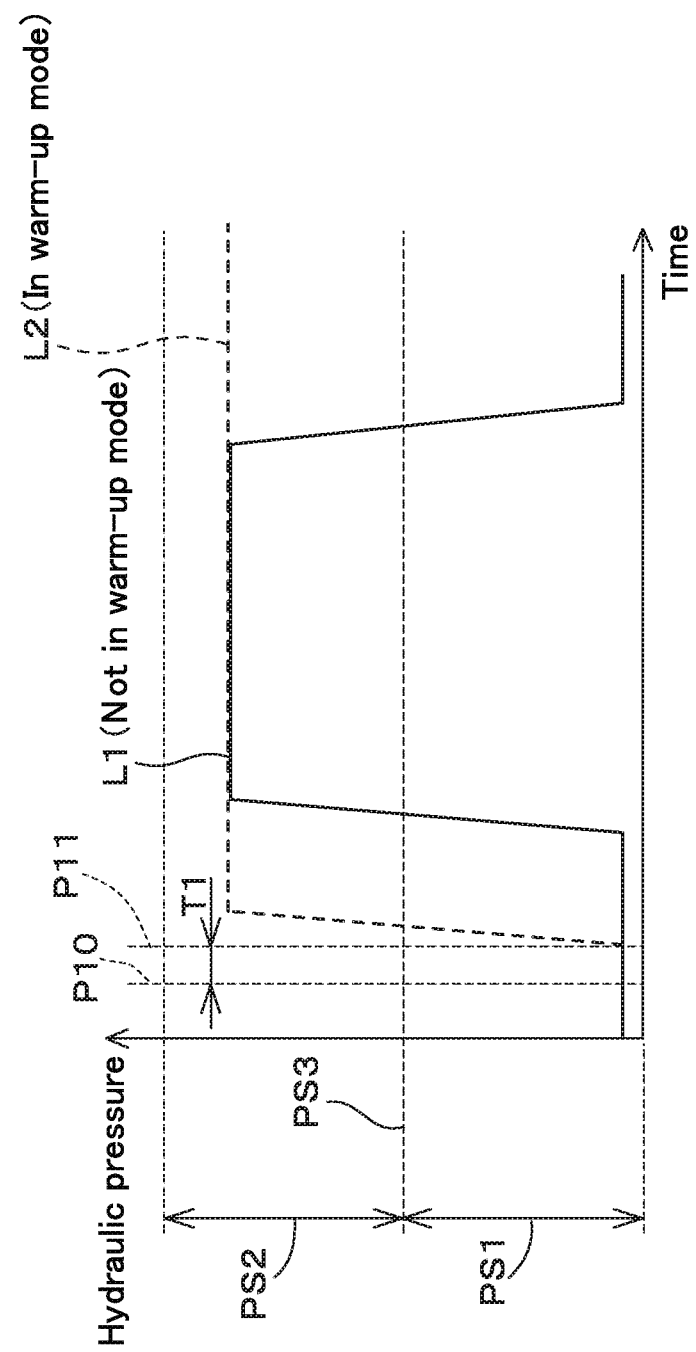

Fig.11

| Prime mover rotation speed (rpm) | First traveling relief pressure W1(rpm)/ Second traveling relief pressure W2(rpm)/ Third traveling relief pressure W3(rpm)/ Fourth traveling relief pressure W4(rpm) |
|---|---|
| 2400rpm | W1(2400rpm), W2(2400rpm), W3(2400rpm), W4(2400rpm) |
| 2300rpm | W1(2300rpm), W2(2300rpm), W3(2300rpm), W4(2300rpm) |
| 2200rpm | W1(2200rpm), W2(2200rpm), W3(2200rpm), W4(2200rpm) |
| ... | ... |
| 1000rpm | W1(1000rpm), W2(1000rpm), W3(1000rpm), W4(1000rpm) |
| 900rpm | W1(900rpm), W2(900rpm), W3(900rpm), W4(900rpm) |
| 800rpm | W1(800rpm), W2(800rpm), W3(800rpm), W4(800rpm) |
| 700rpm | W1(700rpm), W2(700rpm), W3(700rpm), W4(700rpm) |
| ... | ... |

WORKING MACHINE

BACKGROUND OF THE INVENTION

Field of the Invention

The present invention relates to a working machine such as a skid steer loader, a compact track loader, and a backhoe.

Description of the Related Art

Japanese Unexamined Patent Publication No. 2013-117254 discloses a technique for warming up a working machine. The working machine disclosed in Japanese Unexamined Patent Publication No. 2013-117254 includes a pilot-pressure control valve configured to control a pressure of pilot fluid that is delivered from a pump to be supplied a supply target, and a valve body in which the pilot-pressure control valve is incorporated. A heat-up fluid passage that penetrates the valve body is formed in the valve body. One end port of the heat-up fluid passage is fluidly connected to a delivery port of the pump. And, a heat-up valve is disposed downstream of the heat-up fluid passage, the heat-up valve allowing the pilot fluid flowing out of the heat-up fluid passage to be fed to the hydraulic fluid tank so as to heat up the valve body when the pilot fluid is at a low temperature, and the heat-up valve restricting a flow of the pilot fluid flowing out of the heat-up fluid passage to the hydraulic fluid tank so as to prevent the valve body from being heated up unnecessarily when the pilot fluid is warmed up to a predetermined temperature or higher.

A technique for realizing deceleration according to a traveling state of a working machine disclosed in Japanese Unexamined Patent Application No. 2020-137171 is known. The working machine disclosed in Japanese Unexamined Patent Application No. 2020-137171 includes a prime mover disposed on a machine body, a traveling device disposed on the machine body, a traveling motor configured to output a power to the traveling device and to be shifted either a first speed stage or a second speed stage, a traveling pump having a port for delivering hydraulic fluid when normally rotating the traveling motor and another port for delivering hydraulic fluid when reversely rotating the traveling motor, first and second circulation fluid passages fluidly connected to both ports of the traveling pump and to the traveling motor, first to fourth relief valves fluidly connected to fluid passages near the ports, that is, connected to the first and second circulation passages, and a controller configured to perform automatic deceleration to automatically decelerate the traveling motor from the second speed stage to the first speed stage when the running motor is at the second speed stage. The controller sets a deceleration threshold used to judge whether to perform the automatic deceleration based on a first traveling relief pressure of the first relief valve, a second traveling relief pressure of the second relief valve, a third traveling relief pressure of the third relief valve, and a fourth traveling relief pressure of the fourth relief valve.

SUMMARY OF THE INVENTION

In the working machine disclosed in Japanese Unexamined Patent Application No. 2013-117254, the heat-up fluid passage has to be formed in a body to warm up the working machine. Accordingly, the configuration may be complicated, which makes it hard to perform the warm-up easily.

The invention has been made to solve the above-described problems of the conventional technique, and the invention intends to provide a working machine capable of warming up the working machine smoothly.

In addition, the technique disclosed in Japanese Unexamined Patent Application No. 2020-137171 is based on the assumption that the traveling relief pressure (i.e., relief pressure of an HST pump) of each working machine is previously known. Accordingly, Japanese Unexamined Patent Application No. 2020-137171 fails to disclose a method for measuring the traveling relief pressure of each individual working machine.

As a method of measuring the traveling relief pressure for each individual machine, it can be considered to measure a relief pressure of the HST pump before the shipping of the HST pump alone. However, considering effects of engine load and other factors, there is a high possibility that a relief pressure of the HST pump, which is measured under a condition where the HST pump is installed to the working machine, will be different from a relief pressure measured with the HST pump alone. In addition, since a traveling pressure sensor to be used in the automatic deceleration control also has an error, it is necessary to measure the relief pressure including this error in practice.

On the other hand, in a case where the traveling relief pressure is measured under the condition where the HST pump is installed to the working machine, it is known that a dynamometer or a parking brake is used as a means to apply a load to the traveling system. However, since the dynamometer is a large-scale equipment, it is only possible to apply a load to the traveling system of the working machine only at a place where the dynamometer is installed. That is, it is impossible to measure the travel relief pressure unless the working machine is moved to the place where the dynamometer is installed.

In addition, the parking brake is a device that intends to brake the working machine so that the working machine does not move from a stopping state; however, a braking force provided by the parking brake is small only to resist the weight of the working machine. That is, when a load near the relief pressure is applied to the HST pump, a driving force of the traveling system may exceed the braking force of the parking brake, and accordingly the working machine may start moving.

Specifically, when the HST pump or a traveling pressure sensor used in the automatic deceleration control is replaced in a working machine that is once distributed in a market, a relief pressure defined by the replaced parts has to be measured, and the errors in each of the parts have to be corrected in order to correctly perform a control based on the relief pressure.

To solve the above-described problems of the conventional technique, the invention intends to provide a working machine capable of measuring a relief pressure of each individual working machine without introducing any special equipment.

Technical means of the invention for solving this technical problem are as follows.

A working machine includes a prime mover, a traveling device, a traveling motor configured to output power to the traveling device, a speed shifting valve configured to shift an output speed of the traveling motor between a first speed and a second speed faster than the first speed, an actuation valve configured to change a hydraulic pressure applied to the speed shifting valve, a first fluid passage fluidly connected to the speed shifting valve so that hydraulic fluid having the hydraulic pressure to be applied to the speed shifting valve flows through the first fluid passage, a drain fluid passage fluidly connected to the first fluid passage, a brake shiftable between a braking state to brake the traveling motor and a braking releasing state to release the braking, and a controller configured or programmed to control the actuation valve and the brake, and being capable of activate a warm-up mode. The controller, when activating the warm-up mode, is configured or programmed to shift the brake into the braking state, and control the actuation valve so as to make the hydraulic pressure to be applied to the speed shifting valve equal to or greater than a value corresponding to the second speed.

When the prime mover is started and a rotation speed of the prime mover becomes a predetermined value or more, the controller is configured to programmed to make, while keeping the brake in the braking state, the hydraulic pressure equal to or greater than the value corresponding to the second speed.

When the warm-up mode is activated while the output speed of the traveling motor is set to the second speed, the controller is configured or programmed to control the actuation valve so as to reduce the hydraulic pressure from the value corresponding to the second speed to a value corresponding to the first speed, to shift the brake from the braking release state to the braking state, and to control the actuation valve so as to increase the hydraulic pressure to the value corresponding to the second speed after the hydraulic pressure is reduced from the value corresponding to the second speed to the value corresponding to the first speed and the brake is shifted from the braking release state to the braking state.

The controller is configured or programmed to increase the hydraulic pressure to the value corresponding to the second speed after a predetermined period elapses since the hydraulic pressure is reduced from the value corresponding to the second speed to the value corresponding to the first speed.

When the warm-up mode is activated while the output speed of the traveling motor is set to the first speed, the controller is configured or programmed to shift the brake from the braking release state to the braking state, and to control the actuation valve so as to increase the hydraulic pressure from the value corresponding to the first speed to the value corresponding to the second speed after a predetermined period elapses since the brake is shifted from the braking release state to the braking state.

The working machine includes a measurement device configured to detect a temperature of the hydraulic fluid. The controller is configured or programmed to activate the warm-up mode when the temperature of hydraulic fluid measured by the measurement device becomes a predetermined value or less.

A working machine includes a prime mover, a traveling device, a traveling motor configured to output power to the traveling device, a traveling pump configured to supply hydraulic fluid when a hydraulic pressure is applied to the traveling pump, a circulation fluid passage fluidly connecting the traveling pump to the traveling motor, a traveling switching valve shiftable between a first state corresponding to a first speed of the hydraulic motor and a second state corresponding to a second speed of the hydraulic motor faster than the first speed, a brake shiftable between a braking state to brake the traveling motor and a braking releasing state to release the braking, an actuation valve configured to output the hydraulic pressure applied to the traveling pump, and change the hydraulic pressure output therefrom, and a controller configured or programmed to control the traveling switching valve, the brake and the actuation valve, and being capable of activate a first mode. The controller, when activating the first mode, is configured or programmed to shift the brake into the braking state, shift the traveling switching valve into the second state, and control the actuation valve so as to set the hydraulic pressure output from the actuation valve to a predetermined pressure.

When the prime mover is started, the controller is configured or programmed to keep the brake in the braking state, and shift the traveling switching valve into the second state.

When the first mode is activated while the brake is in the braking release state and the traveling switching valve is in the first state, the controller is configured or programmed to shift the brake from the braking release state to the braking state, and shift the traveling switching valve from the first state to the second state, and to control the actuation valve so as to make the hydraulic pressure output from the actuation valve equal to the predetermined pressure after the brake is shifted from the braking release state to the braking state and the traveling switching valve is shifted from the first state to the second state.

The controller, when canceling the first mode, is configured or programmed to control the actuation valve so as to reduce the hydraulic pressure output from the actuation valve to a value less than the predetermined pressure, and shift the traveling switching valve from the second state to the first state, and to shift the brake from the braking state to the braking release state after the hydraulic pressure is reduced to the value less than the predetermined pressure and the traveling switching valve is shifted from the second state to the first state.

When the first mode is activated, the controller is configured or programmed to set the predetermined pressure to a value equal to or greater than the hydraulic pressure for activating the traveling pump.

The working machine includes a measurement device configured to detect a temperature of the hydraulic fluid. The controller is configured or programmed to activate a warm-up mode as the first mode when the temperature of the hydraulic fluid measured by the measurement device becomes a predetermined value or less.

The controller is configured or programmed to set the predetermined pressure to a value that increases according to reduction of a temperature of the hydraulic fluid.

In another aspect, a working machine includes a machine body, a prime mover disposed on the machine body, a left traveling device disposed on a left portion of the machine body, a right traveling device disposed on a right portion of the machine body, a left traveling motor configured to output a power to the left traveling device and is shiftable between a first speed stage and a second speed stage higher than the first speed stage, a right traveling motor configured to output a power to the right traveling device and is shiftable between a first speed stage and a second speed stage higher than the first speed stage, a left traveling pump including a first port from which hydraulic fluid is delivered when the left traveling motor rotates normally and a second port from which hydraulic fluid is delivered when the left traveling motor rotates reversely, a right traveling pump including a third port from which hydraulic fluid is delivered when the right traveling motor rotates normally and a fourth port from which hydraulic fluid is delivered when the left traveling motor rotates reversely, a first circulation fluid passage fluidly connected to the first and second ports of the left traveling pump and fluidly connected to the left traveling motor, a second circulation fluid passage fluidly connected to the third and fourth ports of the right traveling pump and fluidly connected to the right traveling motor, a brake configured to brake the left and right traveling motors, a pressure measurement device configured to measure pressures of hydraulic fluid in the first and second circulation fluid passages, and a controller configured to acquire pressures of hydraulic fluid in in the first and second circulation fluid passages when the brake performs the braking and the left and right traveling motors are in the second speed stages, the pressures being measured by the pressure measurement device.

The above-described working machine includes a traveling switching valve shiftable between a first position and a second position, configured to shift the left and right traveling motors in the first position to the first speed stage and shift the left and right traveling motors in the second position to the second speed stage, and a controller configured to control the traveling switching valve and the brake. The controller shifts the traveling switching valve to the second position when activating an acquisition mode to acquire a pressure of the hydraulic fluid, and allows the brake to perform the braking.

The controller is configured to shift the traveling switching valve to the first position or the second position when not activating the acquisition mode to acquire a pressure of the hydraulic fluid, and allows the brake to perform the braking or releasing the braking.

The above-described working machine includes a traveling operation device configured to apply hydraulic fluid to either one of the left traveling pump and the right traveling pump when a traveling operation member is operated, a traveling fluid passage in which the hydraulic fluid flows, fluidly connecting the traveling operation device to the left and right traveling pumps, and an actuation valve configured to control hydraulic fluid supplied to the traveling fluid passage. The controller allows the brake to perform the braking, and controls the actuation valve t supply hydraulic fluid to the traveling fluid passage.

When not activating the acquisition mode, the controller performs the shifting from the second speed stage to the first speed stage based on a pressure of hydraulic fluid in either one of the first circulation fluid passage and the second circulation fluid passage.

In another aspect, a working machine includes a machine body, a left traveling device disposed on a left portion of the machine body, a right traveling device disposed on a right portion of the machine body, a left traveling motor configured to output a power to the left traveling device and is shiftable between a first speed stage and a second speed stage higher than the first speed stage, a right traveling motor configured to output a power to the right traveling device and is shiftable between a first speed stage and a second speed stage higher than the first speed stage, a left traveling pump including a first swashplate and including a first port from which hydraulic fluid is delivered when the first swashplate rotate normally and a second port from which hydraulic fluid is delivered when the first swash plate rotate reversely, a right traveling pump including a second swashplate and including a third port from which hydraulic fluid is delivered when the second swashplate rotate normally and a fourth port from which hydraulic fluid is delivered when the second swash plate rotate reversely, a brake configured to brake the left and right traveling motors, a traveling fluid passage in which the hydraulic fluid flows, fluidly connected to the first swashplate of the left traveling pump and to the second swashplate of the right traveling pump, an actuation valve configured to control hydraulic fluid supplied to the traveling fluid passage, and a controller configured to shift at least one of the left and right traveling motor to the second speed stage before the actuation valve is actuated in actuating the actuation valve to supply hydraulic fluid to the traveling fluid passage in a state where the brake performs the braking.

In another aspect, a working machine includes a machine body, a left traveling device disposed on a left portion of the machine body, a right traveling device disposed on a right portion of the machine body, a left traveling motor configured to output a power to the left traveling device and is shiftable between a first speed stage and a second speed stage higher than the first speed stage, a right traveling motor configured to output a power to the right traveling device and is shiftable between a first speed stage and a second speed stage higher than the first speed stage, a left traveling pump including a first swashplate and including a first port from which hydraulic fluid is delivered when the first swashplate rotate normally and a second port from which hydraulic fluid is delivered when the first swash plate rotate reversely, a right traveling pump including a second swashplate and including a third port from which hydraulic fluid is delivered when the second swashplate rotate normally and a fourth port from which hydraulic fluid is delivered when the second swash plate rotate reversely, a brake configured to brake the left and right traveling motors, a traveling fluid passage in which the hydraulic fluid flows, fluidly connected to the first swashplate of the left traveling pump and to the second swashplate of the right traveling pump, an actuation valve configured to control hydraulic fluid supplied to the traveling fluid passage, and a controller configured to prohibit actuation of the actuation vale when the left and right traveling motors are in the first speed stage in a state where the brake performs the braking.

The controller performs the braking with the brake, and actuates the actuation valve to increase or reduce hydraulic fluid supplied to the traveling fluid passage in a state where at least one of the left and right traveling motors is shifted to the second speed stage.

The above-described working machine includes a prime mover. The controller performs the braking with the brake, and increases or reduces a rotation speed of the prime mover in a state where at least one of the left and right traveling motors is shifted to the second speed stage and hydraulic fluid is supplied by the actuation valve to the traveling fluid passage.

The controller shifts at least one of the left and right traveling motors to the second speed stage when an acquisition mode is being activated to acquire a pressure of hydraulic fluid supplied to the traveling fluid passage, and performs the braking with the brake The above-described working machine includes a first circulation fluid passage fluidly connected to the first and second ports of the left traveling pump and fluidly connected to the left traveling motor, a second circulation fluid passage fluidly connected to the third and fourth ports of the right traveling pump and fluidly connected to the right traveling motor, and a pressure measurement device configured to measure pressures of hydraulic fluid in the first and second circulation fluid passages. The controller configured to acquire a pressure of hydraulic fluid measured by the pressure measurement device.

The above-described working machine includes a prime mover rotation speed detection device configured to acquire the actual rotation speed of the prime mover.

When the acquisition mode is released, the controller shifts the left traveling motor and/or the right traveling motor is the second speed stage, and release the braking with the brake.

The controller includes an automatic deceleration unit to execute an automatic deceleration control for automatically shifting the left traveling motor and/or the right traveling motor in the second speed from the second speed stage to the first speed stage when a predetermined condition is satisfied in a state where at least one of the left and right traveling motors is in the second speed stage. The controller does not execute the automatic deceleration control when the acquisition mode is activated.

The actuation valve is constituted of a plurality of actuation valve. When the acquisition mode is activated, after acquiring a pressure of hydraulic fluid supplied to the traveling fluid passage through an operation of at least one of the plurality of actuation vales, the controller acquires a pressure of hydraulic fluid supplied to the traveling fluid passage through an operation of at least one of the remaining actuation valves.

Accordingly, the working machine can be warmed up smoothly.

Accordingly, a relief pressure of each individual working machine can be measured in the working machine without introducing special equipment.

BRIEF DESCRIPTION OF THE DRAWINGS

FIG. 2A is a view showing a pilot pressure generated when a traveling motor is shifted to a first speed stage or a second speed stage and a pilot pressure generated when a warm-up mode is started when the traveling motor is at the first speed stage according to the first embodiment.

FIG. 11 is a view showing an example of a first traveling relief pressure, second traveling relief pressure, third traveling relief pressure, and fourth traveling relief pressure corresponding to a prime mover rotation speed according to the third embodiment.

DETAILED DESCRIPTION OF THE PREFERRED EMBODIMENTS

Preferred embodiments will be described with reference to drawings.

First Embodiment

Figure 16:
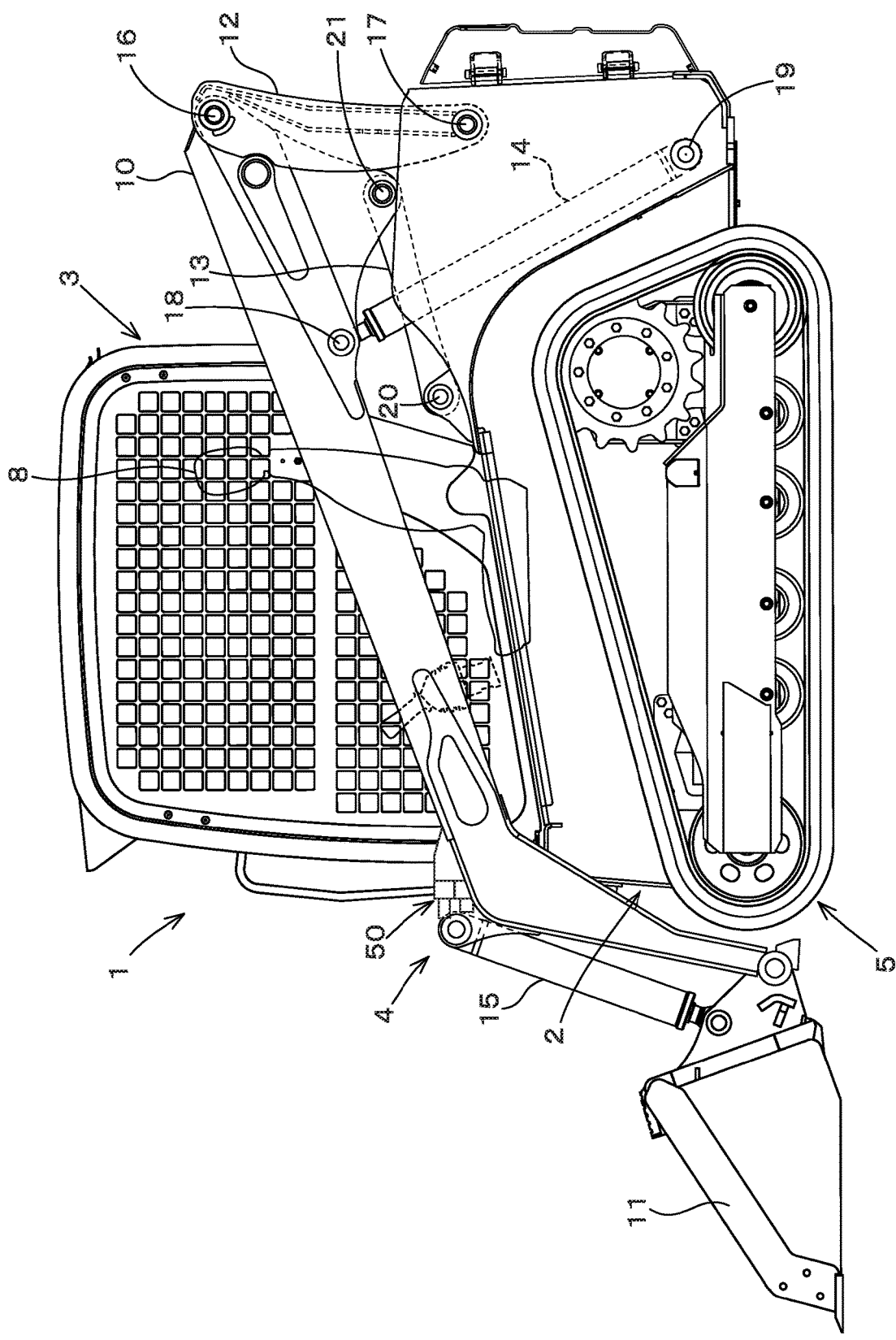
FIG. 16 is a side view showing an example of the working machine according to a first to fifth embodiments.

FIG. 16 shows a side view of a working machine according to a first embodiment. FIG. 16 shows a compact track loader as an example of the working machine. However, the working machine according to the embodiment is not limited to the compact track loader, but may be other types of loader working machines, such as a skid steer loader, for example. In addition, the working machine may be a working machine other than the loader working machine.

As shown in FIG. 16, the working machine 1 has a machine body 2, a cabin 3, a working device 4, and a pair of traveling devices 5L and 5R. In the embodiment, a forward direction from a driver siting on an operator's seat 8 of the working machine 1 (a left side in FIG. 16) is referred to as the front, a rearward direction from the driver (a right side in FIG. 16) is referred to as the rear, a leftward direction from the driver (a front surface side of FIG. 16) is referred to as the left, and a rightward direction from the driver (a back surface side of FIG. 16) is referred to as the right. In addition, a horizontal direction orthogonal to a fore-and-aft direction is referred to as a machine width direction. A direction from the center of the machine body 2 to the right or left is referred to as a machine outward direction. In other words, the machine outward direction is one machine width direction separating away from the machine body 2. A direction opposite to the machine outward direction is referred to as a machine inward direction. In other words, the machine inward direction is the other machine width direction approaching the machine body 2.

The cabin 3 is mounted on the machine body 2. The cabin 3 incorporates the operator's seat 8. The working device 4 is attached to the machine body 2. A pair of traveling devices 5L and 5R are disposed on outer sides of the machine body 2. A prime mover 32 is mounted on a rear inside portion of the machine body 2.

The working device 4 includes booms 10, a working tool 11, lift links 12, control links 13, boom cylinders 14, and bucket cylinders 15.

The booms 10 are arranged on right and left sides of the cabin 3 swingably up and down. The working tool 11 is a bucket, for example. The bucket 11 is arranged at tip portions (front end portions) of the booms 10 movably up and down. The lift links 12 and the control links 13 support base portions (rear portions) of the booms 10 so that the booms 10 can be swung up and down. The boom cylinders 14 are extended and contracted to lift and lower the booms 10. The bucket cylinders 15 are extended and contracted to swing the bucket 11 up and down.

Front portions of the right and left booms 10 are connected to each other by a deformed connecting pipe. Base portions (rear potions) of the booms 10 are connected to each other by a circular connecting pipe.

The lift links 12, control links 13, and boom cylinders 14 are arranged on right and left sides of the machine body 2 to correspond to the right and left booms 10.

The lift links 12 are extended vertically from rear portions of the base potions of the booms 10. Upper portions (one ends) of the lift links 12 are pivotally supported on the rear portion of the base portions of the booms 10 via respective pivot shafts 16 (referred to as first pivot shafts) rotatably around lateral axes thereof. In addition, lower portions (the other ends) of the lift links 12 are pivotally supported on a rearward portion of the machine body 2 via respective pivot shafts 17 (second pivot shafts) rotatably around lateral axes thereof. The second pivot shafts 17 are disposed below the first pivot shafts 16.

Upper portions of the boom cylinders 14 are pivotally supported via respective pivot shafts 18 (third pivot shafts) rotatably around lateral axes thereof. The third pivot shafts 18 are disposed at the base portions of the booms 10, especially, at front portions of the base portions. Lower portions of the boom cylinders 14 are pivotally supported respective pivot shafts 19 (fourth pivot shafts) rotatably around lateral axes thereof. The fourth pivot shafts 19 are disposed closer to a lower portion of the rear portion of the machine body 2 and below the third pivot shafts 18.

The control links 13 are disposed in front of the lift links 12. One ends of the control links 13 are pivotally supported via respective pivot shafts 20 (fifth pivot shafts) rotatably around lateral axes thereof. The fifth pivot shafts 20 are disposed on the machine body 2 forward of the lift links 12. The other ends of the control links 13 are pivotally supported via respective pivot shafts 21 (sixth pivot shafts) rotatably around lateral axes thereof. The sixth pivot shafts 21 are disposed on the booms 10 forwardly upward from the second pivot shafts 17.

By extending and contracting the boom cylinders 14, the booms 10 are swung up and down around the first pivot shafts 16 with the base portions of the booms 10 supported by the lift links 12 and the control links 13, thereby lifting and lowering the tip end portions of the booms 10. The control links 13 are swung up and down around the fifth pivot shafts 20 by the vertical swinging of the booms 10. The lift links 12 are swung back and forth around the second pivot shafts 17 by the vertical swinging of the control links 13.

An alternative working tool instead of the bucket 11 can be attached to the front portions of the booms 10. For example, the alternative working tool is an attachment (auxiliary attachment) such as a hydraulic crusher, a hydraulic breaker, an angle broom, an earth auger, a pallet fork, a sweeper, a mower, a snow blower, or the like.

A connecting member 50 is disposed at the front portion of the left boom 10. The connecting member 50 is a device configured to connect a hydraulic equipment attached to the auxiliary attachment to a first piping member such as a pipe disposed on the left boom 10. Specifically, the first piping member can be connected to one end of the connecting member 50, and a second piping member connected to the hydraulic equipment of the auxiliary attachment can be connected to the other end. In this manner, hydraulic fluid flowing in the first piping member flows through the second piping member and is supplied to the hydraulic equipment.

The bucket cylinders 15 are arranged respectively closer to the front portions of the booms 10. The bucket cylinders 15 are extended and contracted to swing the bucket 11.

Of the pair of traveling devices 5L and 5R, the traveling device 5L is disposed on a left side of the machine body 2, and the traveling device 5R is disposed on a right side of the machine body 2. In the embodiment, crawler typed (including semi-crawler typed) traveling devices are adopted as the pair of traveling devices 5L and 5R. Note that wheel-type traveling device having front wheels and rear wheels may also be adopted. For convenience of explanation, the traveling device 5L may be referred to as the left traveling device 5L, and the traveling device 5R may be referred to as the right traveling device 5R.

The prime mover 32 is an internal combustion engine such as a diesel engine, a gasoline engine, an electric motor, or the like. In the embodiment, the prime mover 32 is the diesel engine, but is not limited thereto.

Figure 1:
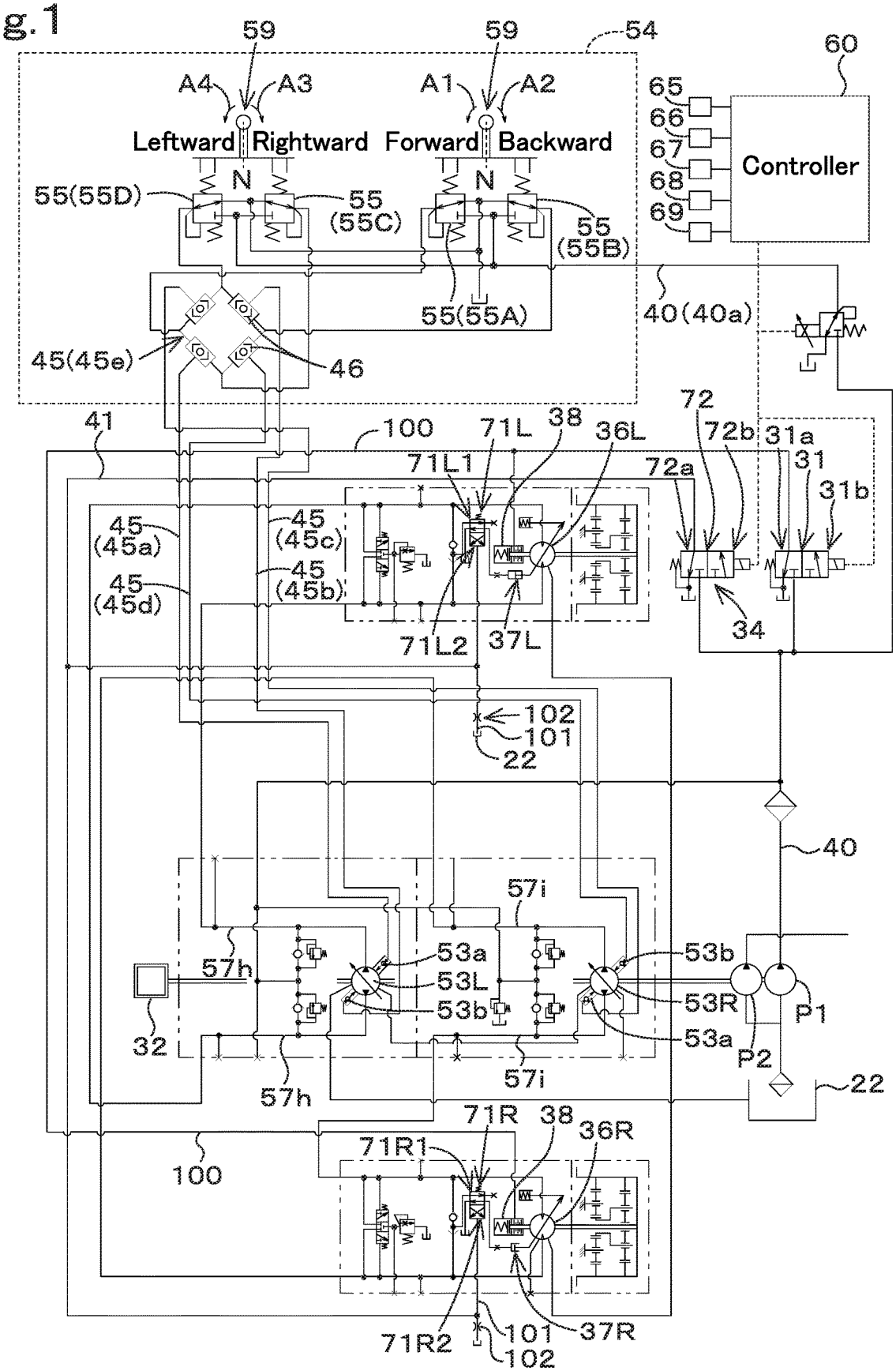
FIG. 1 is a view showing a hydraulic system (hydraulic circuit) for a working machine according to a first embodiment of the invention.

Referring to FIG. 1, the hydraulic system for the working machine according to the embodiment will be described.

As shown in FIG. 1, the hydraulic system for the working machine includes a first hydraulic pump P1 and a second hydraulic pump P2. The first hydraulic pump P1 is a pump configured to be driven by power of the prime mover 32 and includes a constant displacement gear pump. The first hydraulic pump P1 is capable of delivering hydraulic fluid stored in a tank 22. Specifically, the first hydraulic pump P1 delivers hydraulic fluid that is mainly used for control. For convenience of explanation, the tank 22 that stores hydraulic fluid may be referred to as a hydraulic fluid tank. In addition, of the hydraulic fluid delivered from the first hydraulic pump P1, the hydraulic fluid used for control is referred to as pilot fluid, and a pressure of the pilot fluid is referred to as a pilot pressure.

The second hydraulic pump P2 is a pump to be driven by power of the prime mover 32, and includes a constant displacement gear pump. The second hydraulic pump P2 is capable of delivering hydraulic fluid stored in the tank 22 and, for example, supplies the hydraulic fluid to fluid passages of a working system. For example, the second hydraulic pump P2 supplies hydraulic fluid to control valves (flow-rate control valves) that control the boom cylinders 14 for operating the booms 10, the bucket cylinders 15 for operating the bucket, and an auxiliary hydraulic actuator for operating the auxiliary hydraulic actuator.

In addition, the hydraulic system for the working machine includes a pair of traveling motors 36L and 36R and a pair of traveling pumps 53L and 53R. The pair of traveling motors 36L and 36R output power transmitted to the pair of traveling devices 5L and 5R. Of the pair of traveling motors 36L and 36R, the traveling motor 36L transmits rotational power to the traveling device (left traveling device) 5L, and the traveling motor 36R transmits rotational power to the traveling device (right traveling device) 5R.

The pair of traveling pumps 53L and 53R are pumps to be driven by power of the prime mover 32 and are variable displacement axial pumps with respective swashplates, for example. The pair of traveling pumps 53L and 53R are driven to supply hydraulic fluid respectively to the pair of traveling motors 36L and 36R. Of the pair of traveling pumps 53L and 53R, the traveling pump 53L supplies the hydraulic fluid to the traveling pump 53L, and the traveling pump 53R supplies the hydraulic fluid to the traveling pump 53R.

For convenience of explanation, the traveling pump 53L may be referred to as a left traveling pump 53L, the traveling pump 53R may be referred to as a right traveling pump 53R, the traveling motor 36L may be referred to as a left traveling motor 36L, and the traveling motor 36R may be referred to as a right traveling motor 36R.

Each of the left traveling pump 53L and the right traveling pump 53R has a pressure-receiving portion 53a and a pressure-receiving portion 53b to which a pressure (pilot pressure) of the hydraulic fluid (pilot fluid) from the first hydraulic pump P1 is applied, and angles of the swashplates are changed by the pilot pressures applied to the pressure-receiving portions 53a and 53b. By changing an angle of each of the swashplates, an output (delivery amount of hydraulic fluid) and a hydraulic fluid delivery direction of each of the left and right traveling pumps 53L and 53R can be changed.

The left traveling pump 53L and the left traveling motor 36L are connected to each other by a connecting fluid passage (first circulation fluid passage) 57h, and hydraulic fluid delivered from the left traveling motor 36L is supplied to the left traveling motor 36L. The right traveling pump 53R and the right traveling motor 36R are connected to each other by a connecting fluid passage (second circulation fluid passage) 57i, and hydraulic fluid delivered from the right traveling motor 36R is supplied to the right traveling motor 36R.

The left traveling motor 36L can be rotated by hydraulic fluid delivered from the left traveling pump 53L, and at a rotation speed (number of rotations) variable according to a flow rate of the hydraulic fluid. A swashplate change-over cylinder 37L is connected to the left traveling motor 36L, so that a rotation speed (number of rotations) of the left traveling motor 36L can also be changed by extending or contracting the swashplate change-over cylinder 37L in either one of opposite directions. That is, when the swashplate change-over cylinder 37L is contracted, a rotation speed of the left traveling motor 36L is set at a low speed (first speed), and when the swashplate change-over cylinder 37L is extended, a rotation speed of the left traveling motor 36L is set at a high speed (second speed). That is, the rotation speed of the left traveling motor 36L is shiftable between the first speed that is the low speed stage and the second speed that is the high speed stage.

The right traveling motor 36R can be rotated by hydraulic fluid delivered from the right traveling pump 53R, and at a rotation speed (number of rotations) variable according to a flow rate of the hydraulic fluid. A swashplate change-over cylinder 37R is connected to the right traveling motor 36R, so that a rotation speed (number of rotations) of the right traveling motor 36R can also be changed by extending or contracting the swashplate change-over cylinder 37R in either one of opposite directions. That is, when the swashplate change-over cylinder 37R is contracted, a rotation speed of the right traveling motor 36R is set at a low speed (first speed), and when the swashplate change-over cylinder 37R is extended, a rotation speed of the right traveling motor 36R is set at a high speed (second speed). That is, the rotation speed of the right traveling motor 36L is shiftable between the first speed that is the low speed stage and the second speed that is the high speed stage.

As shown in FIG. 1, the hydraulic system for the working device includes a traveling switching valve 34. The traveling switching valve 34 is shiftable between a first state where rotation speeds (numbers of rotations) of the traveling motors (left traveling motor 36L and the right traveling motor 36R) are each set at the first speed stage and a second state where rotation speeds of the traveling motors are each set at the second speed stage. The traveling switching valve 34 includes first speed shifting valves 71L and 71R and a second speed shifting valve 72.

The first speed shifting valve 71L is connected via a fluid passage to the swashplate change-over cylinder 37L of the left traveling motor 36L, and is configured as a two-position change-over valve shiftable between a first position 71L1 and a second position 71L2. The first speed shifting valve 71L, when set at the first position 71L1, contracts the swashplate change-over cylinder 37L, and when set at the second position 71L2, extends the swashplate change-over cylinder 37L.

The first speed shifting valve 71R is connected via a fluid passage to the swashplate change-over cylinder 37R of the right traveling motor 36R, and is configured as a two-position change-over valve shiftable between a first position 71R1 and a second position 71R2. The first speed shifting valve 71R, when set at the first position 71L1, contracts the swashplate change-over cylinder 37R, and when set at the second position 71R2, extends the swashplate change-over cylinder 37R.

The second speed shifting valve 72 is a solenoid valve that shifts the first speed shifting valve 71L and the first speed shifting valve 71R, and is configured as a two-position change-over valve shiftable based on magnetization between a first position 72a and a second position 72b. The second speed shifting valve 72, the first speed shifting valve 71L and the first speed shifting valve 71R are connected by a fluid passage 41. The second speed shifting valve 72, when set at the first position 72a, shifts the first speed shifting valve 71L and the first speed shifting valve 71R to the first positions 71L1 and 71R1, and when set at the second position 72b, shifts the first speed shifting valve 71L and the first speed shifting valve 71R to the second positions 71L2 and 71R2.

That is, the traveling switching valve 34 is set in the first state to shift each of rotation speeds of the traveling motors (traveling motor 36L and traveling motor 36R) to the first speed when the second speed shifting valve 72 is set at the first position 72a, the first speed shifting valve 71L is set at the first position 71L1, and the first speed shifting valve 71R is set at the first position 71R1. The traveling switching valve 34 is set in the second state to shift each of rotation speeds of the traveling motors (traveling motor 36L and traveling motor 36R) to the second speed when the second speed shifting valve 72 is set at the second position 72b, the first speed shifting valve 71L is set at the second position 71L2, and the first speed shifting valve 71R is set at the second position 71R2.

Accordingly, due to the traveling switching valve 34, the traveling motors (traveling motor 36L and traveling motor 36R) are set at a speed stage shiftable between the first speed that is the low speed stage and the second speed that is the high speed stage.

An operation device (traveling operation device) 54 is configured to apply hydraulic fluid to the pressure-receiving portions 53a and 53b of the traveling pumps (left traveling pump 53L and right traveling pump 53R) when a traveling operation member 59 is operated, and is capable of changing the angles of swashplates (swashplate angles) of the traveling pumps 53L and 53R. The operation device 54 includes the traveling operation member 59 and a plurality of operation valves 55.

The traveling operation member 59 is an operation lever that is supported on the operation valves 55 and swings in a lateral direction (machine width direction) or the fore-and-aft direction. That is, the traveling operation member 59 is operable to the right and to the left from a neutral position N, and to the front and to the rear from the neutral position N. In other words, the traveling operation member 59 is swingable in at least four directions from the neutral position N. For convenience of explanation, the forward and backward directions, that is, opposite fore-and-aft directions, may be referred to as first directions. In addition, the rightward and leftward directions, that is, opposite lateral directions (opposite machine width directions), are may be referred to as second directions.

In addition, the plurality of operation valves 55 are operated by the common, i.e., single, traveling operation member 59. The plurality of operation valves 55 are actuated according to swinging of the traveling operation member 59. A delivery fluid passage 40 is connected to the plurality of operation valves 55, so that hydraulic fluid (pilot fluid) from the first hydraulic pump P1 can be supplied to the operation valves 55 through the delivery fluid passage 40. The plurality of operation valves 55 include an operation valve 55A, operation valve 55B, operation valve 55C, and operation valve 55D.

When the traveling operation member 59 is swung forward (that is, in one of the opposite fore-and-aft directions (or in one of the opposite first directions)), i.e., when a forward operation is performed, the operation valve 55A outputs hydraulic fluid having a pressure variable according to an operation amount (operation) of the forward operation. When the traveling operation member 59 is swung backward (that is, in the other of the opposite fore-and-aft directions (or in the other of the opposite first directions)), i.e., when a backward operation is performed, the operation valve 55B outputs hydraulic fluid having a pressure variable according to an operation amount (operation) of the backward operation. When the traveling operation member 59 is swung rightward (that is, in one of the opposite lateral directions (or in one of the opposite second directions)), i.e., when a rightward operation is performed, the operation valve 55C outputs hydraulic fluid having a pressure variable according to an operation amount (operation) of the rightward operation. When the traveling operation member 59 is swung leftward (that is, in the other of the opposite lateral directions (or in the other of the opposite second directions)), i.e., when a leftward operation is performed, the operation valve 55D outputs hydraulic fluid having a pressure variable according to an operation amount (operation) of the leftward operation.

The plurality of operation valves 55 are connected to the traveling pumps (left traveling pump 53L and right traveling pump 53R) by the traveling fluid passage 45. In other words, the traveling pumps (left traveling pump 53L and right traveling pump 53R) are hydraulic equipment that are configured to be operated by hydraulic fluid output from the operation valves 55 (operation valve 55A, operation valve 55B, operation valve 55C, and operation valve 55D).

The traveling fluid passage 45 includes a first traveling fluid passage 45a, a second traveling fluid passage 45b, a third traveling fluid passage 45c, a fourth traveling fluid passage 45d, and a fifth traveling fluid passage 45e. The first traveling fluid passage 45a is a fluid passage connected to the pressure-receiving portion (first pressure-receiving portion) 53a of the left traveling pump 53L, and is a fluid passage through which hydraulic fluid to be applied to the pressure-receiving portion (first pressure-receiving portion) 53a flows when the traveling operation member 59 is operated. The second traveling fluid passage 45b is a fluid passage connected to the pressure-receiving portion (second pressure-receiving portion) 53b of the left traveling pump 53L, and is a fluid passage through which hydraulic fluid to be applied to the pressure-receiving portion (the second pressure-receiving portion) 53b flows when the traveling operation member 59 is operated. The third traveling fluid passage 45c is a fluid passage connected to the pressure-receiving portion (third pressure-receiving portion) 53a of the right traveling pump 53R, and is a fluid passage through which hydraulic fluid to be applied to the pressure-receiving portion (third pressure-receiving portion) 53a flows when the traveling operation member 59 is operated. The fourth traveling fluid passage 45d is a fluid passage connected to the pressure-receiving portion (fourth pressure-receiving portion) 53b of the right traveling pump 53R, and is a fluid passage through which hydraulic fluid to be applied to the pressure-receiving portion (fourth pressure-receiving portion) 53b flows when the traveling operation member 59 is operated. The fifth traveling fluid passage 45e is a fluid passage that connects the operation valves 55 to the first traveling fluid passage 45a, the second traveling fluid passage 45b, the third traveling fluid passage 45c, and the fourth traveling fluid passage 45d.

When the traveling operation member 59 is swung forward (in a direction indicated by an arrowed line A1 in FIG. 1), the operation valve 55A is operated to output a pilot pressure therefrom. This pilot pressure is applied to the pressure-receiving portion 53a of the left traveling pump 53L via the first traveling fluid passage 45a and to the pressure-receiving portion 53a of the right traveling pump 53R via the third traveling fluid passage 45c. In this manner, the swashplate angles of the left traveling pump 53L and the right traveling pump 53R are changed to rotate the left traveling motor 36L and the right traveling motor 36R normally (forward rotation), whereby the working machine 1 travels straight forward.

In addition, when the traveling operation member 59 is swung backward (in a direction indicated by an arrowed line A2 in FIG. 1), the operation valve 55B is operated to output a pilot pressure therefrom. This pilot pressure is applied to the pressure-receiving portion 53b of the left traveling pump 53L via the second traveling fluid passage 45b and to the pressure-receiving portion 53b of the right traveling pump 53R via the fourth traveling fluid passage 45d. In this manner, the swashplate angles of the left traveling pump 53L and the right traveling pump 53R are changed to rotate the left traveling motor 36L and the right traveling motor 36R reversely (backward rotation), whereby the working machine 1 travels straight backward.

In addition, when the traveling operation member 59 is swung rightward (in a direction indicated by an arrowed line A3 in FIG. 1), the control valve 55C is operated to output a pilot pressure therefrom. This pilot pressure is applied to the pressure-receiving portion 53a of the left traveling pump 53L via the first traveling fluid passage 45a, and to the pressure-receiving portion 53b of the right traveling pump 53R via the fourth traveling fluid passage 45d. In this manner, the swashplate angles of the left traveling pump 53L and the right traveling pump 53R are changed to rotate the left traveling motor 36L normally, and to rotate the right traveling motor 36R reversely, whereby the working machine 1 spins to turn (spin-turns) rightward.

In addition, when the traveling operation member 59 is swung leftward (in a direction indicated by an arrowed line A4 in FIG. 1), the control valve 55D is operated to output a pilot pressure therefrom. This pilot pressure is applied to the pressure-receiving portion 53a of the right traveling pump 53R via the third traveling fluid passage 45c, and to the pressure-receiving portion 53b of the left traveling pump 53L via the second traveling fluid passage 45b. In this manner, the swashplate angles of the left traveling pump 53L and the right traveling pump 53R are changed to rotate the left traveling motor 36L reversely, and to rotate the right traveling motor 36R normally, whereby the working machine 1 spins to turn (spin-turns) leftward.

In addition, when the traveling operation member 59 is swung in an oblique direction, rotation directions and rotation speeds of the left traveling motor 36L and the right traveling motor 36R are determined by a differential pressure between the pilot pressures applied to the pressure-receiving portion 53a and the pressure-receiving portion 53b, so that the working machine 1 pivots to turn rightward or leftward while traveling forward or backward.

That is, when the traveling operation member 59 is swung in a forwardly leftward oblique direction, the working machine 1 turns leftward while traveling forward at a speed corresponding to the swing angle of the traveling operation member 59. When the traveling operation member 59 is swung in a forwardly rightward oblique direction, the working machine 1 turns rightward while traveling forward at a speed corresponding to the swing angle of the traveling operation member 59. When the traveling operation member 59 is swung in a backwardly leftward oblique direction, the working machine 1 turns leftward while traveling backward at a speed corresponding to the swing angle of the traveling operation member 59. When the traveling operation member 59 is swung in a backwardly rightward oblique direction, the working machine 1 turns rightward while traveling backward at a speed corresponding to the swing angle of the traveling operation member 59.

As shown in FIG. 1, the hydraulic system for the working machine is a system that is configured to be warmed up with the working machine 1 being braked by a brake 30, a braking change-over valve 31 and a second speed shifting valve 72.

A drain fluid passage 101 is connected to the fluid passage (first fluid passage) 41 connecting the second speed shifting valve 72 to the first speed shifting valve 71L and the first speed shifting valve 71R. The drain fluid passage 101 is connected to a drain portion such as a suction side of the hydraulic fluid tank 22, hydraulic pumps (first hydraulic pump and second hydraulic pump), or the like. Note that the drain portion is not limited to the above configuration. In addition, a throttle 102 is disposed in the drain fluid passage 101.

The brake 30 is a device configured to brake the traveling motors (left traveling motor 36L and right traveling motor 36R). The brake 30 is shifted, by the pilot fluid (hydraulic fluid) delivered from the first hydraulic pump P1, between a braking state in which the traveling motors (left traveling motor 36L and right traveling motor 36R) are braked and a braking releasing state in which the braking is released.

For example, the brake 30 includes first disks disposed on output shafts of the left traveling motor 36L and the right traveling motor 36R, movable second disks, and springs that bias the second disks toward the sides where the second disks respectively contact to the first disks. The brake 30 includes housing units (housing cases) 38 that house the first disks, the second disks, and the springs, respectively.

The brake 30 and the braking change-over valve 31 are connected via a fluid passage 100. The braking change-over valve 31 is a solenoid valve that performs the braking and the releasing of braking (brake releasing) in the brake 30, and is a two-position change-over valve shiftable between a first position 31a and a second position 31b. When the braking change-over valve 31 is in the first position 31a, the braking change-over valve 31 sets a pressure of hydraulic fluid acting on the brake 30 (pressure acting on the housing units 38) to a pressure at which the brake 30 can perform the braking, thereby shifting the brake 30 into the braking state. In addition, when the braking change-over valve 31 is in the second position 31b, the braking change-over valve 31 sets a pressure of the hydraulic fluid to the pressure for the brake releasing, thereby shifting the brake 30 into the braking releasing state.

The shifting of the braking change-over valve 31 is controlled by the controller 60. For example, the controller 60 outputs a control signal to demagnetize the solenoid of the braking change-over valve 31 to shift the braking change-over valve 31 to the first position 31a In addition, the controller 60 outputs a control signal to magnetize the solenoid of the braking change-over valve 31 to shift the braking change-over valve 31 to the second position 31b. In addition, the output of the control signal from the controller 60 to the braking change-over valve 31 may be performed, for example, with a switch being disposed to be manually operated, or with the controller 60 automatically judging an operation status of the working machine.

Accordingly, when the braking change-over valve 31 is in the first position 31a, the pilot fluid in the housing unit 38 is drained, the second disks move in the direction of the braking, and thus the braking in the brake 30 can be performed. In addition, when the braking change-over valve 31 is in the second position 31b, the pilot fluid is supplied to storage portions of the housing units 38, and the second disks can move in a direction opposite to the braking (opposite to a biasing direction of the springs) to release the braking in the brake 30.

As shown in FIG. 1, the working machine 1 includes the controller 60. The controller 60 performs various controls of the working machine 1 and is constituted of a CPU, an MPU or other semiconductor, electrical/electronic circuits, or the like. An accelerator 65, a mode switch 66, a speed shifting switch 67, a measurement device 68, and a rotation speed detection device 69 are connected to the controller 60.

The accelerator 65 is disposed near the operator's seat 8 and can be used to set the target rotation speed of the prime mover 32. The accelerator 65 is an acceleration lever swingably supported, an acceleration pedal swingably supported, an acceleration volume swingably supported, an acceleration slider swingably supported, or the like. Note that the accelerator 65 is not limited to the examples mentioned above.

The rotation speed detection device 69 detects the actual rotation speed of the prime mover 32. The rotation speed detection device 69 allows the controller 60 to know the actual rotation speed of the prime mover 32. Based on an operation amount of the accelerator 65, the controller 60 sets the target rotation speed and controls the actual rotation speed so as to reach the set target rotation speed.

The measurement device 68 is a sensor for measuring a temperature of the hydraulic fluid, and the control device 60 can obtain the temperature of hydraulic fluid measured by the measurement device 68.

The controller 60 performs a manual shifting control to shift the traveling motors (left traveling motor 36L and right traveling motor 36R) to either the first speed stage or the second speed stage according to the operation of the speed shifting switch 67. In the manual shifting control, when the speed shifting switch 67 is shifted to the first speed stage, the traveling motors (left traveling motor 36L and right traveling motor 36R) are shifted to the first speed stage by demagnetizing the solenoid of the second speed shifting valve 72. In the manual shifting control, when the speed shifting switch 67 is shifted to the second speed stage, the traveling motors (left traveling motor 36L and right traveling motor 36R) are shifted to the second speed stage by magnetizing the solenoid of the second speed shifting valve 72. The second speed shifting valve 72 has an opening portion and other parts so that the pressure acting on the pressure-receiving portions of the first speed shifting valve 71L and the first speed shifting valve 71R is set to be a pressure corresponding to the second speed stage, even in a state where a part of the hydraulic fluid flows into the drain fluid passage 101 by being shifted to the second position 72b.

The mode switch 66 is a switch configured to be manually operated to perform a mode for locking the work, i.e., a warm-up mode. For example, the mode switch 66 is a switch that can be shifted to be ON or OFF, and when being ON, the mode switch 66 perform the warm-up mode, and when being OFF, the mode switch 66 disables the warm-up mode and performs the operation mode. Note that the system may automatically enter the warm-up mode regardless of whether the mode switch 66 is shifted to be ON or OFF.

Figure 2B:
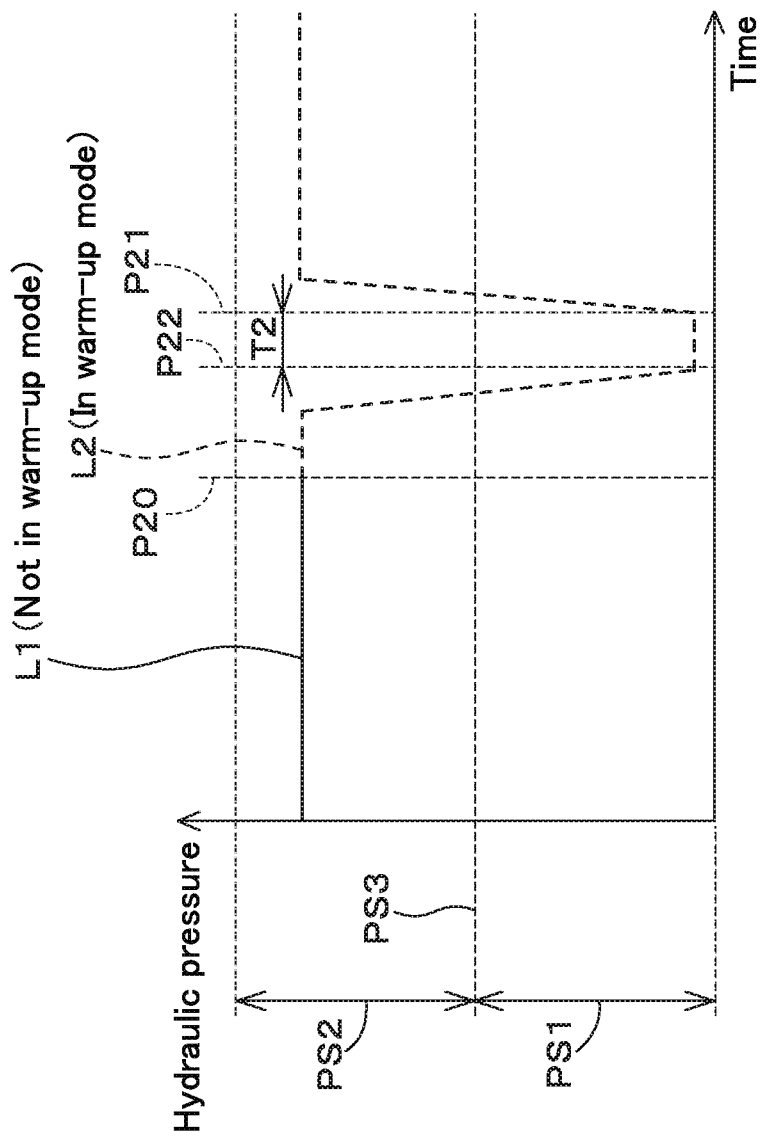
FIG. 2B is a view showing a pilot pressure generated when the traveling motor is at the second speed stage and a pilot pressure generated when the warm-up mode is started when the traveling motor is at the second speed stage according to the first embodiment.

FIG. 2A shows the pilot pressure generated when the traveling motors are shifted to the first speed stage or second speed stage and the pilot pressure generated when the warm-up mode is performed at the first speed stage. FIG. 2B shows the pilot pressure generated when the traveling motor is at the second speed stage and the pilot pressure generated when the warm-up mode is performed at the second speed stage.

For convenience of explanation, in FIGS. 2A and 2B, the pilot pressure, not in the warm-up mode, acting on the pressure-receiving portions of the first speed shifting valve 71L and the first speed shifting valve 71R is shown by a line L1, and the pilot pressure, in the warm-up mode, acting on the pressure-receiving portions of the first speed shifting valve 71L and the first speed shifting valve 71R is shown by a line L2. In addition, for convenience of explanation, the pressure acting on the pressure-receiving portions of the first speed shifting valve 71L and the first speed shifting valve 71R is referred to as a "hydraulic pressure".

In addition, in FIG. 2A, with respect to the hydraulic pressure generated when shifting to the first speed stage and to the second speed stage, the increasing, reducing, lower limit pressure, and upper limit pressure of the hydraulic pressure change in the same manner in both a state not being in the warm-up mode and a state being in the warm-up mode; however, in order to clarify a relationship between a state not being in the warm-up mode and a state being in the warm-up mode, the hydraulic pressure in the state non being in the warm-up mode and the hydraulic pressure in the state being in the warm-up mode are shown in the same drawing in FIG. 2A.

As shown in FIG. 2A, when the controller 60 is not in the warm-up mode, for example, when the speed shifting switch 67 is shifted, the controller 60 changes the hydraulic pressure as shown on the line L1 in shifting from the first speed to the second speed and shifting from the second speed to the first speed. In addition, when the controller 60 is in the warm-up mode, the controller 60, for example, controls the hydraulic pressure to be changed as shown on the line L2.

In detail, when the speed shifting switch 67 is shifted to the first speed stage in the state not being in the warm-up mode, the hydraulic pressure does not exceed a boundary pressure PS3 and is within a range PS1 as shown on the line L1, and the traveling motors (left traveling motor 36L and right traveling motor 36R) are at the first speed stage. In addition, when the speed shifting switch 67 is shifted to the second speed stage in the state not being in the warm-up mode, the hydraulic pressure exceeds the boundary pressure PS3 and is within a range PS2, and the traveling motors (left traveling motor 36L and right traveling motor 36R) are shifted to the second speed stage.

On the other hand, it is assumed that the hydraulic system is shifted to the warm-up mode at a time point P10 when the traveling motors (left traveling motor 36L and right traveling motor 36R) are at the first speed stage. At the time point P10, the controller 60 outputs a control signal to demagnetize the solenoid of the braking change-over valve 31 to set the braking change-over valve 31 to the first position 31a, i.e., to shift the brake 30 into the braking state.

At a time point P11 when a predetermined time T1 has elapsed from the shifting of the braking change-over valve 31 to the first position 31a, the controller 60 magnetizes the solenoid of the second speed shifting valve 72 to increase a pressure on the fluid passage (first fluid passage) 41 side. Then, with the brake 30 being maintained in the braking mode, the hydraulic pressure exceeds the boundary pressure PS3 to be in a range PS2 as shown on the line L2. That is, in the braking mode, when the solenoid of the second speed shifting valve 72 is magnetized and the second speed shifting valve 72 is shifted to the second position 72b, a part of the fluid passage (first fluid passage) 41 is led to the drain fluid passage 101, which allows the warm-up at the second speed stage to be performed in a state where the traveling motors (left traveling motor 36L and right traveling motor 36R) are in the braking state.

In addition, it is assumed that the hydraulic system is shifted to the warm-up mode at a time point P20 when the traveling motors (left traveling motor 36L and right traveling motor 36R) are in the second speed stage and the brake 30 is in the braking releasing state. As shown in FIG. 2B, the controller 60 shifts the second speed shifting valve 72 to the first position 72a after the time point P20 as shown in the line L2, and reduces the hydraulic pressure toward the range PS1 corresponding to the first speed stage. In addition, when the hydraulic pressure becomes low within the range PS1, the controller 60 shifts the brake 30 from the braking releasing state to the braking state. At a time point P21 when the brake 30 is in the braking state and the hydraulic pressure becomes low in the range PS1, the controller 60 shifts the second speed shifting valve 72 to the second position 72b to increase the hydraulic pressure toward the range PS2.

The controller 60 may increase the hydraulic pressure at a time point P22 after the hydraulic pressure becomes low in the range PS1 and after the time point P21 when a predetermined time T2 has elapsed. According to this configuration, even when the traveling motor is in the second speed stage, the hydraulic pressure is reduced once to shift the brake 30 to the braking state, and then the hydraulic pressure is increased again, thereby activating the warm-up.

At the starting of the prime mover 32 (at a timing when the ignition switch is shifted from being OFF to being ON), the controller 60 maintains the brake 30 in the braking state (maintaining the braking change-over valve 31 at the first position 31a). When a rotation speed of the prime mover 32 becomes a predetermined rotation speed while the brake 30 is maintained in the braking state, the controller 60 automatically enters the warm-up mode to shift the second speed shifting valve 72 to the second position 72b.

In addition, when, after starting the prime mover 32, a driver (operator) operates the mode switch 66 to disable the warm-up mode (operation mode) in the warm-up mode, the controller 60 shifts the second speed shifting valve 72 to the first position 72a to reduce the hydraulic pressure to the range PS1 corresponding to the first speed stage. When the hydraulic pressure becomes a value within the range PS1, the controller 60 shifts the braking change-over valve 31 to the second position 31b to shift the brake 30 to the breaking releasing state.

The controller 60 may perform the shifting between the warm-up mode and a normal mode (in which the warm-up mode is disabled) based on a temperature of hydraulic fluid. For example, in a temperature range where the temperature of hydraulic fluid measured by the measurement device 68 is low and viscosity of the hydraulic fluid is high, the controller 60 shifts the mode to the warm-up, and shifts the mode to the normal mode in a temperature range where the temperature of hydraulic fluid is high and the viscosity of the hydraulic fluid is low. In this case, the control under the warm-up mode is similar to that in FIG. 2A and FIG. 2B, and accordingly the explanation thereof is omitted.

Figure 3:
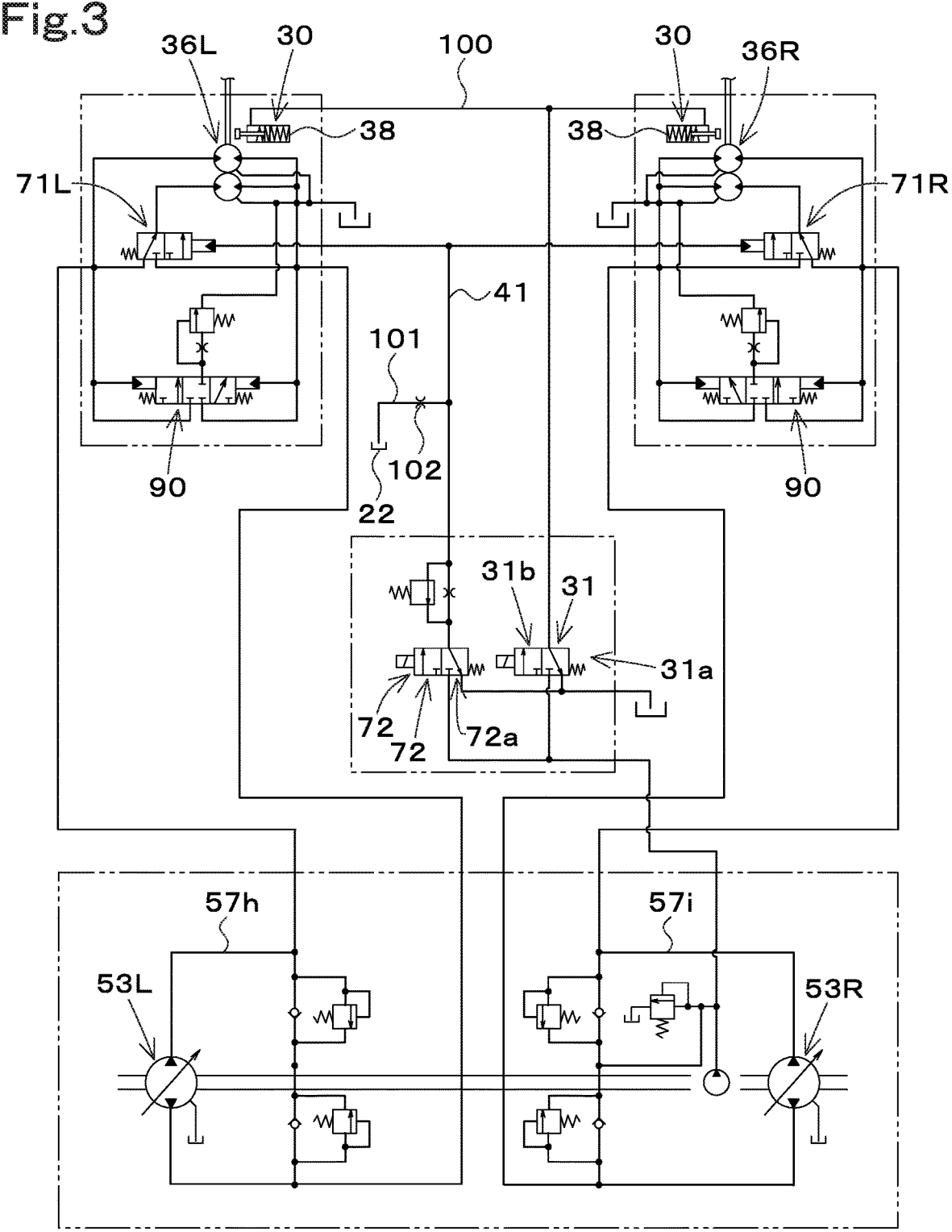
FIG. 3 is a view showing a modified example of the hydraulic system (hydraulic circuit) according to the first embodiment.

FIG. 3 shows a modified example of the hydraulic system.

As shown in FIG. 3, the left traveling motor 36L and the right traveling motor 36R are cam motors (radial piston motors). The left traveling motor 36L and the right traveling motor 36R change a rotation speed and torque of an output shaft by varying a capacity (motor capacity) during the operation. In addition, the left traveling motor 36L and the right traveling motor 36R are connected to the forward-traveling/backward-traveling switching valve 90. By switching the forward-traveling/backward-traveling switching valve 90, the rotational directions of the left traveling motor 36L and the right traveling motor 36R can be shifted.

In the above-described embodiment, the left traveling motor 36L and the right traveling motor 36R are configured to be shifted to the first speed or the second speed simultaneously, and the warm-up mode is also performed simultaneously for the left traveling motor 36L and the right traveling motor 36R. However, at least one of the left traveling motor 36L and the right traveling motor 36R may be shifted to the first speed stage or the second speed stage, and the warm-up mode may be performed with at least one of the left running motor 36L and the right running motor 36R being shifted to the second speed stage.

In the above-described embodiment, the second speed shifting valve 72 is a change-over valve; however, the second speed shifting valve 72 may be a proportional valve or any other valve, and is not limited thereto.

Figure 4A:
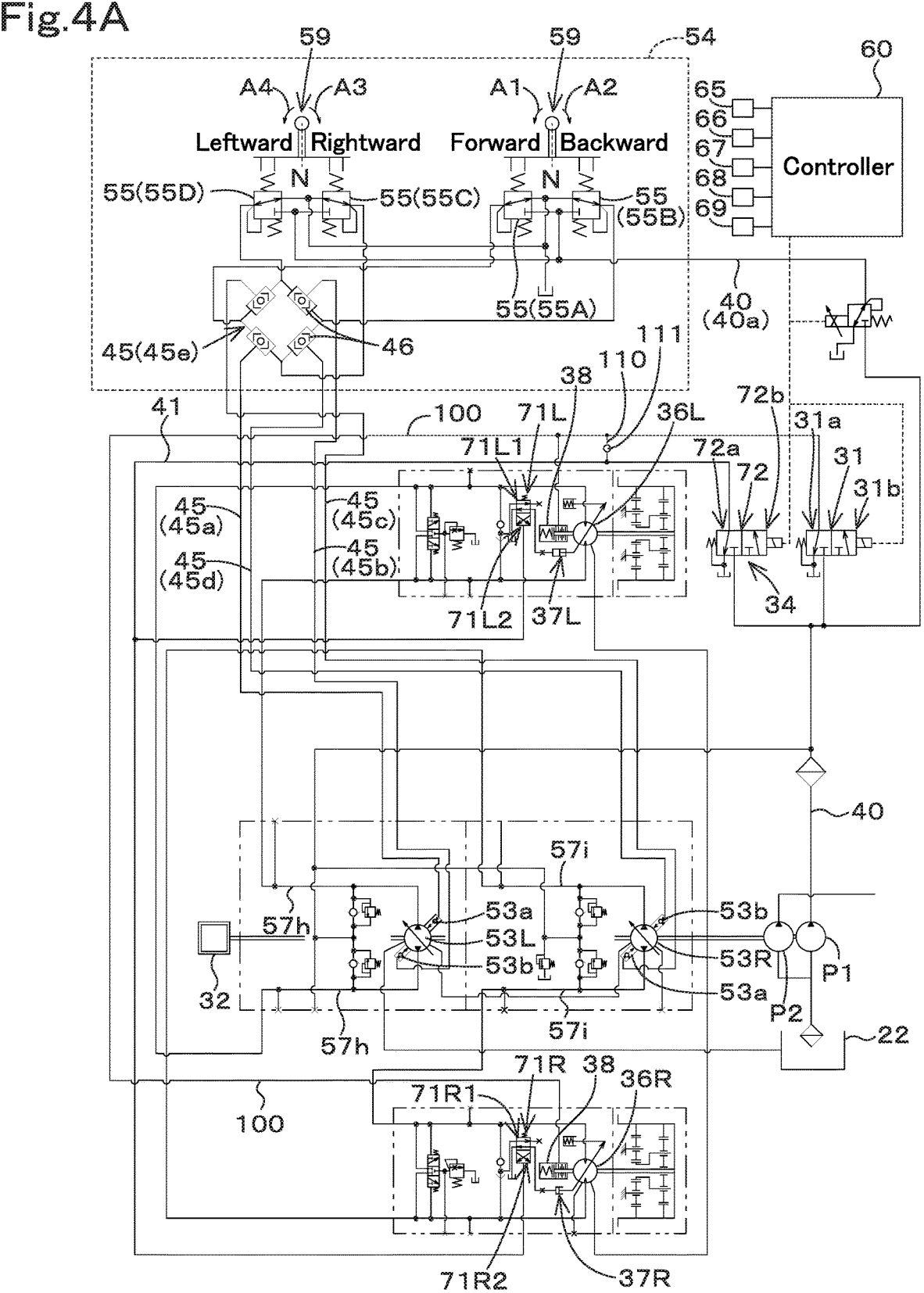
FIG. 4A is a view showing a modified example of the hydraulic system (hydraulic circuit) for the working machine according to the first embodiment.

FIG. 4A shows a modified example of the hydraulic system. As shown in FIG. 4A, a connecting fluid passage 110 is disposed to connect the fluid passage 100 to the fluid passage 41. A check valve 111 is connected to the connecting fluid passage 110, the check valve 111 allowing hydraulic fluid to flow from the fluid passage 41 to the fluid passage 100 and preventing the hydraulic fluid from flowing from the fluid passage 100 to the fluid passage 41.

The controller 60 can return to the normal mode with the mode switch 66. In FIG. 4A, the configurations are similar to those of the above-described hydraulic circuit, except for the drain fluid passage 101.

The modified example of the hydraulic system of FIG. 4A includes the prime mover 32, the traveling devices 5L and 5R, the traveling motors 36L and 36R configured to output power to the traveling devices 5L and 5R, the first speed shifting valves 71L and 71R configured to shift the traveling motors 36L and 36R to the first speed stage or to the second speed stage faster than the first speed stage, and the second speed shifting valve 72 configured to change a pressure acting on the first speed shifting valves 71L and 71R, the brake 30 shiftable between the braking state to brake the traveling motors 36L and 36R and the braking releasing state to release the braking state, and the control device 60 configured to control the second speed shifting valve 72 and the brake 30 and has the normal mode. When the warm-up mode is released in a state where the traveling motors 36L and 36R are in the second speed stage, that is, in the normal mode, the controller 60 shifts the brake 30 from the braking state to the braking releasing state after the second speed shifting valve 72 reduces the hydraulic pressure from a pressure corresponding to the second speed stage to a pressure corresponding to the first speed stage. According to this configuration, the hydraulic pressure is reduced in shifting the brake 30 from the braking state to the braking releasing state, thereby shifting the working machine quickly and smoothly to a traveling state after entering the braking releasing state.

In FIG. 4A, the drain fluid passage 101 may be omitted; however, as described above, the hydraulic system may include the drain fluid passage 101 and performs the warm-up in the warm-up mode. In this case, when the brake 30 is shifted to be in the braking state and the second speed shifting valve 72 is shifted to the second position 72b, the hydraulic fluid can be supplied to the fluid passage 100 through the connecting fluid passage 110 from the fluid passage 41, and the hydraulic fluid in the fluid passage 100 can be drained from the drain side of the braking change-over valve 31.

Figure 4B:
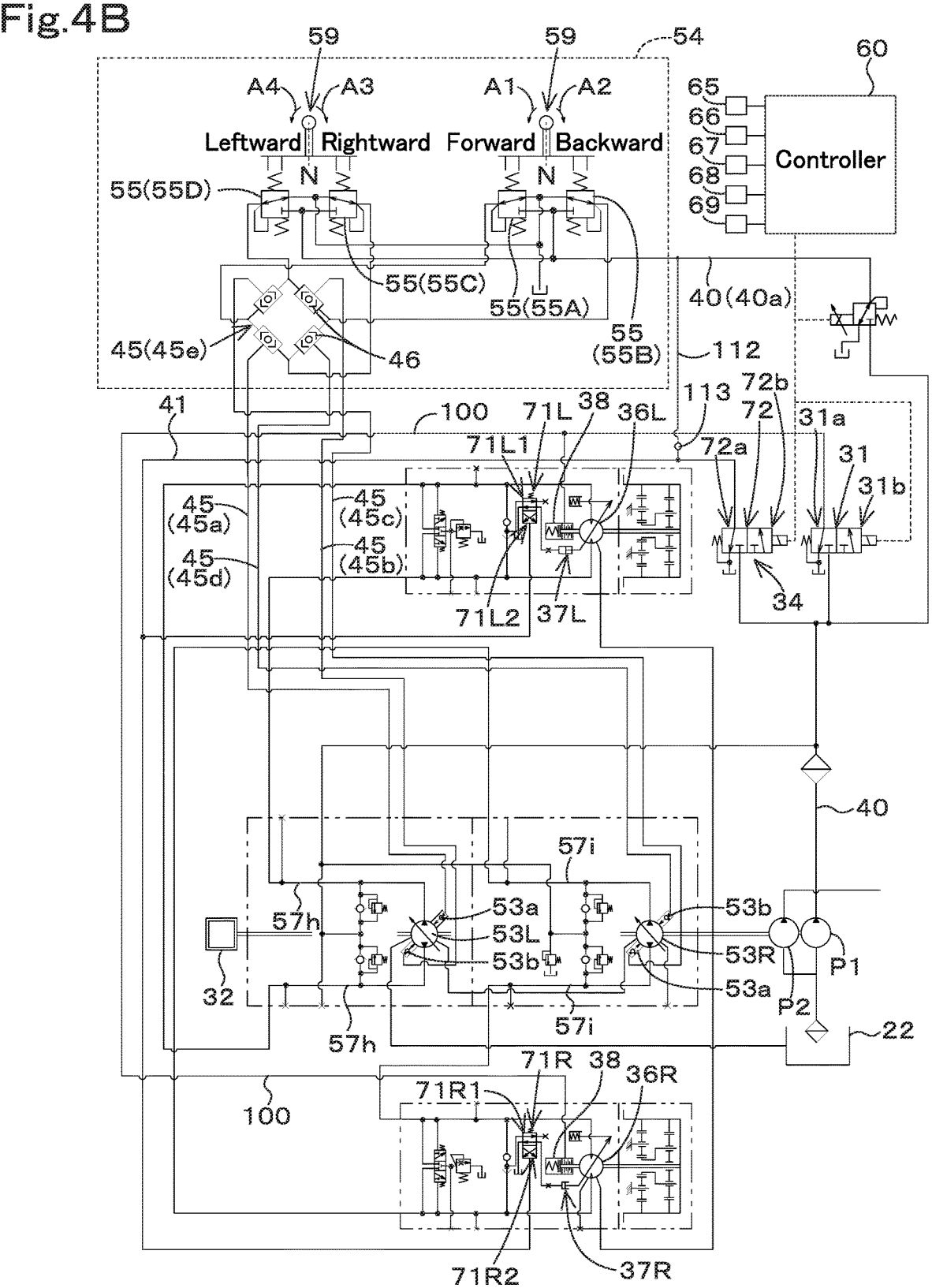
FIG. 4B is a showing the modified example of the hydraulic system (hydraulic circuit) for the working machine according to the first embodiment.

In addition, as shown in FIG. 4B, a connecting fluid passage 112 may be disposed to connect the fluid passage 41 to the fluid passage 40. A check valve 113 is connected to the connecting fluid passage 110, the check valve 113 allowing hydraulic fluid to flow from the fluid passage 41 to the fluid passage 40 and preventing the hydraulic fluid from flowing from the fluid passage 40 to the fluid passage 41. In this case, as in the above-described embodiment, the warm-up can be performed by shifting into the warm-up mode to allow hydraulic fluid to flow from the fluid passage 41 to the fluid passage 40 through the connecting fluid passage 112.

The working machine 1 includes the prime mover 32, the traveling devices 5L and 5R, the traveling motors 36L and 36R configured to output power to the traveling devices 5L and 5R, the speed shifting valves 71L and 71R configured to shift output speeds of the traveling motors 36L and 36R between the first speed and the second speed faster than the first speed, the second speed shifting valve 72 configured to change a pressure acting on the first speed shifting valves 71L and 71R, the first fluid passage 41 fluidly connected to the first speed shifting valves 71L and 71R so that hydraulic fluid having the hydraulic pressure to be applied to the first speed shifting valves 71L and 71R flows through the first fluid passage 41, the drain fluid 101 passage fluidly connected to the first fluid passage 41, the brake 30 shiftable between the braking state to brake the traveling motors 36L and 36R and the braking releasing state to release the braking, and the controller 60 configured or programmed to control the second shifting valve 72 and the brake 30, and being capable of activate the warm-up mode. The controller 60, when activating the warm-up mode, is configured or programmed to shift the brake 30 into the braking state, and control the second shifting valve 72 so as to make the hydraulic pressure to be applied to the first speed shifting valves 71L and 71R equal to or greater than a value corresponding to the second speed. According to this configuration, after the brake 30 is shifted to the braking state to prevent the working machine 1 (machine body 2) from moving, the hydraulic pressure acting on the first speed shifting valves 71L and 71R is increased to be higher than the pressure corresponding to the second speed stage, so that more hydraulic fluid can be circulated, and the warm-up can be performed quickly.

When the prime mover 32 is started and a rotation speed of the prime mover 32 becomes a predetermined value or more, the controller 60 is configured to programmed to make, while keeping the brake 30 in the braking state, the hydraulic pressure equal to or greater than the value corresponding to the second speed.

When the warm-up mode is activated while the output speed of the traveling motors 36L and 36R is set to the second speed, the controller 60 is configured or programmed to control the second speed shifting valve 72 so as to reduce the hydraulic pressure from the value corresponding to the second speed to a value corresponding to the first speed, to shift the brake 30 from the braking release state to the braking state, and to control the second speed shifting valve 72 so as to increase the hydraulic pressure to the value corresponding to the second speed after the hydraulic pressure is reduced from the value corresponding to the second speed to the value corresponding to the first speed and the brake 30 is shifted from the braking release state to the braking state. According to this configuration, after the prime mover 32 is started, high pressure (hydraulic pressure) can be applied to the first speed shifting valves 71L and 71R at a timing when a rotation speed of the prime mover 32 becomes a predetermined speed or more, so that the hydraulic system can be warmed up efficiently when the prime mover 32 is started to start the work.

The controller 60 is configured or programmed to increase the hydraulic pressure to the value corresponding to the second speed after a predetermined period elapses since the hydraulic pressure is reduced from the value corresponding to the second speed to the value corresponding to the first speed. According to this configuration, even when the working machine 1 (machine body 2) is traveling at the second speed stage, the hydraulic system can be made to be able to perform the warm up. That is, when the working machine 1 (machine body 2) is traveling at the second speed stage, the working machine is stopped by reducing once the hydraulic pressure to the pressure corresponding to the first speed stage to reduce a traveling speed of the working machine 1, and then the hydraulic pressure is increased again, thereby activating the warm-up.

When the warm-up mode is activated while the output speed of the traveling motors 36L and 36R is set to the first speed, the controller 60 is configured or programmed to shift the brake 30 from the braking release state to the braking state, and to control the second speed shifting valve 72 so as to increase the hydraulic pressure from the value corresponding to the first speed to the value corresponding to the second speed after a predetermined period elapses since the brake 30 is shifted from the braking release state to the braking state.

The working machine 1 includes the measurement device 68 configured to detect a temperature of the hydraulic fluid. The controller 60 is configured or programmed to activate the warm-up mode when the temperature of hydraulic fluid measured by the measurement device 68 becomes a predetermined value or less. According to this configuration, when the working machine 1 is traveling at the first speed stage, the working machine 1 is stopped by shifting the brake 30 to the braking state, and then the hydraulic pressure is increased, thereby activating the warm-up.

The working machine 1 includes the mode switch 66 configured to manually shift the warm-up mode to be enabled or be disabled. According to this configuration, an operator (driver) can operate the mode switch 66 to start the warm-up or stop (end) the warm-up.

Second Embodiment

Figure 5:
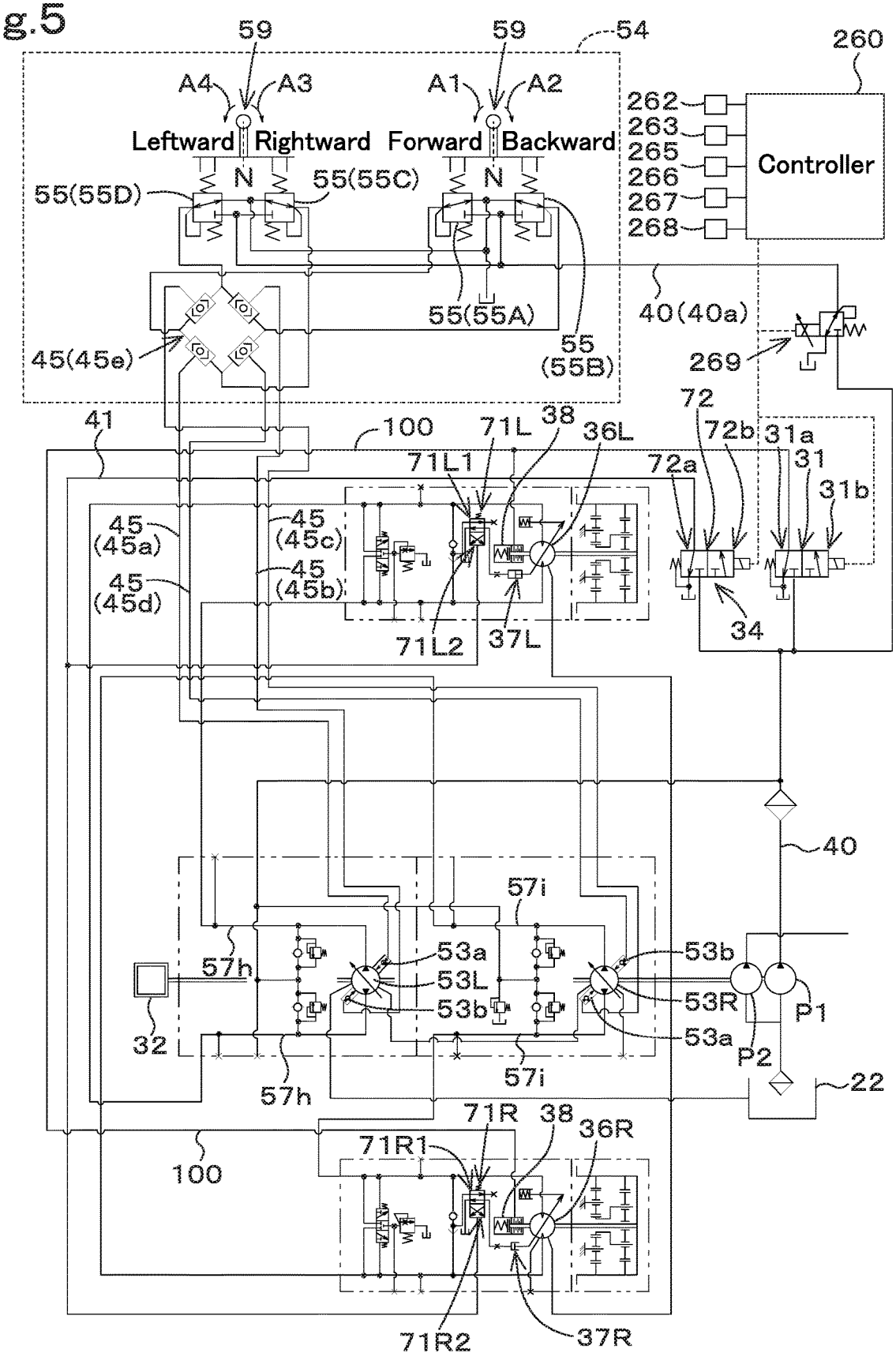
FIG. 5 is a view showing a hydraulic system (hydraulic circuit) for a working machine according to a second embodiment of the invention.

Next, referring to FIG. 5, a second embodiment of the invention will be described. FIG. 5 is a view showing a part of the hydraulic system (hydraulic circuit) for the working machine according to the second embodiment of the invention. In this embodiment, components similar to those described in the first embodiment are indicated with the same reference numerals, and descriptions thereof are omitted.

Referring to FIG. 5, the hydraulic system for the working machine will be described.

As shown in FIG. 5, the hydraulic system for the working machine includes the first hydraulic pump P1 and the second hydraulic pump P2. The first hydraulic pump P1 is a pump configured to be driven by power of the prime mover 32 and includes a constant displacement gear pump. The first hydraulic pump P1 is capable of delivering hydraulic fluid stored in the tank 22. Specifically, the first hydraulic pump P1 delivers hydraulic fluid that is mainly used for control. For convenience of explanation, the tank 22 that stores hydraulic fluid may be referred to as a hydraulic fluid tank. In addition, of the hydraulic fluid delivered from the first hydraulic pump P1, the hydraulic fluid used for control is referred to as pilot fluid, and a pressure of the pilot fluid is referred to as a pilot pressure.

The second hydraulic pump P2 is a pump to be driven by power of the prime mover 32, and includes a constant displacement gear pump. The second hydraulic pump P2 is capable of delivering hydraulic fluid stored in the tank 22 and, for example, supplies the hydraulic fluid to fluid passages of a working system. For example, the second hydraulic pump P2 supplies hydraulic fluid to control valves (flow-rate control valves) that control the boom cylinders 14 for operating the booms 10, the bucket cylinders 15 for operating the bucket, and an auxiliary hydraulic actuator for operating the auxiliary hydraulic actuator.

In addition, the hydraulic system for the working machine includes the pair of traveling motors 36L and 36R and the pair of traveling pumps 53L and 53R. The pair of traveling motors 36L and 36R output power transmitted to the pair of traveling devices 5L and 5R. Of the pair of traveling motors 36L and 36R, the traveling motor 36L transmits rotational power to the traveling device (left traveling device) 5L, and the traveling motor 36R transmits rotational power to the traveling device (right traveling device) 5R.

The pair of traveling pumps 53L and 53R are pumps to be driven by power of the prime mover 32 and are variable displacement axial pumps with respective swashplates, for example. The pair of traveling pumps 53L and 53R are driven to supply hydraulic fluid respectively to the pair of traveling motors 36L and 36R. Of the pair of traveling pumps 53L and 53R, the traveling pump 53L supplies the hydraulic fluid to the traveling pump 53L, and the traveling pump 53R supplies the hydraulic fluid to the traveling pump 53R.

For convenience of explanation, the traveling pump 53L may be referred to as the left traveling pump 53L, the traveling pump 53R may be referred to as the right traveling pump 53R, the traveling motor 36L may be referred to as the left traveling motor 36L, and the traveling motor 36R may be referred to as the right traveling motor 36R.

Each of the left traveling pump 53L and the right traveling pump 53R has the pressure-receiving portion 53a and the pressure-receiving portion 53b to which a pressure (pilot pressure) of the hydraulic fluid (pilot fluid) from the first hydraulic pump P1 is applied, and angles of the swashplates are changed by the pilot pressures applied to the pressure-receiving portions 53a and 53b. By changing an angle of each of the swashplates, an output (delivery amount of hydraulic fluid) and a hydraulic fluid delivery direction of each of the left and right traveling pumps 53L and 53R can be changed.

The left traveling pump 53L and the left traveling motor 36L are connected to each other by the connecting fluid passage (first circulation fluid passage) 57h, and hydraulic fluid delivered from the left traveling motor 36L is supplied to the left traveling motor 36L. The right traveling pump 53R and the right traveling motor 36R are connected to each other by the connecting fluid passage (second circulation fluid passage) 57i, and hydraulic fluid delivered from the right traveling motor 36R is supplied to the right traveling motor 36R.

The left traveling motor 36L can be rotated by hydraulic fluid delivered from the left traveling pump 53L, and at a rotation speed (number of rotations) variable according to a flow rate of the hydraulic fluid. The swashplate change-over cylinder 37L is connected to the left traveling motor 36L, so that a rotation speed (number of rotations) of the left traveling motor 36L can also be changed by extending or contracting the swashplate change-over cylinder 37L in either one of opposite directions. That is, when the swashplate change-over cylinder 37L is contracted, a rotation speed of the left traveling motor 36L is set at the low speed (first speed), and when the swashplate change-over cylinder 37L is extended, a rotation speed of the left traveling motor 36L is set at the high speed (second speed). That is, the rotation speed of the left traveling motor 36L is shiftable between the first speed that is the low speed stage and the second speed that is the high speed stage.

The right traveling motor 36R can be rotated by hydraulic fluid delivered from the right traveling pump 53R, and at a rotation speed (number of rotations) variable according to a flow rate of the hydraulic fluid. The swashplate change-over cylinder 37R is connected to the right traveling motor 36R, so that a rotation speed (number of rotations) of the right traveling motor 36R can also be changed by extending or contracting the swashplate change-over cylinder 37R in either one of opposite directions. That is, when the swashplate change-over cylinder 37R is contracted, a rotation speed of the right traveling motor 36R is set at the low speed (first speed), and when the swashplate change-over cylinder 37R is extended, a rotation speed of the right traveling motor 36R is set at the high speed (second speed). That is, the rotation speed of the right traveling motor 36L is shiftable between the first speed that is the low speed stage and the second speed that is the high speed stage.

As shown in FIG. 5, the hydraulic system for the working device includes the traveling switching valve 34. The traveling switching valve 34 is shiftable between the first state where rotation speeds (numbers of rotations) of the traveling motors (left traveling motor 36L and the right traveling motor 36R) are each set at the first speed stage and the second state where rotation speeds of the traveling motors are each set at the second speed stage. The traveling switching valve 34 includes the first speed shifting valves 71L and 71R and the second speed shifting valve 72.

The first speed shifting valve 71L is connected via a fluid passage to the swashplate change-over cylinder 37L of the left traveling motor 36L, and is configured as a two-position change-over valve shiftable between the first position 71L1 and the second position 71L2. The first speed shifting valve 71L, when set at the first position 71L1, contracts the swashplate change-over cylinder 37L, and when set at the second position 71L2, extends the swashplate change-over cylinder 37L.

The first speed shifting valve 71R is connected via a fluid passage to the swashplate change-over cylinder 37R of the right traveling motor 36R, and is configured as a two-position change-over valve shiftable between the first position 71R1 and the second position 71R2. The first speed shifting valve 71R, when set at the first position 71L1, contracts the swashplate change-over cylinder 37R, and when set at the second position 71R2, extends the swashplate change-over cylinder 37R.

The second speed shifting valve 72 is a solenoid valve that shifts the first speed shifting valve 71L and the first speed shifting valve 71R, and is configured as a two-position change-over valve shiftable based on magnetization between a first position 72a and a second position 72b. The second speed shifting valve 72, the first speed shifting valve 71L and the first speed shifting valve 71R are connected by the fluid passage 41. The second speed shifting valve 72, when set at the first position 72a, shifts the first speed shifting valve 71L and the first speed shifting valve 71R to the first positions 71L1 and 71R1, and when set at the second position 72b, shifts the first speed shifting valve 71L and the first speed shifting valve 71R to the second positions 71L2 and 71R2.

That is, the traveling switching valve 34 is set in the first state to shift each of rotation speeds of the traveling motors (traveling motor 36L and traveling motor 36R) to the first speed when the second speed shifting valve 72 is set at the first position 72a, the first speed shifting valve 71L is set at the first position 71L1, and the first speed shifting valve 71R is set at the first position 71R1. The traveling switching valve 34 is set in the second state to shift each of rotation speeds of the traveling motors (traveling motor 36L and traveling motor 36R) to the second speed when the second speed shifting valve 72 is set at the second position 72b, the first speed shifting valve 71L is set at the second position 71L2, and the first speed shifting valve 71R is set at the second position 71R2.

Accordingly, due to the traveling switching valve 34, the traveling motors (traveling motor 36L and traveling motor 36R) are set at a speed stage shiftable between the first speed that is the low speed stage and the second speed that is the high speed stage.

The operation device (traveling operation device) 54 is configured to apply hydraulic fluid to the pressure-receiving portions 53a and 53b of the traveling pumps (left traveling pump 53L and right traveling pump 53R) when the traveling operation member 59 is operated, and is capable of changing the angles of swashplates (swashplate angles) of the traveling pumps 53L and 53R. The operation device 54 includes the traveling operation member 59 and the plurality of operation valves 55.

The traveling operation member 59 is an operation lever that is supported on the operation valves 55 and swings in a lateral direction (machine width direction) or the fore-andaft direction. That is, the traveling operation member 59 is operable to the right and to the left from a neutral position N, and to the front and to the rear from the neutral position N. In other words, the traveling operation member 59 is swingable in at least four directions from the neutral position N. For convenience of explanation, the forward and backward directions, that is, opposite fore-and-aft directions, may be referred to as first directions. In addition, the rightward and leftward directions, that is, opposite lateral directions (opposite machine width directions), are may be referred to as second directions.

In addition, the plurality of operation valves 55 are operated by the common, i.e., single, traveling operation member 59. The plurality of operation valves 55 are actuated according to swinging of the traveling operation member 59. The delivery fluid passage 40 is connected to the plurality of operation valves 55, so that hydraulic fluid (pilot fluid) from the first hydraulic pump P1 can be supplied to the operation valves 55 through the delivery fluid passage 40. The plurality of operation valves 55 include the operation valve 55A, the operation valve 55B, the operation valve 55C, and the operation valve 55D.

When the traveling operation member 59 is swung forward (that is, in one of the opposite fore-and-aft directions (or in one of the opposite first directions)), i.e., when a forward operation is performed, the operation valve 55A outputs hydraulic fluid having a pressure variable according to an operation amount (operation) of the forward operation. When the traveling operation member 59 is swung backward (that is, in the other of the opposite fore-and-aft directions (or in the other of the opposite first directions)), i.e., when a backward operation is performed, the operation valve 55B outputs hydraulic fluid having a pressure variable according to an operation amount (operation) of the backward operation. When the traveling operation member 59 is swung rightward (that is, in one of the opposite lateral directions (or in one of the opposite second directions)), i.e., when a rightward operation is performed, the operation valve 55C outputs hydraulic fluid having a pressure variable according to an operation amount (operation) of the rightward operation. When the traveling operation member 59 is swung leftward (that is, in the other of the opposite lateral directions (or in the other of the opposite second directions)), i.e., when a leftward operation is performed, the operation valve 55D outputs hydraulic fluid having a pressure variable according to an operation amount (operation) of the leftward operation.

The plurality of operation valves 55 are connected to the traveling pumps (left traveling pump 53L and right traveling pump 53R) by the traveling fluid passage 45. In other words, the traveling pumps (left traveling pump 53L and right traveling pump 53R) are hydraulic equipment that are configured to be operated by hydraulic fluid output from the operation valves 55 (operation valve 55A, operation valve 55B, operation valve 55C, and operation valve 55D).

The traveling fluid passage 45 includes the first traveling fluid passage 45a, the second traveling fluid passage 45b, the third traveling fluid passage 45c, the fourth traveling fluid passage 45d, and the fifth traveling fluid passage 45e. The first traveling fluid passage 45a is a fluid passage connected to the pressure-receiving portion (first pressure-receiving portion) 53a of the left traveling pump 53L, and is a fluid passage through which hydraulic fluid to be applied to the pressure-receiving portion (first pressure-receiving portion) 53a flows when the traveling operation member 59 is operated. The second traveling fluid passage 45b is a fluid passage connected to the pressure-receiving portion (second pressure-receiving portion) 53b of the left traveling pump 53L, and is a fluid passage through which hydraulic fluid to be applied to the pressure-receiving portion (the second pressure-receiving portion) 53b flows when the traveling operation member 59 is operated. The third traveling fluid passage 45c is a fluid passage connected to the pressure-receiving portion (third pressure-receiving portion) 53a of the right traveling pump 53R, and is a fluid passage through which hydraulic fluid to be applied to the pressure-receiving portion (third pressure-receiving portion) 53a flows when the traveling operation member 59 is operated. The fourth traveling fluid passage 45d is a fluid passage connected to the pressure-receiving portion (fourth pressure-receiving portion) 53b of the right traveling pump 53R, and is a fluid passage through which hydraulic fluid to be applied to the pressure-receiving portion (fourth pressure-receiving portion) 53b flows when the traveling operation member 59 is operated. The fifth traveling fluid passage 45e is a fluid passage that connects the operation valves 55 to the first traveling fluid passage 45a, the second traveling fluid passage 45b, the third traveling fluid passage 45c, and the fourth traveling fluid passage 45d.

When the traveling operation member 59 is swung forward (in a direction indicated by an arrowed line A1 in FIG. 5), the operation valve 55A is operated to output a pilot pressure therefrom. This pilot pressure is applied to the pressure-receiving portion 53a of the left traveling pump 53L via the first traveling fluid passage 45a and to the pressure-receiving portion 53a of the right traveling pump 53R via the third traveling fluid passage 45c. In this manner, the swashplate angles of the left traveling pump 53L and the right traveling pump 53R are changed to rotate the left traveling motor 36L and the right traveling motor 36R normally (forward rotation), whereby the working machine 1 travels straight forward.

In addition, when the traveling operation member 59 is swung backward (in a direction indicated by an arrowed line A2 in FIG. 5), the operation valve 55B is operated to output a pilot pressure therefrom. This pilot pressure is applied to the pressure-receiving portion 53b of the left traveling pump 53L via the second traveling fluid passage 45b and to the pressure-receiving portion 53b of the right traveling pump 53R via the fourth traveling fluid passage 45d. In this manner, the swashplate angles of the left traveling pump 53L and the right traveling pump 53R are changed to rotate the left traveling motor 36L and the right traveling motor 36R reversely (backward rotation), whereby the working machine 1 travels straight backward.

In addition, when the traveling operation member 59 is swung rightward (in a direction indicated by an arrowed line A3 in FIG. 5), the control valve 55C is operated to output a pilot pressure therefrom. This pilot pressure is applied to the pressure-receiving portion 53a of the left traveling pump 53L via the first traveling fluid passage 45a, and to the pressure-receiving portion 53b of the right traveling pump 53R via the fourth traveling fluid passage 45d. In this manner, the swashplate angles of the left traveling pump 53L and the right traveling pump 53R are changed to rotate the left traveling motor 36L normally, and to rotate the right traveling motor 36R reversely, whereby the working machine 1 spins to turn (spin-turns) rightward.

In addition, when the traveling operation member 59 is swung leftward (in a direction indicated by an arrowed line A4 in FIG. 5), the control valve 55D is operated to output a pilot pressure therefrom. This pilot pressure is applied to the pressure-receiving portion 53a of the right traveling pump 53R via the third traveling fluid passage 45c, and to the pressure-receiving portion 53b of the left traveling pump 53L via the second traveling fluid passage 45b. In this manner, the swashplate angles of the left traveling pump 53L and the right traveling pump 53R are changed to rotate the left traveling motor 36L reversely, and to rotate the right traveling motor 36R normally, whereby the working machine 1 spins to turn (spin-turns) leftward.

In addition, when the traveling operation member 59 is swung in an oblique direction, rotation directions and rotation speeds of the left traveling motor 36L and the right traveling motor 36R are determined by a differential pressure between the pilot pressures applied to the pressure-receiving portion 53a and the pressure-receiving portion 53b, so that the working machine 1 pivots to turn rightward or leftward while traveling forward or backward.

That is, when the traveling operation member 59 is swung in a forwardly leftward oblique direction, the working machine 1 turns leftward while traveling forward at a speed corresponding to the swing angle of the traveling operation member 59. When the traveling operation member 59 is swung in a forwardly rightward oblique direction, the working machine 1 turns rightward while traveling forward at a speed corresponding to the swing angle of the traveling operation member 59. When the traveling operation member 59 is swung in a backwardly leftward oblique direction, the working machine 1 turns leftward while traveling backward at a speed corresponding to the swing angle of the traveling operation member 59. When the traveling operation member 59 is swung in a backwardly rightward oblique direction, the working machine 1 turns rightward while traveling backward at a speed corresponding to the swing angle of the traveling operation member 59.

As shown in FIG. 5, the working machine 1 includes a controller 260. The controller 260 performs various controls of the working machine 1 and is constituted of a semiconductor such as a CPU or an MPU, an electrical/electronic circuit, and the like. An accelerator 265, a mode switch 266, a speed shifting switch 267, a measurement device 268, and a plurality of rotation speed detection devices 262 are connected to the controller 60.

The accelerator 265 is disposed in the vicinity of the operator's seat 8 and is capable of setting the target rotation speed of the prime mover 32. The accelerator 265 is an acceleration lever swingably supported, an acceleration pedal swingably supported, an acceleration volume swingably supported, an acceleration slider swingably supported, or the like. The accelerator 265 is not limited to the examples mentioned above.

The rotation speed detection device 262 detects the actual rotation speed of the prime mover 32. The rotation speed detection device 262 allows the controller 260 to know the actual rotation speed of the prime mover 32. Based on an operation amount of the accelerator 265, the controller 260 sets the target rotation speed and controls the actual rotation speed so as to reach the set target rotation speed.

The measurement device 268 is a sensor for measuring a temperature of the hydraulic fluid, and the control device 260 can obtain the temperature of hydraulic fluid measured by the measurement device 268.

The controller 260 performs a manual shifting control to shift the traveling motors (left traveling motor 36L and right traveling motor 36R) to either the first speed stage or the second speed stage according to the operation of the speed shifting switch 267. In the manual shifting control, when the speed shifting switch 267 is shifted to the first speed stage, the traveling motors (left traveling motor 36L and right traveling motor 36R) are shifted to the first speed stage by demagnetizing the solenoid of the second speed shifting valve 72. In addition, in the manual shifting control, when the speed shifting switch 267 is shifted to the second speed stage, the traveling motors (left traveling motor 36L and right traveling motor 36R) are shifted to the second speed stage by magnetizing the solenoid of the second speed shifting valve 72.

The mode switch 266 is a switch configured to be manually operated to activate a first mode. For example, the mode switch 266 is a switch that can be shifted to be ON or OFF, and when being ON, the mode switch 266 activate the first mode, and when being OFF, the mode switch 266 disables the first mode and activates a second mode. That is, the controller 260 is shiftable between the first mode and the second mode that is different from the first mode. The first mode is a mode different from the mode for normal operation (second mode), and is, for example, a mode for increasing a temperature of hydraulic fluid through circulation of the hydraulic fluid in the hydraulic circuit (warm-up mode). The hydraulic system may automatically enter the first mode regardless of whether the mode switch 266 is shifted to be ON or OFF.

The controller 260 is capable of controlling the traveling switching valve 34, and is configured to output a control signal to demagnetize the solenoid of the second speed shifting valve 72 to shift the second speed shifting valve 72 to the first position 72a, and to output a control signal to magnetize the solenoid of the second speed shifting valve 72 to shift the second speed shifting valve 72 to the second position 72b.

As shown in FIG. 5, the hydraulic system for the working machine is a system that is configured to be warmed up with the working machine 1 being braked by the brake 30, the braking change-over valve 31, the traveling switching valve 34, and an actuation valve 269.

The brake 30 is a device configured to brake the traveling motors (left traveling motor 36L and right traveling motor 36R). The brake 30 is shifted, by the pilot fluid (hydraulic fluid) delivered from the first hydraulic pump P1, between a braking state in which the traveling motors (left traveling motor 36L and right traveling motor 36R) are braked and a braking releasing state in which the braking is released.

For example, the brake 30 includes first disks disposed on output shafts of the left traveling motor 36L and the right traveling motor 36R, movable second disks, and springs that bias the second disks toward the sides where the second disks respectively contact to the first disks. In addition, the brake 30 includes housing units (housing cases) 38 that house the first disks, the second disks, and the springs, respectively.

The brake 30 and the braking change-over valve 31 are connected via the fluid passage 100. The braking change-over valve 31 is a solenoid valve that performs the braking and the releasing of braking (brake releasing) in the brake 30, and is a two-position change-over valve shiftable between the first position 31a and the second position 31b. When the braking change-over valve 31 is in the first position 31a, the braking change-over valve 31 sets the pilot pressure acting on the brake 30 (pressure acting on the housing units 38) to a pressure at which the brake 30 can perform the braking, thereby shifting the brake 30 into the braking state. In addition, when the braking change-over valve 31 is in the second position 31b, the braking change-over valve 31 sets the pilot pressure to the pressure for the brake releasing, thereby shifting the brake 30 into the braking releasing state.

The shifting of the braking change-over valve 31 is controlled by the controller 260. For example, the controller 260 outputs a control signal to demagnetize the solenoid of the braking change-over valve 31 to shift the braking change-over valve 31 to the first position 31a In addition, the controller 260 outputs a control signal to magnetize the solenoid of the braking change-over valve 31 to shift the braking change-over valve 31 to the second position 31b. In addition, the output of the control signal from the controller 260 to the braking change-over valve 31 may be performed, for example, with a switch being disposed to be manually operated, or with the controller 260 automatically judging an operation status of the working machine.

Accordingly, when the braking change-over valve 31 is in the first position 31a, the pilot fluid in the housing unit 38 is drained, the second disks move in the direction of the braking, and thus the braking in the brake 30 can be performed. In addition, when the braking change-over valve 31 is in the second position 31b, the pilot fluid is supplied to storage portions of the housing units 38, and the second disks can move in a direction opposite to the braking (opposite to a biasing direction of the springs) to release the braking in the brake 30.

The actuation valve 269 is a valve configured to change a pressure (pilot pressure) of hydraulic fluid (pilot fluid) acting on the traveling pumps (left traveling pump 53L and right traveling pump 53R). In this embodiment, the actuation valve 269 is a valve connected upstream of the operation device 54 via the fluid passage 40a of the drain fluid passage 40.

The actuation valve 269 changes an opening degree thereof to change the pilot pressure (hydraulic pilot pressure acting on the pressure-receiving portions 53a and 53b) of the pilot fluid that operates the traveling pumps (left traveling pump 53L and right traveling pump 53R). For example, the actuation valve 269 is an electromagnetic proportional valve whose opening degree can be changed based on a control signal (e.g., electric voltage, electric current) of the controller 260. The actuation valve 269 is a valve whose opening degree is increased as a value of the control signal (control value) increases and is reduced as the control value reduces.

The controller 260 outputs the control signal to the actuation valve 269 and magnetizes the solenoid of the actuation valve 269, thereby changing the pilot pressure (traveling primary pressure) applied from the actuation valve 269 to the operation device 54. In this manner, the pilot pressure for operating the traveling pumps (left traveling pump 53L and right traveling pump 53R) will be changed.

Figure 6:
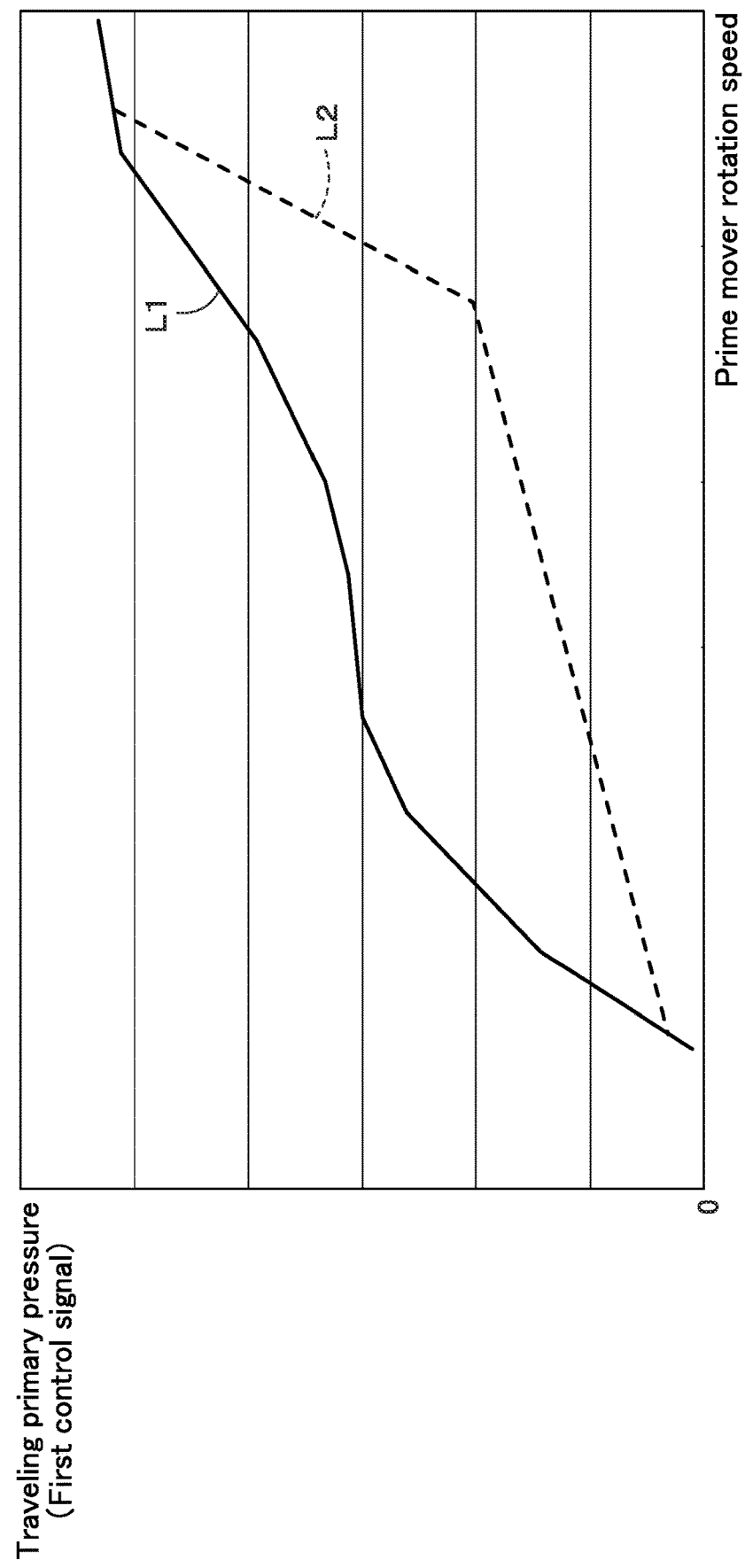
FIG. 6 is a view showing a relationship between a traveling primary pressure and a rotation speed of a prime mover according to the second embodiment.

FIG. 6 is a view showing an example of a control map showing a relationship between the traveling primary pressure and a rotation speed of the prime mover in an anti-stall control. In the control map shown in FIG. 6, since the traveling primary pressure is determined in correspondence with the opening degree of the actuation valve 269, there is a correlation between the traveling primary pressure and the magnitude of the control signal output to the actuation valve 269, and the traveling primary pressure can be replaced by the control signal. That is, the traveling primary pressure on the vertical axis of the control map can be read as a control signal. The control map is stored in a storage unit 263.

The controller 260 calculates a dropping amount which is a difference between the target rotation speed set by the accelerator 265 and the actual rotation speed detected by the rotation speed detection device 262. When the dropping amount is less than a threshold value, the controller 260 sets the control value indicated by the control signal according to a rotation speed of the prime mover (target rotation speed or actual rotation speed) so as to match the line L1 of the control map.

On the other hand, when the dropping amount is not less than a threshold value, the control device 260 sets a control value of the control signal according to a rotation speed of the prime mover (target rotation speed or actual rotation speed) so as to match the line L2 of the control map. That is, the controller 260 sets a control value of a current value, voltage value, or the like based on the control map.

Accordingly, in the anti-stall control, the pilot pressure (traveling primary pressure) of the pilot fluid entering the operation valves 55 can be kept low by setting the control value based on the line L2 and outputting the control signal indicating the control value to the operation valve 269. As a result, the swashplate angles of the traveling pumps (left traveling pump 53L and right traveling pump 53R) are adjusted, a load acting on the prime mover 32 is reduced, and thus the engine stalling can be prevented. In FIG. 6, one line L2 is shown, but there may be multiple lines L2.

In the first mode, the controller 260 shifts the brake 30 to the braking stage, and sets the pilot pressure output from the actuation valve 269 to a predetermined pressure with the traveling switching valve 34 being shifted to the second state. Here, the predetermined pressure is a pressure such that, when the pilot pressure output from the actuation valve 269 acts on the pressure-receiving portions (pressure-receiving portions 53a and 53b) of the traveling pumps (left traveling pump 53L and right traveling pump 53R), the pilot pressure (hydraulic pressure) acting on the pressure-receiving portions (pressure-receiving portions 53a and 53b) becomes larger than zero. In other words, the hydraulic pressure is a pressure by which the pilot pressure acting on the traveling fluid passage 45 becomes larger than zero. In this embodiment, in the first mode, the controller 260, for example, outputs the control signal to the actuation valve 269 to set an opening degree of the actuation valve 269 to a predetermined opening degree, thereby setting the pilot pressure (predetermined pressure) output from the valve 269 to a level not less than the hydraulic pressure at which the traveling pumps (left traveling pump 53L and right traveling pump 53R) are operated. In more detail, the controller 260 sets the pilot pressure output from the actuation valve 269 so that, when the traveling operation member 59 is operated in the first mode, the hydraulic pressure acting on the pressure-receiving portions (pressure-receiving portions 53a and 53b) becomes equal to or larger than the operating pressure.

In starting the prime mover 32, the controller 260 maintains the brake 30 in the braking state and shifts the traveling switching valve 34 to the second state. Specifically, at the starting of the prime mover 32 (in shifting the ignition switch from being OFF to being ON), the brake 30 is maintained in the braking state (the braking change-over valve 31 is held to be in the first position 31a). In addition, when a rotation speed of the prime mover 32 becomes a predetermined speed or more at the starting of the prime mover 32, the controller 260 automatically activates the first mode to shift the traveling switching valve 34 to the second state (to shift the second speed shifting valve 72 to the second position 72b). After the traveling switching valve 34 is shifted to be in the second state, the pilot pressure output from the actuation valve 269 is set at a predetermined pressure.

In the state in which the first mode is disabled (second mode), when the brake 30 is in the braking releasing state and the traveling switching valve 34 is in the first state, the controller 260 hold the braking change-over valve 31 at the first position 31a to shift the brake 30 from the braking releasing state to the braking state (to shift the braking change-over valve 31 from the from the second position 31b to the first position 31a) when the mode is shifted from the second mode to the first mode, and the controller 260 sets the pilot pressure output from the actuation valve 269 to be a predetermined pressure after shifting the traveling switching valve 34 from the first state to the second state (after shifting the second speed shifting valve 72 from the first position 72a to the second position 72b).

In a case where the first mode is canceled, when a driver (operator) operates the mode switch 266 to disable the first mode (second mode), for example, in the first mode after starting the prime mover 32, the controller 260 sets the pilot pressure output from the actuation valve 269 to be less than the predetermined pressure, and shifts the brake 30 from the braking state to the braking releasing state (shifts the braking change-over valve 31 from the first position 31a to the second position 31b) after the traveling switching valve 34 is shifted from the second state to the first state (after the second speed shifting valve 72 is shifted from the second position 72b to the first position 72a).

The controller 260 may selectively activate the first mode and the second mode (in which the first mode is disabled) based on a temperature of hydraulic fluid. For example, when the temperature of hydraulic fluid measured by the measurement device 268 is low and is in a temperature range in which viscosity of the hydraulic fluid is high, the controller 260 activates first mode at a switching temperature, and activates the second mode when the temperature of hydraulic fluid is high and is in a temperature range in which the viscosity of the hydraulic fluid is low. In the first mode, the controller 260 may set a larger predetermined pressure as the temperature of hydraulic fluid becomes lower. In other words, the controller 260 may set the pilot pressure output from the actuation valve 269 when the temperature of hydraulic fluid is the switching temperature (the temperature at which the mode is shifted from the second mode to the first mode) to be the minimum pressure that is greater than zero, and as the temperature of hydraulic fluid becomes lower and lower than the switching temperature, the pilot pressure output from the actuation valve 269 is gradually increased from the minimum pressure.

In the above-described embodiment, the left traveling motor 36L and the right traveling motor 36R are configured to be simultaneously shifted to the first speed or the second speed, and also activate the first mode simultaneously for the left traveling motor 36L and the right traveling motor 36R; however, the first mode may be activated under a state where at least one of the left traveling motor 36L or the right traveling motor 36R is shifted to the first speed or the second speed, and at least one of the left traveling motor 36L and the right traveling motor 36R is shifted to the second speed.

In the above-described embodiment, the second speed shifting valve 72 is a change-over valve; however, the second speed shifting valve 72 may be a proportional valve, or any other valve, and is not limited thereto.

Figure 7:
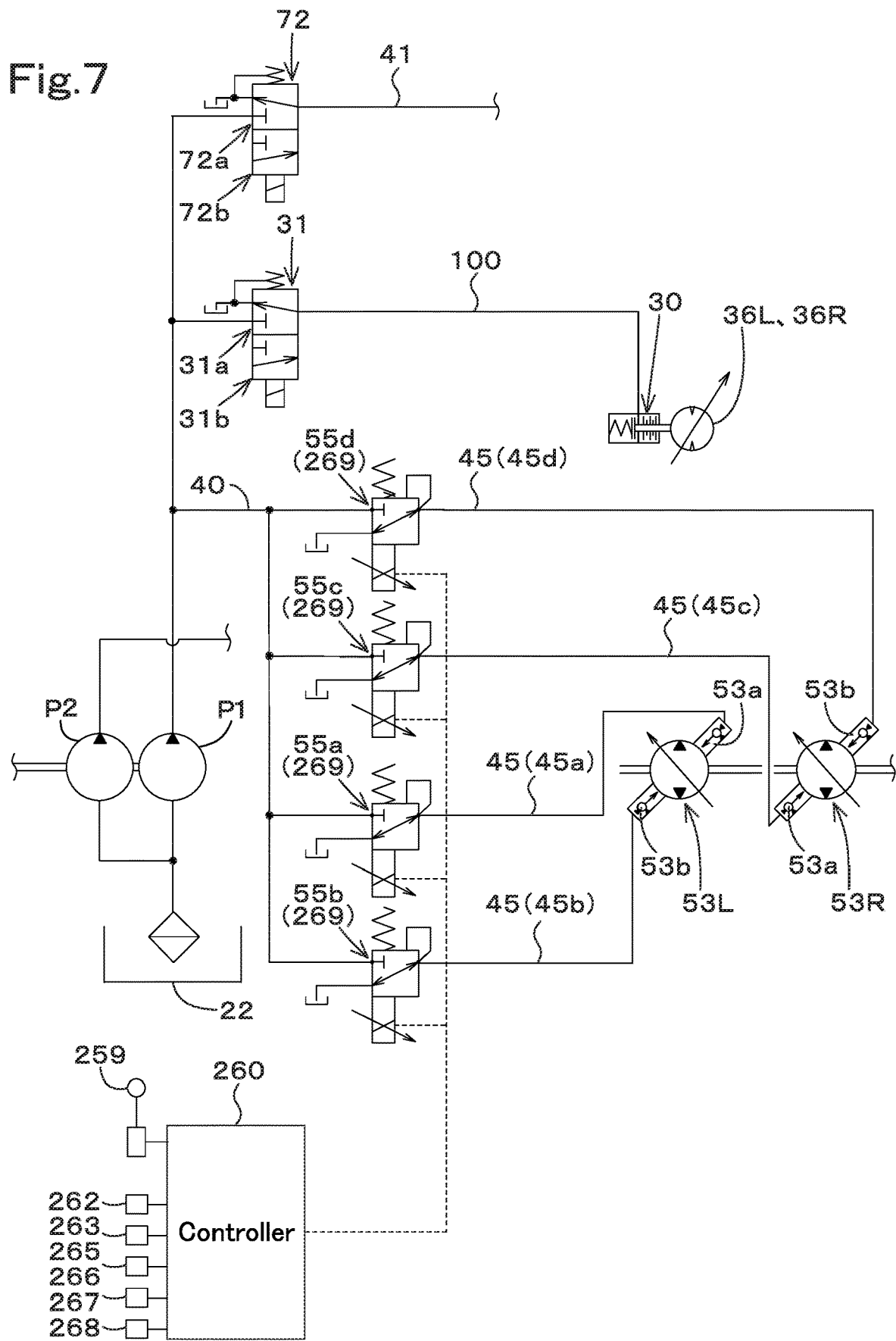
FIG. 7 is a view showing a modified example of a case where an operation valve functions as an actuation valve according to the second embodiment.

In the above-described embodiment, the traveling operation device 54 is a hydraulic type that changes, with the operation valve 55, a pilot pressure acting on the traveling pumps (left traveling pump 53L and right traveling pump 53R); however, as shown in FIG. 7, the traveling operation device 54 may be an electrically-operable device.

As shown in FIG. 7, the traveling operation device 54 includes the operation member 59 that swings in the lateral direction (machine width direction) or the fore-and-aft direction, and the operation valves 55 (operation valves 55a, 55b, 55c, and 55d) each constituted of an electromagnetic proportional valve. The controller 260 is connected to an operation detection sensor that detects an operation amount and operational direction of the operation member 59. The controller 260 controls the operation valves 55 (operation valves 55a, 55b, 55c, and 55d) based on the operation amount and operational direction detected by the operation detection sensor.

When the operation member 59 is operated forward (a direction A1, see FIG. 5) in the second mode, the controller 260 outputs a control signal to the operation valve 55a and the operation valve 55c to swing the swashplates of the left traveling pump 53L and the right traveling pump 53R in a direction of normal rotation (forward traveling).

When the operation member 59 is operated backward (a direction A2, see FIG. 5) in the second mode, the controller 260 outputs a control signal to the operation valve 55b and the operation valve 55d to swing the swashplates of the left traveling pump 53L and the right traveling pump 53R in a direction of reverse rotation (backward traveling).

When the operation member 59 is operated rightward (direction A3, see FIG. 5) in the second mode, the controller 260 outputs a control signal to the operation valve 55a and the operation valve 55d to swing the swashplate of the left traveling pump 53L in the direction of forward rotation and to swing the swashplate of the right traveling pump 53R in the direction of reverse rotation.

When the operation member 59 is operated leftward (direction A4, see FIG. 5) in the second mode, the controller 260 outputs a control signal to the operation valve 55b and the operation valve 55c to swing the swashplate of the left traveling pump 53L in the direction of reverse rotation and to swing the swashplate of the right traveling pump 53R in the direction of forward rotation.

The controller 260 sets the pilot pressure output from the operation valves 55 (operation valves 55A, 55B, 55C, and 55D) to a predetermined pressure in the first mode. That is, in FIG. 7, the operation valves 55 (operation valves 55A, 55B, 55C, and 55D) operate as the actuation valve 269 in the first mode, and are actuated in response to an operation of the operation member 59 in the second mode. That is, in FIG. 7, the operation valves 55 functions as the actuation valve 269. In FIG. 7, operations of the braking change-over valve 31 and the second speed shifting valve 72 are similar to those in the above-described embodiment. In addition, in a case where the operation valves 55 (operation valves 55A, 55B, 55C, and 55D) operate as the actuation valves 269, the operations of the operation valves 55 (operation valves 55A, 55B, 55C, and 55D) are similar to those of the above-described actuation valves 269. In a case where the operation valves 55 (operation valves 55A, 55B, 55C, and 55D) operate as the operation valves 269, it is sufficient that at least one of the operation valves 55A, 55B, 55C, and 55D is operated as the operation valve 269, and it is not necessary that all of the operation valves 55A, 55B, 55C, and 55D are operated as the operation valves 269. For example, in the first mode, the operation valve 55A and the operation valve 55C operate as the operation valves 269, while the other operation valves 55B and 55D do not operate (are held fully closed).

Figure 8:
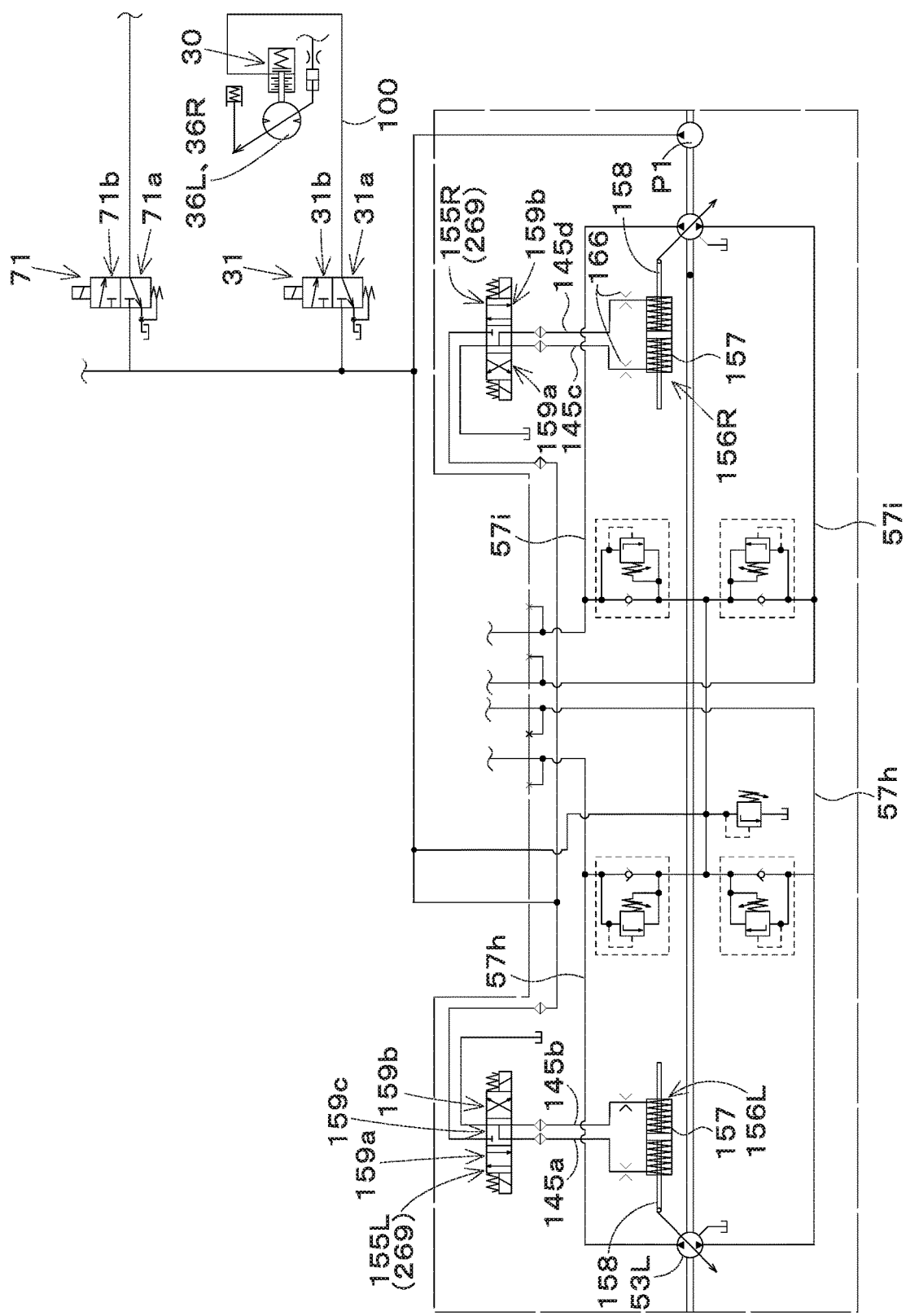
FIG. 8 is a view showing a modified example different from the example of FIG. 7 according to the second embodiment.

FIG. 8 shows a modified example of the hydraulic system for the working machine. As shown in FIG. 8, the hydraulic system for the working machine includes operation valves 155L and 155R.

The traveling pumps (left traveling pump 53L and right traveling pump 53R) include regulators 156L and 156R. The regulators 156L and 156R are capable of changing the angles of the swashplates (swashplate angles) of the left traveling pump 531_, and the right traveling pump 53R, and include supply chambers 157 to which hydraulic fluid can be supplied, and piston rods 158 disposed in the supply chambers 157. The piston rods 158 are connected to the swashplates, and the swashplate angles can be changed by actuation of the piston rods 158.

The operation valve 155L is a valve that operates the regulator 156L, that is, a valve that controls hydraulic fluid supplied to the left traveling pump 53L. The operation valve 155L is a solenoid valve. A spool thereof moves based on the control signal given from the controller 260 to the solenoid, and an opening degree thereof is changed by movement of the spool. In addition, the operation valve 155L is shiftable between a first position 159a, a second position 159b, and a neutral position 159c.

A first port of the operation valve 155L is connected to the supply chamber 157 of the regulator 156L by the first traveling fluid passage 145a. A second port of the operation valve 155L is connected to the supply chamber 157 of the regulator 156L by the second traveling fluid passage 145b.

The operation valve 155R is a valve that operates the regulator 156R, that is, a valve that controls hydraulic fluid supplied to the right traveling pump 53R. The operation valve 155R is a solenoid valve. A spool thereof moves based on the control signal given from the controller 260 to the solenoid, and an opening degree thereof is changed by movement of the spool. In addition, the operation valve 155R is shiftable between the first position 159a, the second position 159b, and the neutral position 159c.

A first port of the operation valve 155R is connected to the supply chamber 157 of the regulator 156L by the third traveling fluid passage 145c. A second port of the operation valve 155L is connected to the supply chamber 157 of the regulator 156L by the fourth traveling fluid passage 145d.

When the operation valve 155L and the operation valve 155R are shifted to the first position 159a, the swashplates of the left traveling pump 53L and the right traveling pump 53R rotate normally, and when the operation valve 155L and the operation valve 155R are shifted to the second position 159b, the swashplates of the left traveling pump 53L and the right traveling pump 53R rotate reversely. When the operation valve 155L is shifted to the first position 159a and the operation valve 155R is shifted to the second position 159b, the swashplate of the left traveling pump 53L rotates normally and the swashplate of the right traveling pump 53R rotates reversely. When the operation valve 155L is shifted to the second position 159b and the operation valve 155R is shifted to the first position 159a, the swashplate of the left traveling pump 53L rotates reversely and the swashplate of the right traveling pump 53R rotates normally. Accordingly, the operation valve 155L and the operation valve 155R can shift the swashplates of the left traveling pump 53L and the right traveling pump 53R to either rotate normally or rotate reversely. The operation valve 155L and the operation valve 155R operate as the actuation valves 269 in the first mode. Similar to the above-described embodiment, the controller 260 outputs a control signal to the operation valve 155L and the operation valve 155R in the first mode, and sets the pilot pressures output from the operation valve 155L and the operation valve 155R to be predetermined pressures. When the operation valve 155L and the operation valve 155R operate as the actuation valves 269, the same operations as those of the above-described embodiment is performed. When the operation valve 155L and the operation valve 155R operate in response to the operation of the operation member 59 in the second mode.

The working machine 1 includes the prime mover 32, the traveling devices (traveling devices 5L and 5R), the traveling motors (left traveling motor 36L and right traveling motor 36R) configured to output power to the traveling devices (traveling devices 5L and 5R), the traveling pumps (left traveling pump 53L and right traveling pump 53R) configured to supply hydraulic fluid when a hydraulic pressure is applied to the traveling pumps (left traveling pump 53L and right traveling pump 53R), the circulation fluid passages (first circulation fluid passage 57h and second circulation fluid passage 57i) fluidly connecting the traveling pumps (left traveling pump 53L and right traveling pump 53R) to the traveling motors (left traveling motor 36L and right traveling motor 36R), the traveling switching valve 34 shiftable between the first state corresponding to the first speeds of the traveling motors (left traveling motor 36L and right traveling motor 36R) and the second state corresponding to the second speeds of the traveling motors faster than the first speeds, the brake 30 shiftable between the braking state to brake the traveling motors (left traveling motor 36L and right traveling motor 36R) and the braking releasing state to release the braking, the actuation valve 269 configured to output the hydraulic pressure applied to the traveling pumps (left traveling pump 53L and right traveling pump 53R), and change the hydraulic pressure output therefrom, and the controller 260 configured or programmed to control the traveling switching valve 34, the brake 30 and the actuation valve 269, and being capable of activate the first mode. The controller 260, when activating the first mode, is configured or programmed to shift the brake 30 into the braking state, shift the traveling switching valve 34 into the second state, and control the actuation valve 269 so as to set the hydraulic pressure output from the actuation valve 269 to a predetermined pressure. According to this configuration, by shifting the brake 30 to the braking state and the traveling switching valve 32 to the second state, the working machine 1 (machine body 2) is set to be immovable, and then hydraulic fluid output from the actuation valve 269 is set to be a predetermined pressure, thereby circulating more hydraulic fluid and warming up the hydraulic system quickly.

When the prime mover 32 is started, the controller 260 is configured or programmed to keep the brake 30 in the braking state, and shift the traveling switching valve 34 into the second state. According to this configuration, the warm-up can be performed efficiently before starting work after the prime mover 32 is started.

When the first mode is activated while the brake 30 is in the braking release state and the traveling switching valve 34 is in the first state, the controller 260 is configured or programmed to shift the brake 30 from the braking release state to the braking state, and shift the traveling switching valve 34 from the first state to the second state, and to control the actuation valve 269 so as to make the hydraulic pressure output from the actuation valve 269 equal to the predetermined pressure after the brake 30 is shifted from the braking release state to the braking state and the traveling switching valve 34 is shifted from the first state to the second state. According to this configuration, the warm-up can be performed after the working machine 1 is stopped to be immovable from a state in which the working machine 1 can travel. That is, the warm-up can be performed quickly after the working machine 1 is stopped in the middle of work (traveling).

The controller 260, when canceling the first mode, is configured or programmed to control the actuation valve 269 so as to reduce the hydraulic pressure output from the actuation valve 269 to a value less than the predetermined pressure, and shift the traveling switching valve 34 from the second state to the first state, and to shift the brake 30 from the braking state to the braking release state after the hydraulic pressure is reduced to the value less than the predetermined pressure and the traveling switching valve 34 is shifted from the second state to the first state. According to this configuration, since the traveling switching valve 34 is shifted to the first state after the pressure is reduced such that the traveling pump does not operate, and the brake 30 is shifted from the braking state to the braking releasing state, the hydraulic system can quickly shift to a state to allow the traveling without applying a load to the traveling system in releasing the warm-up.

When the first mode is activated, the controller 260 is configured or programmed to set the predetermined pressure to a value equal to or greater than the hydraulic pressure for activating the traveling pumps (left traveling pump 53L and right traveling pump 53R). According to this configuration, the warm-up can be performed by operating the traveling pumps (left traveling pump 53L and right traveling pump 53R) with the actuation valves 269 after the working machine 1 (machine body 2) is stopped to be immovable, that is, by moving the swashplates of the traveling pumps (left traveling pump 53L and right traveling pump 53R) from the neutral position.

The working machine 1 includes the measurement device 268 configured to detect a temperature of the hydraulic fluid. The controller 260 is configured or programmed to activate the warm-up mode as the first mode when the temperature of the hydraulic fluid measured by the measurement device 268 becomes a predetermined value or less. According to this configuration, even when a temperature of hydraulic fluid is low and viscosity of the hydraulic fluid is high, the hydraulic system can be warmed up quickly.

The controller 260 is configured or programmed to set the predetermined pressure to a value that increases according to reduction of a temperature of the hydraulic fluid. According to this configuration, as the viscosity of hydraulic fluid increases, a circulation rate of hydraulic fluid during the warm-up can be increased, thereby shortening the warm-up time.

The traveling pump may be an axial piston pump, a radial piston pump, or any pump that is driven by hydraulic fluid. In addition, the traveling switching valve may be any valve to operate the traveling pump, and is not limited thereto.

Third Embodiment

Figure 9:
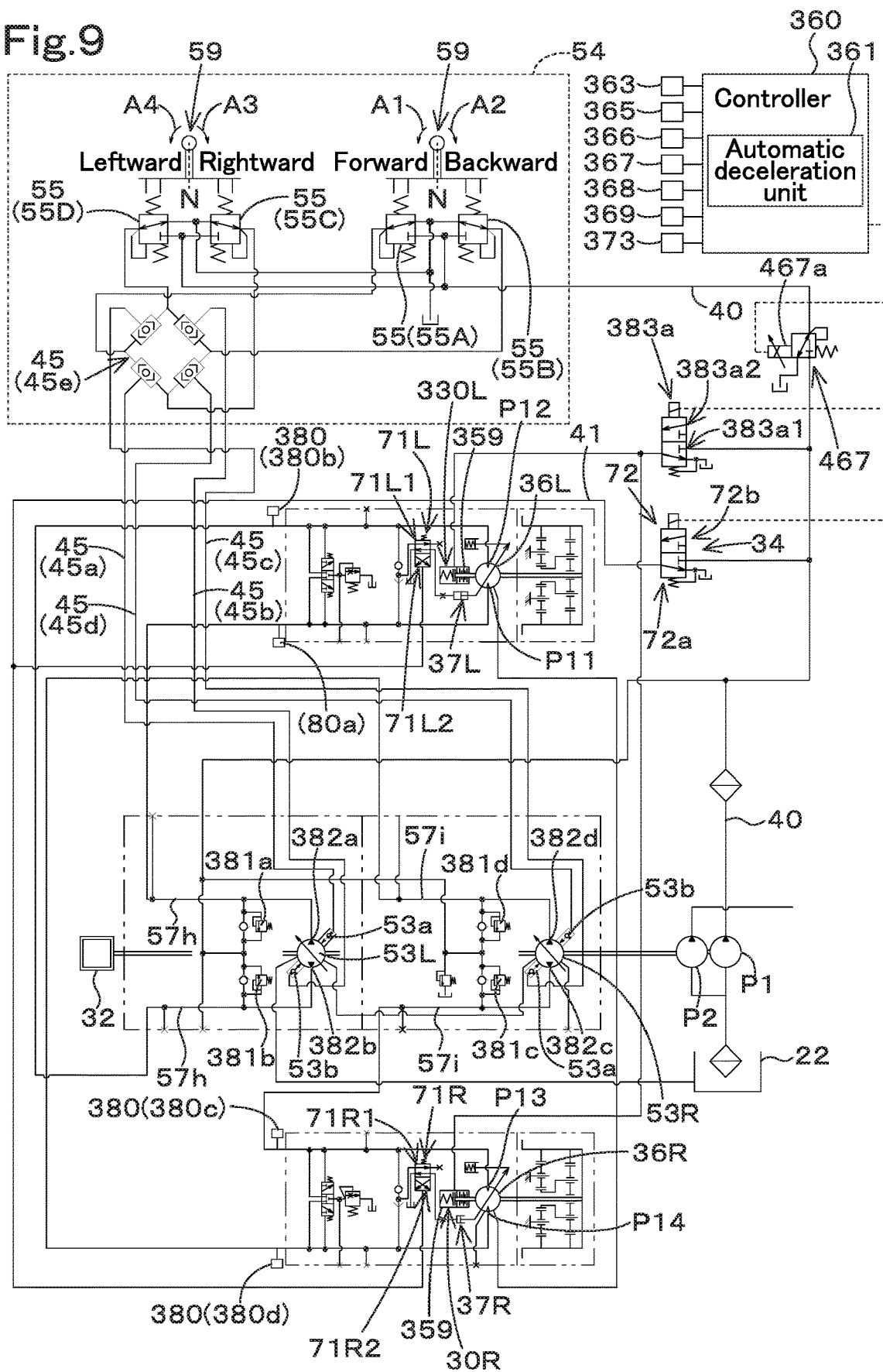
FIG. 9 is a view showing a hydraulic system (hydraulic circuit) for a working machine according to a third embodiment of the invention.

Next, referring to FIG. 9, a third embodiment of the invention will be described. FIG. 9 is a view showing a part of the hydraulic system (hydraulic circuit) for the working machine according to the third embodiment of the invention. In this embodiment, components similar to those described in the first and second embodiments are represented with the same reference numerals, and descriptions thereof are omitted.

Referring to FIG. 9, a hydraulic system for the working machine according to the embodiment will be described.

As shown in FIG. 9, the hydraulic system for the working machine includes the first hydraulic pump P1 and the second hydraulic pump P2. The first hydraulic pump P1 is a pump configured to be driven by power of the prime mover 32 and includes a constant displacement gear pump. The first hydraulic pump P1 is capable of delivering hydraulic fluid stored in a tank 22. Specifically, the first hydraulic pump P1 delivers hydraulic fluid that is mainly used for control. For convenience of explanation, the tank 22 that stores hydraulic fluid may be referred to as a hydraulic fluid tank. In addition, of the hydraulic fluid delivered from the first hydraulic pump P1, the hydraulic fluid used for control is referred to as pilot fluid, and a pressure of the pilot fluid is referred to as a pilot pressure.

The second hydraulic pump P2 is a pump to be driven by power of the prime mover 32, and includes a constant displacement gear pump. The second hydraulic pump P2 is capable of delivering hydraulic fluid stored in the tank 22 and, for example, supplies the hydraulic fluid to fluid passages of the working system. For example, the second hydraulic pump P2 supplies hydraulic fluid to control valves (flow-rate control valves) that control the boom cylinders 14 for operating the booms 10, the bucket cylinders 15 for operating the bucket, and an auxiliary hydraulic actuator for operating the auxiliary hydraulic actuator.

In addition, the hydraulic system for the working machine includes a pair of traveling motors 36L and 36R and a pair of traveling pumps 53L and 53R. The pair of traveling motors 36L and 36R output power transmitted to the pair of traveling devices 5L and 5R. Of the pair of traveling motors 36L and 36R, the traveling motor 36L transmits rotational power to the traveling device (left traveling device) 5L, and the traveling motor 36R transmits rotational power to the traveling device (right traveling device) 5R.

The pair of traveling pumps 53L and 53R are pumps to be driven by power of the prime mover 32 and are variable displacement axial pumps with respective swashplates, for example. The pair of traveling pumps 53L and 53R are driven to supply hydraulic fluid respectively to the pair of traveling motors 36L and 36R. Of the pair of traveling pumps 53L and 53R, the traveling pump 53L supplies the hydraulic fluid to the traveling pump 53L, and the traveling pump 53R supplies the hydraulic fluid to the traveling pump 53R.

For convenience of explanation, the traveling pump 53L may be referred to as a left traveling pump 53L, the traveling pump 53R may be referred to as a right traveling pump 53R, the traveling motor 36L may be referred to as a left traveling motor 36L, and the traveling motor 36R may be referred to as a right traveling motor 36R.

Each of the left traveling pump 53L and the right traveling pump 53R has a pressure-receiving portion 53a and a pressure-receiving portion 53b to which a pressure (pilot pressure) of the hydraulic fluid (pilot fluid) from the first hydraulic pump P1 is applied, and angles of the swashplates are changed by the pilot pressures applied to the pressure-receiving portions 53a and 53b. By changing an angle of each of the swashplates, an output (delivery amount of hydraulic fluid) and a hydraulic fluid delivery direction of each of the left and right traveling pumps 53L and 53R can be changed.

Here, the pressure-receiving portion 53a and the pressure-receiving portion 53b of the left traveling pump 53L are collectively referred to as the first pressure-receiving portion. In addition, the pressure-receiving portion 53a and the pressure-receiving portion 53b of the right traveling pump 53R are collectively referred to as the second pressure-receiving portion.

The left traveling pump 53L has a first port 382a that delivers hydraulic fluid when the first swashplate rotates normally, and a second port 382b that delivers hydraulic fluid when the first swashplate rotates reversely. The right traveling pump 53R has a third port 382c that delivers hydraulic fluid when the second swashplate rotates normally and a fourth port 382*d* that delivers hydraulic fluid when the second swashplate rotates reversely.

The first port 382*a* and the second port 382*b* of the left traveling pump 53L are connected to the left traveling motor 36L by the connecting fluid passage (first circulation fluid passage) 57*h*, and the hydraulic fluid delivered by the left traveling pump 53L is supplied to the left traveling motor 36L. The third port 382*c* and the fourth port 382*d* of the right traveling pump 53R are connected to the right traveling motor 36R by the connecting fluid passage (second circulation fluid passage) 57*i*, and the hydraulic fluid delivered by the right traveling pump 53R is supplied to the right traveling motor 36R.

A first relief valve 381*a* is connected to the connecting fluid passage 57*h*, that is, to the fluid passage on the first port 382*a* side of the left traveling pump 53L, and a second relief valve 381*b* is connected to the fluid passage on the second port 382*b* side of the left traveling pump 53L. For example, the first relief valve 381*a* is likely to be activated when the pressure acting on the connecting fluid passage 57*h* is increased by the normal rotation of the first swashplate of the left traveling pump 53L, and the second relief valve 381*b* is likely to be activated when the pressure acting on the connecting fluid passage 57*h* is increased by the reverse rotation of the first swashplate of the left traveling pump 53L.

A third relief valve 381*c* is connected to the connecting fluid passage 57*i*, that is, the fluid passage on the third port 382*c* side of the right traveling pump 53R, and a fourth relief valve 381*d* is connected to the fluid passage on the fourth port 382*d* side of the right traveling pump 53R. For example, the third relief valve 381*c* is likely to be activated when the pressure acting on the connecting fluid passage 57*i* is increased by the normal rotation of the second swashplate of the right traveling pump 53R, and the fourth relief valve 381*d* is likely to be activated when the pressure acting on the connecting fluid passage 57*i* is increased by the reverse rotation of the second swashplate of the right traveling pump 53R.

The left traveling motor 36L can be rotated by hydraulic fluid delivered from the left traveling pump 53L, and at a rotation speed (number of rotations) variable according to a flow rate of the hydraulic fluid. The swashplate change-over cylinder 37L is connected to the left traveling motor 36L, so that a rotation speed (number of rotations) of the left traveling motor 36L can also be changed by extending or contracting the swashplate change-over cylinder 37L in either one of opposite directions. That is, when the swashplate change-over cylinder 37L is contracted, a rotation speed of the left traveling motor 36L is set at the low speed (first speed), and when the swashplate change-over cylinder 37L is extended, a rotation speed of the left traveling motor 36L is set at the high speed (second speed). That is, the rotation speed of the left traveling motor 36L is shiftable between the first speed that is the low speed stage and the second speed that is the high speed stage.

The right traveling motor 36R can be rotated by hydraulic fluid delivered from the right traveling pump 53R, and at a rotation speed (number of rotations) variable according to a flow rate of the hydraulic fluid. The swashplate change-over cylinder 37R is connected to the right traveling motor 36R, so that a rotation speed (number of rotations) of the right traveling motor 36R can also be changed by extending or contracting the swashplate change-over cylinder 37R in either one of opposite directions. That is, when the swashplate change-over cylinder 37R is contracted, a rotation speed of the right traveling motor 36R is set at the low speed (first speed), and when the swashplate change-over cylinder 37R is extended, a rotation speed of the right traveling motor 36R is set at the high speed (second speed). That is, the rotation speed of the right traveling motor 36L is shiftable between the first speed that is the low speed stage and the second speed that is the high speed stage.

As shown in FIG. 9, the hydraulic system for the working device includes the traveling switching valve 34. The traveling switching valve 34 is shiftable between the first state where rotation speeds (numbers of rotations) of the traveling motors (left traveling motor 36L and the right traveling motor 36R) are each set at the first speed stage and the second state where rotation speeds of the traveling motors are each set at the second speed stage. The traveling switching valve 34 includes first speed shifting valve 71L and 71R and a second speed shifting valve 72.

The first shifting valve 71L is connected via a fluid passage to the swashplate change-over cylinder 37L of the left traveling motor 36L, and is configured as a two-position change-over valve shiftable between a first position 71L1 and a second position 71L2. The first shifting valve 71L, when set at the first position 71L1, contracts the swashplate change-over cylinder 37L, and when set at the second position 71L2, extends the swashplate change-over cylinder 37L.

The first shifting valve 71R is connected via a fluid passage to the swashplate change-over cylinder 37R of the right traveling motor 36R, and is configured as a two-position change-over valve shiftable between a first position 71R1 and a second position 71R2. The first shifting valve 71R, when set at the first position 71L1, contracts the swashplate change-over cylinder 37R, and when set at the second position 71R2, extends the swashplate change-over cylinder 37R.

The second shifting valve 72 is a solenoid valve that shifts the first shifting valve 71L and the first shifting valve 71R, and is configured as a two-position change-over valve shiftable based on magnetization between a first position 72*a* and a second position 72*b*. The second shifting valve 72, the first shifting valve 71L and the first shifting valve 71R are connected by a fluid passage 41. The second shifting valve 72, when set at the first position 72*a*, shifts the first shifting valve 71L and the first shifting valve 71R to the first positions 71L1 and 71R1, and when set at the second position 72*b*, shifts the first shifting valve 71L and the first shifting valve 71R to the second positions 71L2 and 71R2.

That is, when the traveling switching valve 34 is shifted to the first state, the second shifting valve 72 is shifted to the first position 72*a*, the first shifting valve 71L is shifted to the first position 71L1, the first shifting valve 71R is shifted to the first position 71R1, and the rotation speed stages of the traveling motors (left traveling motor 36L and right traveling motor 36R) are shifted to the first speed stage. In addition, when the traveling switching valve 34 is shifted to the second state, the second shifting valve 72 is shifted to the second position 72*b*, the first shifting valve 71L is shifted to the second position 71L2, and the first shifting valve 71R is shifted to the second position 71R2, and the rotation speed stages of the traveling motors (left traveling motor 36L and right traveling motor 36R) are shifted to the second speed stage.

In the above-described configuration, the traveling switching valve 34 allows the traveling motors (left traveling motor 36L and right traveling motor 36R) to be shifted between the first speed, which is the low speed stage, and the second speed, which is the high speed stage.

As shown in FIG. 9, the hydraulic system for the working machine according to the present embodiment includes a brake mechanism (braking device) 30R and 30L. The brake mechanism 330R is capable of braking the right traveling device 5R, that is, capable of stopping rotation of the right traveling motor 36R which is an HST motor or rotation of output shafts rotating according to rotation of the HST motor 36R. The brake mechanism 330R is shifted to the braking state in which the right traveling motor 36R is braked or to the braking releasing state in which the braking is released by the pilot fluid (hydraulic fluid) delivered from the first hydraulic pump P1.

For example, the brake mechanism 330R includes a first disc disposed on the output shaft of the right traveling motor 36R, a movable second disc, and a spring that biases the second disc toward a direction to contact to the first disc. In addition, the brake mechanism 330 includes the housing unit (housing case) 359 that houses the first disc, the second disc and the spring. This housing unit 359, in which the second disc is housed, and the brake change-over valve 380$a$ are connected via a fluid passage as described below.

The brake change-over valve 380$a$ is a solenoid valve for braking and releasing the braking (braking releasing) in the brake mechanism 330R, and is a two-position change-over valve shiftable between the first position 383$a$1 and the second position 383$a$2. When the brake change-over valve 380$a$ is in the first position 383$a$1, the brake change-over valve 380$a$ sets a pressure of hydraulic fluid acting on the brake mechanism 330R (pressure acting on the housing unit 359) to a pressure at which the brake mechanism 330R can perform the braking. In addition, when the brake change-over valve 380$a$ is shifted to the second position 383$a$2, a pressure of hydraulic fluid is set at a pressure to release the braking.

The shifting of the brake change-over valve 380$a$ is controlled by a controller 360. For example, the controller 360 outputs a control signal to demagnetize the solenoid of the brake change-over valve 380$a$ to shift the brake change-over valve 380$a$ to the first position 383$a$1. In addition, the controller 360 outputs a control signal to magnetize the solenoid of the brake change-over valve 380$a$ to shift the brake change-over valve 380$a$ to the second position 383$a$2. In addition, a switch disposed on the working machine 1 may be used as a trigger for allowing the control device 360 to output a control signal to the brake change-over valve 380$a$. When an operator manually operates the switch, the control device 360 can detect an operation of the switch and output the control signal. In addition, the controller 90 may judge an operation state of the working machine and then automatically output the control signal.

Accordingly, when the brake change-over valve 380$a$ is taking the first position 383$a$1, the pilot fluid in the storage portion of the housing unit 359 is drained, the second disk moves in a direction of the braking, and the brake mechanism 330 can perform the braking. In addition, in the case where the brake change-over valve 380$a$ is taking the second position 383$a$2, the pilot fluid is supplied to the storage portion of the housing unit 359, and the second disc moves in the opposite direction of the braking (opposite to the biasing direction of the spring) to release the braking in the brake mechanism 330.

The configuration of the brake mechanism 330L is similar to that of the brake mechanism 330R. Accordingly, since the brake mechanism 330R and the related configurations described above can be read as the brake mechanism 330L and the related configurations, the description of the configuration of the brake mechanism 330L is omitted.

The operation device (traveling operation device) 54 is configured to apply hydraulic fluid to the pressure-receiving portions 53$a$ and 53$b$ of the traveling pumps (left traveling pump 53L and right traveling pump 53R) when the traveling operation member 59 is operated, and is capable of changing the angles of swashplates (swashplate angles) of the traveling pumps. The operation device 54 includes the traveling operation member 59 and the plurality of operation valves 55 (also referred to as actuation valves 55). The plurality of operation valves 55 include the operation valve 55A, the operation valve 55B, the operation valve 55C, and the operation valve 55D.

The traveling operation member 59 is an operation lever that is supported on the operation valves (actuation valves) 55 and swings in a lateral direction (machine width direction) or the fore-and-aft direction. That is, the traveling operation member 59 is operable to the right and to the left from a neutral position N, and to the front and to the rear from the neutral position N. In other words, the traveling operation member 59 is swingable in at least four directions from the neutral position N. For convenience of explanation, the forward and backward directions, that is, opposite fore-and-aft directions, may be referred to as first directions. In addition, the rightward and leftward directions, that is, opposite lateral directions (opposite machine width directions), are may be referred to as second directions.

In addition, the plurality of operation valves 55 are operated by the common, i.e., single, traveling operation member 59. The plurality of operation valves 55 are actuated according to swinging of the traveling operation member 59. The delivery fluid passage 40 is connected to the plurality of operation valves 55, so that hydraulic fluid (pilot fluid) from the first hydraulic pump P1 can be supplied to the operation valves 55 through the delivery fluid passage 40.

When the traveling operation member 59 is swung forward (that is, in one of the opposite fore-and-aft directions (or in one of the opposite first directions)), i.e., when a forward operation is performed, the operation valve 55A outputs hydraulic fluid having a pressure variable according to an operation amount (operation) of the forward operation. When the traveling operation member 59 is swung backward (that is, in the other of the opposite fore-and-aft directions (or in the other of the opposite first directions)), i.e., when a backward operation is performed, the operation valve 55B outputs hydraulic fluid having a pressure variable according to an operation amount (operation) of the backward operation.

When the traveling operation member 59 is swung rightward (that is, in one of the opposite lateral directions (or in one of the opposite second directions)), i.e., when a rightward operation is performed, the operation valve 55C outputs hydraulic fluid having a pressure variable according to an operation amount (operation) of the rightward operation. When the traveling operation member 59 is swung leftward (that is, in the other of the opposite lateral directions (or in the other of the opposite second directions)), i.e., when a leftward operation is performed, the operation valve 55D outputs hydraulic fluid having a pressure variable according to an operation amount (operation) of the leftward operation.

The plurality of operation valves 55 are connected to the swashplates (first swashplate and second swashplate) of the traveling pumps (left traveling pump 53L and right traveling pump 53R) by the traveling fluid passage 45. In other words, the traveling pumps (left traveling pump 53L and right traveling pump 53R) are hydraulic equipment that are configured to be operated by hydraulic fluid output from the operation valves 55 (operation valve 55A, operation valve 55B, operation valve 55C, and operation valve 55D).

The traveling fluid passage 45 includes a first traveling fluid passage 45*a*, a second traveling fluid passage 45*b*, a third traveling fluid passage 45*c*, a fourth traveling fluid passage 45*d*, and a fifth traveling fluid passage 45*e*. The first traveling fluid passage 45*a* is a fluid passage connected to the pressure-receiving portion (first pressure-receiving portion) 53*a* of the left traveling pump 53L, and is a fluid passage through which hydraulic fluid to be applied to the pressure-receiving portion (first pressure-receiving portion) 53*a* flows when the traveling operation member 59 is operated. The second traveling fluid passage 45*b* is a fluid passage connected to the pressure-receiving portion (second pressure-receiving portion) 53*b* of the left traveling pump 53L, and is a fluid passage through which hydraulic fluid to be applied to the pressure-receiving portion (the second pressure-receiving portion) 53*b* flows when the traveling operation member 59 is operated.

The third traveling fluid passage 45*c* is a fluid passage connected to the pressure-receiving portion (third pressure-receiving portion) 53*a* of the right traveling pump 53R, and is a fluid passage through which hydraulic fluid to be applied to the pressure-receiving portion (third pressure-receiving portion) 53*a* flows when the traveling operation member 59 is operated. The fourth traveling fluid passage 45*d* is a fluid passage connected to the pressure-receiving portion (fourth pressure-receiving portion) 53*b* of the right traveling pump 53R, and is a fluid passage through which hydraulic fluid to be applied to the pressure-receiving portion (fourth pressure-receiving portion) 53*b* flows when the traveling operation member 59 is operated. The fifth traveling fluid passage 45*e* is a fluid passage that connects the operation valves 55 to the first traveling fluid passage 45*a*, the second traveling fluid passage 45*b*, the third traveling fluid passage 45*c*, and the fourth traveling fluid passage 45*d*.

Figure 10:
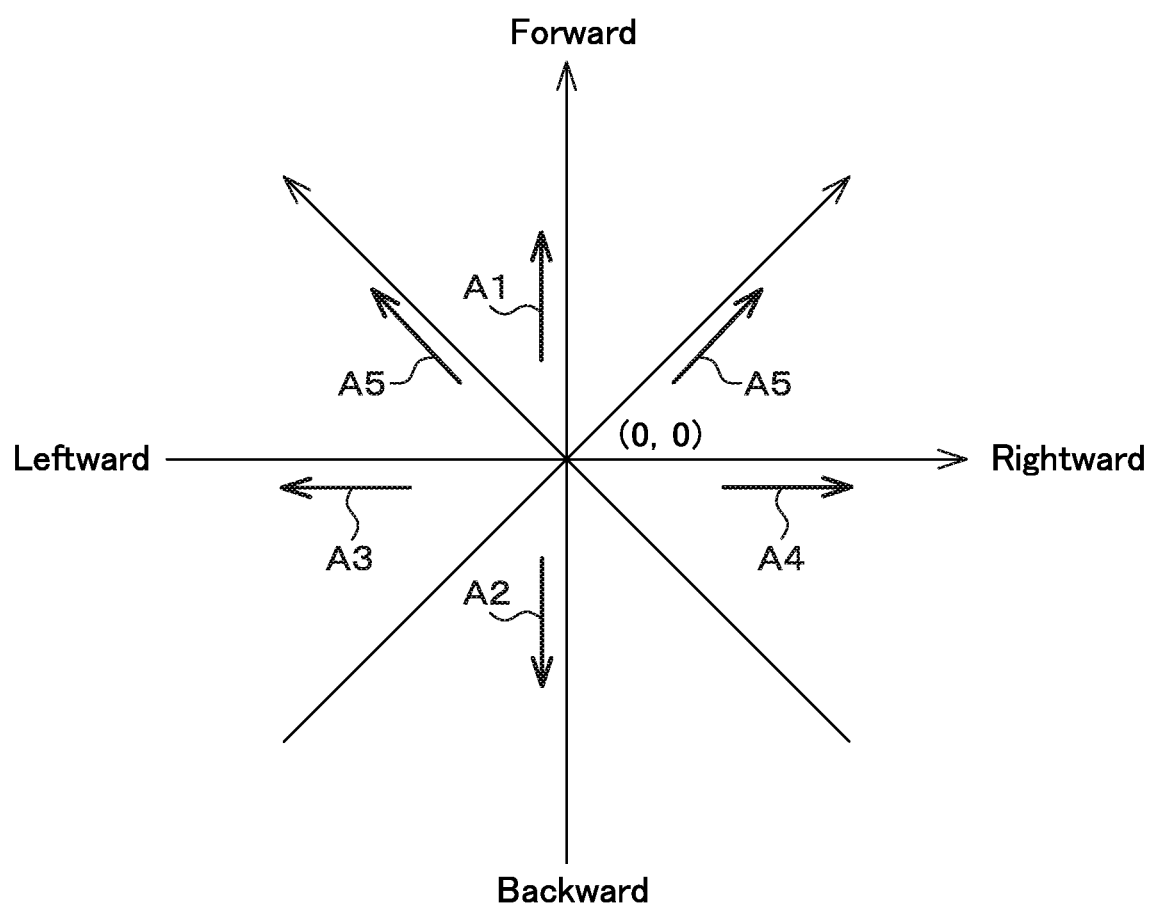
FIG. 10 is a view showing an operational direction or the like of a traveling operation member according to the third embodiment.

When the traveling operation member 59 is swung forward (in a direction indicated by an arrowed line A1 in FIGS. 9 and 10), the operation valve 55A is operated to output a pilot pressure therefrom. This pilot pressure is applied to the pressure-receiving portion 53*a* of the left traveling pump 53L via the first traveling fluid passage 45*a* and to the pressure-receiving portion 53*a* of the right traveling pump 53R via the third traveling fluid passage 45*c*. In this manner, the swashplate angles of the left traveling pump 53L and the right traveling pump 53R are changed to rotate the left traveling motor 36L and the right traveling motor 36R normally (forward rotation), whereby the working machine 1 travels straight forward.

In addition, when the traveling operation member 59 is swung backward (in a direction indicated by an arrowed line A2 in FIGS. 9 and 10), the operation valve 55B is operated to output a pilot pressure therefrom. This pilot pressure is applied to the pressure-receiving portion 53*b* of the left traveling pump 53L via the second traveling fluid passage 45*b* and to the pressure-receiving portion 53*b* of the right traveling pump 53R via the fourth traveling fluid passage 45*d*. In this manner, the swashplate angles of the left traveling pump 53L and the right traveling pump 53R are changed to rotate the left traveling motor 36L and the right traveling motor 36R reversely (backward rotation), whereby the working machine 1 travels straight backward.

In addition, when the traveling operation member 59 is swung rightward (in a direction indicated by an arrowed line A3 in FIGS. 9 and 10), the control valve 55C is operated to output a pilot pressure therefrom. This pilot pressure is applied to the pressure-receiving portion 53*a* of the left traveling pump 53L via the first traveling fluid passage 45*a*, and to the pressure-receiving portion 53*b* of the right traveling pump 53R via the fourth traveling fluid passage 45*d*. In this manner, the swashplate angles of the left traveling pump 53L and the right traveling pump 53R are changed to rotate the left traveling motor 36L normally, and to rotate the right traveling motor 36R reversely, whereby the working machine 1 spins to turn (spin-turns) rightward.

In addition, when the traveling operation member 59 is swung leftward (in a direction indicated by an arrowed line A4 in FIGS. 9 and 10), the control valve 55D is operated to output a pilot pressure therefrom. This pilot pressure is applied to the pressure-receiving portion 53*a* of the right traveling pump 53R via the third traveling fluid passage 45*c*, and to the pressure-receiving portion 53*b* of the left traveling pump 53L via the second traveling fluid passage 45*b*. In this manner, the swashplate angles of the left traveling pump 53L and the right traveling pump 53R are changed to rotate the left traveling motor 36L reversely, and to rotate the right traveling motor 36R normally, whereby the working machine 1 spins to turn (spin-turns) leftward.

In addition, when the traveling operation member 59 is swung in an oblique direction (in a direction indicated by an arrowed line A5 in FIG. 10), rotation directions and rotation speeds of the left traveling motor 36L and the right traveling motor 36R are determined by a differential pressure between the pilot pressures applied to the pressure-receiving portion 53*a* and the pressure-receiving portion 53*b*, so that the working machine 1 pivots to turn rightward or leftward while traveling forward or backward.

That is, when the traveling operation member 59 is swung in a forwardly leftward oblique direction, the working machine 1 turns leftward while traveling forward at a speed corresponding to the swing angle of the traveling operation member 59. When the traveling operation member 59 is swung in a forwardly rightward oblique direction, the working machine 1 turns rightward while traveling forward at a speed corresponding to the swing angle of the traveling operation member 59. When the traveling operation member 59 is swung in a backwardly leftward oblique direction, the working machine 1 turns leftward while traveling backward at a speed corresponding to the swing angle of the traveling operation member 59. When the traveling operation member 59 is swung in a backwardly rightward oblique direction, the working machine 1 turns rightward while traveling backward at a speed corresponding to the swing angle of the traveling operation member 59.

As shown in FIG. 9, the working machine 1 has a controller 360. The controller 360 performs various controls of the working machine 1 and includes a semiconductor such as a CPU or an MPU, an electrical and electronic circuit, or/and the like. An accelerator 365, a mode switch 366, a speed shifting switch 367, and a rotation speed detection device (prime mover rotation speed detection device) 368, a measurement device (pressure measurement device) 369, and a setting switch 373 are connected to the controller 360.

The mode switch 366 is a switch configured to enable or disable the automatic deceleration. For example, the mode switch 366 is a switch capable of being switched ON and OFF, so that the mode switch 366, when switched ON, enables the automatic deceleration operation, and when switched OFF, the mode switch 66 disables the automatic deceleration operation.

The speed shifting switch 367 is disposed in the vicinity of the operator's seat 8 and can be operated by a driver (an operator). The speed shifting switch 367 is manually operable to selectively set the rotation speed stages of the traveling motors 36L and 36R (left traveling motor 36L and right traveling motor 36R) to either the first speed stage or the second speed stage. For example, the speed shifting switch 367 is a seesaw switch shiftable between a position corresponding to the first speed stage and a position corresponding to the second speed stage. The speed shifting switch 367 is configured to output an instruction (trigger) selectively instructing either the acceleration operation to shift the traveling motors from the first speed stage to the second speed stage or the deceleration operation to shift the traveling motors from the second speed stage to the first speed stage.

The rotation speed detection devices 368 are constituted of sensors or the like configured to detect the rotation speed and are capable of detecting the prime mover rotation speed that is the rotation speed of the prime mover 32.

The measurement device 369 is a sensor that detects the respective pressures of a first relief valve 381a, a second relief valve 381b, a third relief valve 381c, and a fourth relief valve 381d.

The setting switch 373 is a switch for setting (selecting) at least an acquisition mode described below, among the control modes executed by the controller 360.

In addition, the control device 360 performs a control to prevent the prime mover 32 from stopping, that is, a control to prevent the engine stalling (i.e., anti-stall control). In this embodiment, the anti-stall control is to reduce outputs of the two traveling pumps (first traveling pump 53L and second traveling pump 53R) when a difference with respect to the actual rotation speed detected by the rotation speed detecting device 368 (referred to as dropping rotation speed) becomes a threshold value or more. For example, in the anti-stall control, the controller 360 reduces the outputs of the first traveling pump 53L and the second traveling pump 53R when the dropping rotation speed of the prime mover 32 becomes a threshold value or more.

The anti-stall control according to the embodiment will be described in detail below.

As shown in FIG. 9, the hydraulic system for the working machine includes an actuation valve 467. The actuation valve 467 is a valve capable of changing the pilot pressure of the pilot fluid that operates the two traveling pumps (first traveling pump 53L and second traveling pump 53R). The actuation valve 467 is disposed in the drain fluid passage 40 through which the pilot fluid flows, and changes an opening degree thereof to change the pilot pressure (that is, hydraulic pilot pressure acting on the pressure-receiving portions 53a and 53b) of the pilot fluid that operates the two traveling pumps (first traveling pump 53L and second traveling pump 53R). For example, the actuation valve 467 is a solenoid proportional valve whose opening degree can be changed based on a control signal (e.g., electric voltage, electric current) of the control device 360.

That is, the control device 360 magnetizes the solenoid 467a of the actuation valve 467 to change the pilot pressure (primary traveling pressure) applied from the actuation valve 467 to the operation device 54, and accordingly changes the pilot pressure (hydraulic pilot pressure) that operates the two traveling pumps (first traveling pump 53L and second traveling pump 53R).

The controller 360 includes an automatic deceleration unit 361. The automatic deceleration unit 361 includes an electrical and electronic circuit or the like installed in the controller 360, a computer program stored in the controller 360, and/or the like.

The automatic deceleration unit 361 performs the automatic deceleration control in a state where the traveling mode is activated and the automatic deceleration is enabled, and does not perform the automatic deceleration control when the traveling mode is activated and the automatic deceleration is disabled. In addition, the automatic deceleration unit 361 does not perform the automatic deceleration control in the acquisition mode.

In the automatic deceleration control, in a state where the traveling motors (left traveling motor 36L and right traveling motor 36R) are at the second speed stage, the controller 360 automatically shifts the traveling motors (left traveling motor 36L and right traveling motor 36R) from the second speed stage to the first speed stage when a predetermined condition (automatic deceleration condition) is satisfied. In the automatic deceleration control, when the automatic deceleration condition is satisfied in a state where at least the traveling motors (left traveling motor 36L and right traveling motor 36R) are at the second speed stage, the controller 360 demagnetizes a solenoid of the second shifting valve 72 to shift the second shifting valve 72 from the second position 72b to the first position 72a. In this manner, the traveling motors (left traveling motor 36L and right traveling motor 36R) are shifted from the second speed to the first speed. That is, in the automatic deceleration control, the controller 360 performs the automatic deceleration by shifting both the left traveling motor 36L and the right traveling motor 36R from the second speed stage to the first speed stage.

When a restoration condition is satisfied after the automatic deceleration is performed, the automatic deceleration unit 361 magnetizes a solenoid of the second shifting valve 72 to shift the second shifting valve 72 from the first position 72a to the second position 72b. In this manner, the traveling motors (left traveling motor 36L and right traveling motor 36R) are shifted from the first speed stage to the second speed stage. That is, the preceding speed stage of the traveling motors is restored. That is, the controller 360 accelerates both the left traveling motor 36L and the right traveling motor 36R when restoring from the first speed stage to the second speed stage after the automatic deceleration.

When the automatic deceleration is disabled, the controller 360 performs the manual shifting control to shift the speed stage of the traveling motors (left traveling motor 36L and right traveling motor 36R) to either the first speed or the second speed according to an operation of the speed shifting switch 367.

In the manual shifting control, when the speed shifting switch 367 is shifted to a position corresponding to the first speed stage, the controller 360 demagnetizes the solenoid of the second shifting valve 72 to shift the second shifting valve 72 to the first position 72a, thereby shifting the traveling motors (left traveling motor 36L and right traveling motor 36R) to the first speed stage. In addition, in the manual shifting control, when the speed shifting switch 367 is shifted to a position corresponding to the second speed position, the controller 360 magnetizes the solenoid of the second shifting valve 72 to shift the second shifting valve 72 to the second position 72b, thereby shifting the traveling motors (left traveling motor 36L and right traveling motor 36R) to the second speed stage.

The controller 360 performs the automatic deceleration based on the pressures in the circulation fluid passages 57h and 57i. A plurality of pressure detection devices 80 are respectively connected to the circulation fluid passages 57h and 57i. The plurality of pressure detection devices 80 include a first pressure detection device 80a, a second pressure detection device 80*b*, a third pressure detection device 80*c*, and a fourth pressure detection device 80*d*.

The first pressure detection device 80*a* is disposed on the first port P11 side of the left traveling motor 36L in the circulation fluid passage 57*h*, and detects a pressure on the first port P11 side as a first traveling pressure LF(t). The second pressure detection device 80*b* is disposed on the second port P12 side of the left traveling motor 36L in the circulation fluid passage 57*h*, and detects a pressure on the second port P12 side as a second traveling pressure LB(t).

The third pressure detection device 80*c* is disposed on the third port P13 side of the right traveling motor 36R in the circulation fluid passage 57*i*, and detects a pressure on the third port P13 side as a third traveling pressure RF(t). The fourth pressure detection device 80*d* is disposed on the fourth port P14 side of the right traveling motor 36R in the circulation fluid passage 57*i*, and detects a pressure on the fourth port P14 side as a fourth traveling pressure RB(t).

The controller 360 (automatic deceleration unit 361) performs the automatic deceleration based on the first traveling pressure LF (t, rpm) detected by the first pressure detection device 80*a*, the second traveling pressure LB (t, rpm) detected by the second pressure detection device 80*b*, the third traveling pressure RF (t, rpm) detected by the third pressure detection device 80*c*, and the fourth traveling pressure RB (t, rpm) detected by the fourth pressure detection device 80*d*. Note that the sign (t, rpm) indicated in the first traveling pressure LF (t, rpm), the second traveling pressure LB (t, rpm), the third traveling pressure RF (t, rpm), and the fourth traveling pressure RB (t, rpm) indicates that the pressures are associated with the actual rotation speed of the prime mover at a certain time t.

Specifically, the automatic deceleration unit 361 performs the automatic deceleration when the first traveling pressure LF (t, rpm), the second traveling pressure LB (t, rpm), the third traveling pressure RF (t, rpm), and the fourth traveling pressure RB (t, rpm) become the deceleration threshold ST (rpm) or more, which is determined according to the rotation speed of the prime mover.

[Expression 1]

$$\begin{pmatrix} LF_{(t,rpm)} \\ LB_{(t,rpm)} \\ RF_{(t,rpm)} \\ RB_{(t,rpm)} \end{pmatrix} \geq STrpm) \quad (1)$$

The controller 360 (automatic deceleration unit 361), based on the first traveling relief pressure w1 of the first relief valve 381*a*, the second traveling relief pressure w2 of the second relief valve 381*b*, the third traveling relief pressure w3 of the third relief valve 381*c*, and the fourth traveling relief pressure w4 of the fourth relief valve 381*d*, sets the deceleration threshold ST (rpm). For example, the controller 360 (automatic deceleration unit 361) sets the deceleration threshold ST (rpm) based on each of the first traveling relief pressure w1, the second traveling relief pressure w2, the third traveling relief pressure w3, and the fourth traveling relief pressure w4 and the correction factor η1.

For convenience of explanation, the first traveling relief pressure w1 is represented by the first traveling relief pressure w1 (rpm), the second traveling relief pressure w2 is represented by the second traveling relief pressure w2 (rpm), the third traveling relief pressure w3 is represented by the third traveling relief pressure w3 (rpm), the fourth traveling relief pressure w4 is represented by the fourth traveling relief pressure w4 (rpm), each of the relief valves being determined corresponding to the prime mover rotation speed.

In addition, the deceleration threshold ST set based on the first traveling relief pressure w1 (rpm), the second traveling relief pressure w2 (rpm), the third traveling relief pressure w3 (rpm), and the fourth traveling relief pressure w4 (rpm) is represented by the deceleration threshold ST (rpm). In setting the deceleration threshold ST (rpm), the controller 360 (automatic deceleration unit 361) refers to the first traveling relief pressure w1 (rpm), the second traveling relief pressure w2 (rpm), the third traveling relief pressure w3 (rpm), and the fourth traveling relief pressure w4 (rpm) as shown in Expression (2). In addition, the sign "η1" in Expression (2) represents a correction factor. As shown in Expression (2), the controller 360 (automatic deceleration unit 361) multiplies each of the first traveling relief pressure w1 (rpm), the second traveling relief pressure w2 (rpm), the third traveling relief pressure w3 (rpm), and the fourth traveling relief pressure w4 (rpm) by the correction factor 111 to set the deceleration threshold ST (rpm).

[Expression 2]

$$ST(rpm) = \begin{pmatrix} w3_{(rpm)} \\ w1_{(rpm)} \\ w4_{(rpm)} \\ w2_{(rpm)} \end{pmatrix} \times \eta_1 \quad (2)$$

At this time, in order to perform the accurate automatic deceleration using the deceleration threshold ST (rpm), it is necessary to acquire accurate first traveling relief pressure w1, second traveling relief pressure w2, third traveling relief pressure w3, and fourth traveling relief pressure w4. Accordingly, the controller 360 has an acquisition mode that is a control for acquiring the first traveling relief pressure w1, the second traveling relief pressure w2, the third traveling relief pressure w3, and the fourth traveling relief pressure w4, as described above.

The acquisition mode executed by the controller 360 (automatic deceleration unit 361) is described below. When the controller 360 (automatic deceleration unit 361) executes the acquisition mode, the controller 360 first acquires the first traveling relief pressure w1, the second traveling relief pressure w2, the third traveling relief pressure w3, and the fourth traveling relief pressure w4 for each prime mover rotation speed while changing the prime mover rotation speed to different rotation speeds. That is, the controller 360 (automatic deceleration unit 361) acquires the traveling relief pressures (first traveling relief pressure w1, second traveling relief pressure w2, third traveling relief pressure w3, and fourth traveling relief pressure w4) that are determined corresponding to the respective prime mover rotation speeds. Then, the controller 360 (automatic deceleration unit 361) sets the deceleration threshold ST (rpm) according to the traveling relief pressure that is determined corresponding to the prime mover rotation speed. Note that the traveling relief pressure is defined as a pressure of hydraulic fluid generated when the first relief valve 381*a*, the second relief valve 381*b*, the third relief valve 381*c*, and the fourth relief valve 381*d* start to be opened, or a pressure of hydraulic fluid generated when a delivery flow rate from the traveling pumps 53L and 53R is stabilized after the first relief valve 381*a*, the second relief valve 381*b*, the third relief valve 381*c*, and the fourth relief valve 381*d* starts to be opened.

In more detail, in the acquisition mode, the controller 360 (automatic deceleration unit 361) sets the prime mover rotation speed to be a predetermined rotation speed. The measurement device 369 (see FIG. 9) measures the first traveling relief pressure w1 (rpm), the second traveling relief pressure w2 (rpm), the third traveling relief pressure w3 (rpm), and the fourth traveling relief pressure w4 (rpm) each generated when the prime mover rotation speed is the predetermined rotation speed.

In the acquisition mode, the controller 360 (automatic deceleration unit 361) changes the prime mover rotation speed at least in a range from the rotation speed corresponding to the idling to the upper limit rotation speed, and measures the first traveling relief pressure w1 (rpm), the second traveling relief pressure w2 (rpm), the third traveling relief pressure w3 (rpm), and the fourth traveling relief pressure w4 (rpm) for the respective changed prime mover rotation speeds.

As shown in FIG. 11, a memory device 363, in the acquisition mode, stores a plurality of pairs of the first traveling relief pressure w1 (rpm), the second traveling relief pressure w2 (rpm), the third traveling relief pressure w3 (rpm), and the fourth traveling relief pressure w4 (rpm), each of the pairs corresponding to each of the different prime mover rotation speeds. That is, the memory device 363 stores the pairs by associating one of the pairs of the first traveling relief pressure w1 (rpm), the second traveling relief pressure w2 (rpm), the third traveling relief pressure w3 (rpm), and the fourth traveling relief pressure w4 (rpm) with one of the prime mover rotation speeds one by one.

Figure 12:
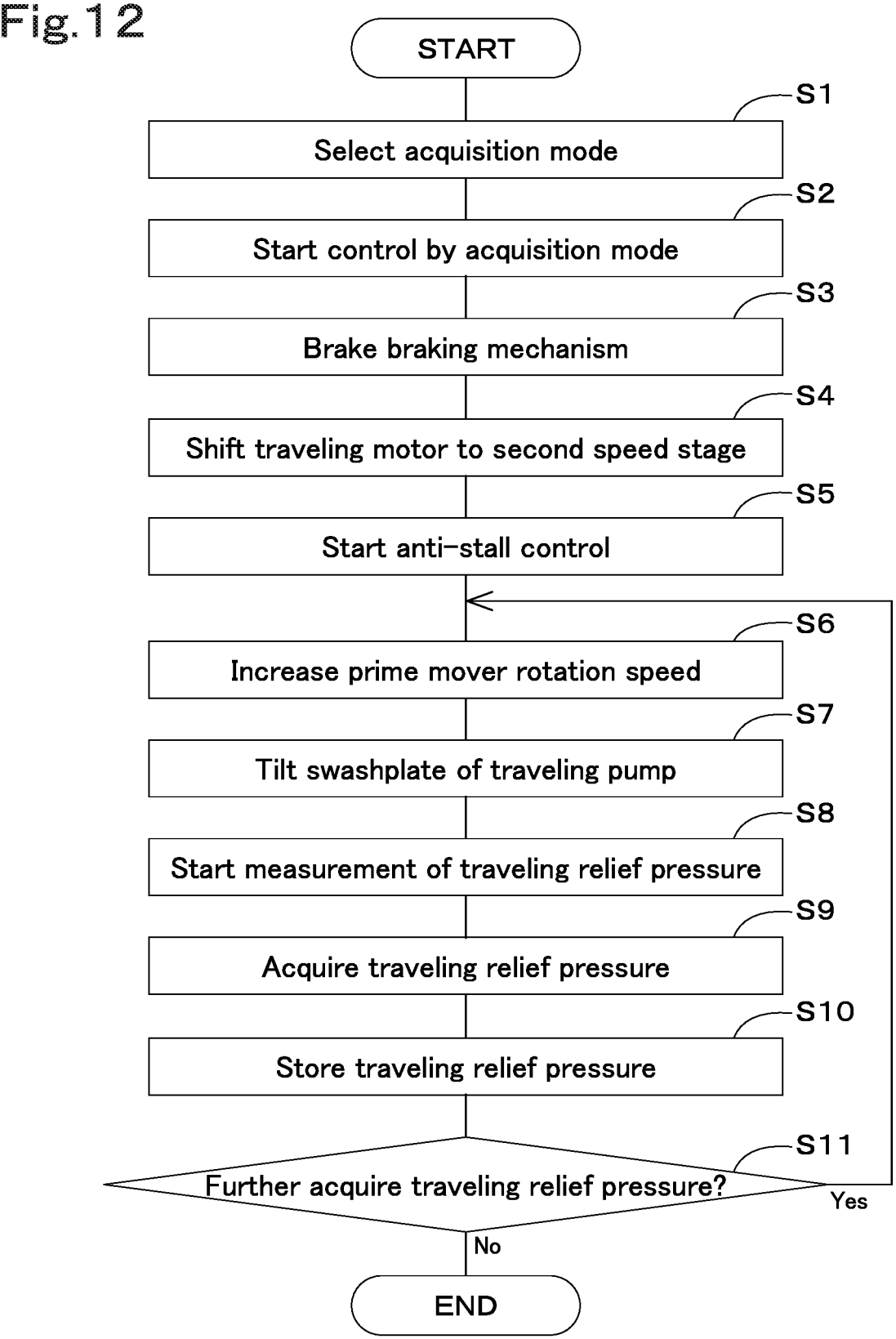
FIG. 12 is a view showing a flowchart representing a flow of process in an acquisition mode according to the third embodiment.

Referring to FIG. 12, the operation of the controller 360 in the acquisition mode, that is, the operation of the working machine 1, will be described in more detail. FIG. 12 is a flowchart showing a flow of processing in the acquisition mode.

The acquisition mode is a control that can be initiated under a state where the working machine 1 is parked on a flat ground, and the prime mover 32 is operating at an idling rotation speed (idling state). In this idling state, the brake change-over valve 380a is in the first position 383a1 and the braking by the brake mechanisms 330L and 30R is released. Additionally, since the second shifting valve 72 of the traveling switching valve 34 is in the first position 72a, the first shifting valve 71L is in the first position 71L1 and the first shifting valve 71R is in the first position 71R1, and thus the rotation speed stage of each of the traveling motors (left traveling motor 36L and right traveling motor 36R) is in the first speed stage.

When the acquisition mode is selected by the setting switch 373 under a state where the prime mover 32 is in the idling state (step S1), the controller 360 (automatic deceleration unit 361) starts the control in the acquisition mode (step S2).

In the acquisition mode, the controller 360 (automatic deceleration unit 361) first outputs a control signal to the brake change-over valve 380a to magnetize the solenoid of the brake change-over valve 380a. With this magnetization, the brake change-over valve 380a is shifted to the first position 383a1, and the braking by the brake mechanisms 330L and 30R is performed. That is, the brake mechanisms 330L and 30R brake (parking lock) the traveling motors 36L and 36R (step S3).

After the step S3, the controller 360 (automatic deceleration unit 361) outputs a control signal to the second shifting valve 72 of the traveling switching valve 34 to magnetize the solenoid of the second shifting valve 72. With this magnetization, the second shifting valve 72 is shifted to the second position 72b, the first shifting valve 71L is shifted to the second position 71L2, and the first shifting valve 71R is shifted to the second position 71R2. That is, the rotation speed stage of each of the traveling motors (left traveling motor 36L and right traveling motor 36R) is shifted to the second speed stage (step S4).

After the step S4, the controller 360 starts the anti-stall control to prevent the engine stalling of the prime mover 32 (step S5). The anti-stall control is a technique to prevent the engine stalling of the prime mover 32 by controlling the anti-stall proportional valve and the unloading valve.

After the step S5, the controller 360 increases a rotation speed of the prime mover 32 to a predetermined rotation speed (e.g., 700 rpm) (step S6).

After the step S6, when the rotation speed of the prime mover 32 stabilizes at the predetermined rotation speed, the controller 360 controls the pressure (pilot pressure) of hydraulic fluid output from the operation valves 55 (operation valve 55A, operation valve 55B, operation valve 55C, and operation valve 55D) to tilt the swashplates of the traveling pumps (left traveling pump 53L and right traveling pump 53R) with the upper limit pilot pressure at the current rotation speed (step S7).

In this manner, hydraulic fluid of the regulated flow rate is supplied from the traveling pumps (left traveling pump 53L and right traveling pump 53R) to the traveling motors (left traveling motor 36L and right traveling motor 36R).

After the step S7, the measurement device 369 connected to the controller 360 starts to measure the first traveling relief pressure w1 (rpm), the second traveling relief pressure w2 (rpm), the third traveling relief pressure w3 (rpm), and the fourth traveling relief pressure w4 (rpm) of each of the traveling pumps (left traveling pump 53L and right traveling pump 53R) (step S8).

After the step S8, when the delivery flow rates of hydraulic fluid from the traveling pumps (left traveling pump 53L and right traveling pump 53R) stabilize after the first traveling relief pressure w1 (rpm), the second traveling relief pressure w2 (rpm), the third traveling relief pressure w3 (rpm), and the fourth traveling relief pressure w4 (rpm) start to be generated, the measurement device 369 acquires the first traveling relief pressure w1 (rpm), the second traveling relief pressure w2 (rpm), the third traveling relief pressure w3 (rpm), and the fourth traveling relief pressure w4 (rpm) under the state where the delivery flow rate stabilizes (step S9).

After the step S9, a memory device 363 connected to the controller 360 associates the acquired combination of the first traveling relief pressure w1 (rpm), the second traveling relief pressure w2 (rpm), the third traveling relief pressure w3 (rpm), and the fourth traveling relief pressure w4 (rpm) with the prime mover rotation speed obtained when measuring the traveling relief pressures, and stores the associated pair and rotation speed (step S10).

In the process at the step S10, the memory device 363 stores the combinations of the first traveling relief pressure, the second traveling relief pressure, the third traveling relief pressure, and the fourth traveling relief pressure respectively corresponding to the prime mover rotation speeds, as shown in FIG. 11.

After the step S9, when it is necessary to measure the first traveling relief pressure w1 (rpm), the second traveling relief pressure w2 (rpm), the third traveling relief pressure w3 (rpm), and the fourth traveling relief pressure w4 (rpm) at different prime mover rotation speeds (step S11), the controller 360 returns the process to the step S6, and terminates the acquisition mode when it is not necessary to measure the pressures.

The acquisition mode including the above-described steps S1 to S10 is performed in the working machine 1 in which the traveling pumps (left traveling pump 53L and right traveling pump 53R) are driven by the prime mover 32.

It is explained that, at step S7, the control device 360 controls the pressure (pilot pressure) of hydraulic fluid output from the operation valves 55 (operation valves 55A, 55B, 55C, and 55D). In this case, the controller 360 operates the operation valve 55A, operation valve 55B, operation valve 55C, and operation valve 55D in turn.

When the operation valve 55A is operated, a pressure of hydraulic fluid (pilot pressure) output when the operation valve 55A is operated can tilt the swashplates of the traveling pumps (left traveling pump 53L and right traveling pump 53R) with the upper limit pilot pressure at the current rotation speed. When the operation valve 55B is operated, a pressure of hydraulic fluid (pilot pressure) output when the operation valve 55B is operated can tilt the swashplates of the traveling pumps (left traveling pump 53L and right traveling pump 53R) with the upper limit pilot pressure at the current rotation speed. When the operation valve 55C is operated, a pressure of hydraulic fluid (pilot pressure) output when the operation valve 55C is operated can tilt the swashplates of the traveling pumps (left traveling pump 53L and right traveling pump 53R) with the upper limit pilot pressure at the current rotation speed. In addition, when the operation valve 55D is operated, a pressure of hydraulic fluid (pilot pressure) output when the operation valve 55D is operated can tilt the swashplates of the traveling pumps (left traveling pump 53L and right traveling pump 53R) with the upper limit pilot pressure at the current rotation speed.

Moreover, when the operation valves 55A and 55C are operated, a pressure of hydraulic fluid (pilot pressure) output when the operation valves 55A and 55C are operated can tilt the swashplates of the traveling pumps (left traveling pump 53L and right traveling pump 53R) with the upper limit pilot pressure at the current rotation speed. When the operation valves 55A and 55D are operated, a pressure of hydraulic fluid (pilot pressure) output when the operation valves 55A and 55D are operated can tilt the swashplates of the traveling pumps (left traveling pump 53L and right traveling pump 53R) with the upper limit pilot pressure at the current rotation speed. When the operation valves 55B and 55C are operated, a pressure of hydraulic fluid (pilot pressure) output when the operation valves 55B and 55C are operated can tilt the swashplates of the traveling pumps (left traveling pump 53L and right traveling pump 53R) with the upper limit pilot pressure at the current rotation speed. In addition, when the operation valves 55B and 55D are operated, a pressure of hydraulic fluid (pilot pressure) output when the operation valves 55B and 55D are operated can tilt the swashplates of the traveling pumps (left traveling pump 53L and right traveling pump 53R) with the upper limit pilot pressure at the current rotation speed.

As described above, in the step S7, one or two of the operation valves 55 (operation valve 55A, operation valve 55B, operation valve 55C, operation valve 55D) are operated to output hydraulic fluid, and these operation valves 55 are operated by the swinging of the traveling operation member 59. Accordingly, the controller 360 displays a direction of the swinging of the traveling operation member 59 on a monitor (display device) or the like disposed around the operator's seat 8 in order to operate one or two of the operation valves 55 to be operated. The operator who watches this monitor swings the traveling operation member 59 according to the display of the monitor.

Through the above-described operations, in each combination of one or two of operation valves 55, hydraulic fluid of a regulated flow rate is supplied from the traveling pumps (left traveling pump 53L and right traveling pump 53R) to the traveling motors (left traveling motor 36L and right traveling motor 36R).

In the subsequent step S8, the measurement device 369 connected to the controller 360 starts to measure the first traveling relief pressure w1 (rpm), the second traveling relief pressure w2 (rpm), the third traveling relief pressure w3 (rpm), and the fourth traveling relief pressure w4 (rpm).

For example, in the step S7 of the flowchart shown in FIG. 12, the controller 360 displays, on the monitor (display unit), a direction of the swinging of the traveling operation member 59 for operating the operation valve 55A. Then, when the operation valve 55A is operated by the swinging of the traveling operation member 59, the controller 360 obtains and stores the first to fourth traveling relief pressures w1 to w4 (rpm) through the step S8 to step S10. At the step S11, when it is necessary to measure the traveling relief pressure generated when one of the operation valves 55 different from the operation valve 55A is operated, the controller 360 returns the process to the step S7.

Returning to the step S7, the controller 360 displays, on the monitor (display unit), a direction of the swinging of the traveling operation member 59 for operating, for example, the operation valves 55B different from the operation valve 55A, and repeats the above-described operations. In this manner, by repeating the steps S7 to S11, the controller 360 obtains and stores the first to fourth traveling relief pressures w1 to w4 (rpm) generated when described above one or two of the operation valves 55 is operated.

Modified Example

The acquisition mode (hereinafter referred to as a second acquisition mode) in a case where the traveling pumps (left traveling pump 53L and right traveling pump 53R) of the working machine 1 are constituted of an electric HST will be described below. Both the first hydraulic pump P1 and the second hydraulic pump P2 are constituted of electric hydraulic pumps.

Figure 13:
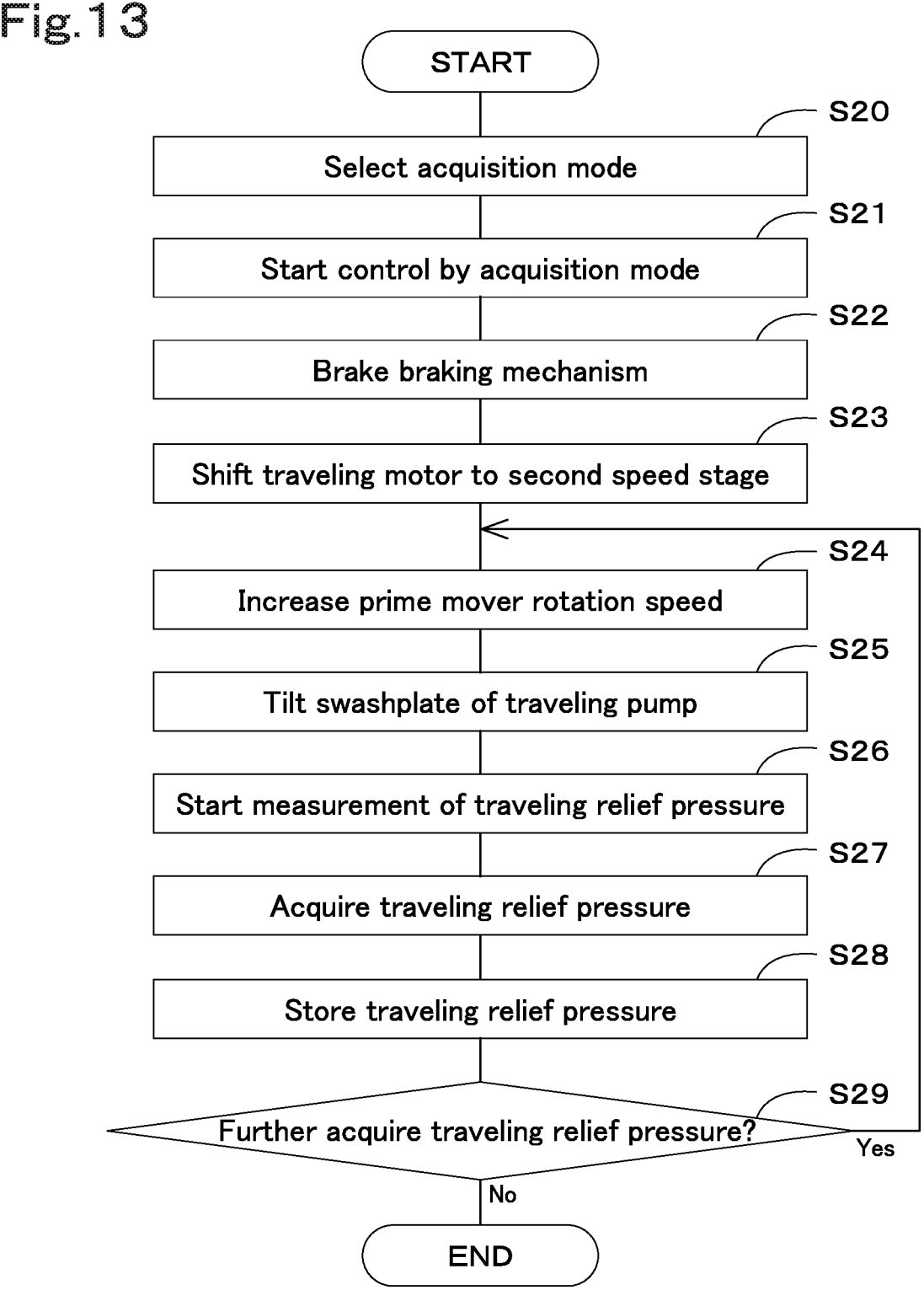
FIG. 13 is a view showing a flowchart representing a flow of process in a second acquisition mode according to a modified example of the third embodiment.

Referring to FIG. 13, the operation of the controller 360 in the second acquisition mode, that is, the operation of the working machine 1, will be described in more detail. FIG. 13 is a flowchart showing a flow of processing in the second acquisition mode.

The second acquisition mode is a control that can be initiated under a condition where the working machine 1 is parked on a flat ground and is capable of being operated. At this moment, the brake change-over valve 380a is in the first position 383a1 and the braking by the brake mechanisms 330L and 30R is released. Additionally, since the second shifting valve 72 of the traveling switching valve 34 is in the first position 72a, the first shifting valve 71L is in the first position 71L1 and the first shifting valve 71R is in the first position 71R1, and thus the rotation speed stage of each of the traveling motors (left traveling motor 36L and right traveling motor 36R) is in the first speed stage.

When the acquisition mode is selected by the setting switch 373 (step S1), the controller 360 (automatic deceleration unit 361) starts the control in the acquisition mode (step S21).

In the acquisition mode, the controller 360 (automatic deceleration unit 361) first outputs a control signal to the brake change-over valve 380*a* to magnetize the solenoid of the brake change-over valve 380*a*. With this magnetization, the brake change-over valve 380*a* is shifted to the first position 383*a*1, and the braking by the brake mechanisms 330L and 30R is performed. That is, the brake mechanisms 330L and 30R brake (referred to as parking lock) the traveling motors 36L and 36R (step S22).

After the step S22, the controller 360 (automatic deceleration unit 361) outputs a control signal to the second shifting valve 72 of the traveling switching valve 34 to magnetize the solenoid of the second shifting valve 72. With this magnetization, the second shifting valve 72 is shifted to the second position 72*b*, the first shifting valve 71L is shifted to the second position 71L2, and the first shifting valve 71R is shifted to the second position 71R2. That is, the rotation speed stage of each of the traveling motors (left traveling motor 36L and right traveling motor 36R) is shifted to the second speed stage (step S23).

After the step S23, the controller 360 increases rotation speeds of the electric HST pumps (left traveling pump 53L and right traveling pump 53R) to a predetermined rotation speed (e.g., 700 rpm) (step S24).

After the step S24, when the rotation speeds of the electric HST pumps (left traveling pump 53L and right traveling pump 53R) stabilize at the predetermined rotation speed, the controller 360 controls the pressure (pilot pressure) of hydraulic fluid output from the operation valves 55 (operation valve 55A, operation valve 55B, operation valve 55C, and operation valve 55D) to tilt the swashplates of the electric HST pumps (left traveling pump 53L and right traveling pump 53R) with the upper limit pilot pressure at the current rotation speed (step S25).

In this manner, hydraulic fluid of the regulated flow rate is supplied from the traveling pumps (left traveling pump 53L and right traveling pump 53R) to the traveling motors (left traveling motor 36L and right traveling motor 36R).

After the step S25, the measurement device 369 connected to the controller 360 starts to measure the first traveling relief pressure w1 (rpm), the second traveling relief pressure w2 (rpm), the third traveling relief pressure w3 (rpm), and the fourth traveling relief pressure w4 (rpm) of each of the traveling pumps (left traveling pump 53L and right traveling pump 53R) (step S26).

After the step S26, when the delivery flow rates of hydraulic fluid from the traveling pumps (left traveling pump 53L and right traveling pump 53R) stabilize after the first traveling relief pressure w1 (rpm), the second traveling relief pressure w2 (rpm), the third traveling relief pressure w3 (rpm), and the fourth traveling relief pressure w4 (rpm) start to be generated, the measurement device 369 acquires the first traveling relief pressure w1 (rpm), the second traveling relief pressure w2 (rpm), the third traveling relief pressure w3 (rpm), and the fourth traveling relief pressure w4 (rpm) under the state where the delivery flow rate stabilizes (step S27).

After the step S27, the memory device 363 connected to the controller 360 associates the acquired combination of the first traveling relief pressure w1 (rpm), the second traveling relief pressure w2 (rpm), the third traveling relief pressure w3 (rpm), and the fourth traveling relief pressure w4 (rpm) with the prime mover rotation speed obtained when measuring the traveling relief pressures, and stores the associated pair and rotation speed (step S28).

In the process at the step S28, the memory device 363 stores the combinations of the first traveling relief pressure, the second traveling relief pressure, the third traveling relief pressure, and the fourth traveling relief pressure respectively corresponding to the prime mover rotation speeds of the traveling pumps (left traveling pump 53L and right traveling pump 53R), and acquires information similar to those shown in FIG. 11.

After the step S27, when it is necessary to measure the first traveling relief pressure w1 (rpm), the second traveling relief pressure w2 (rpm), the third traveling relief pressure w3 (rpm), and the fourth traveling relief pressure w4 (rpm) at different prime mover rotation speeds (step S29), the controller 360 returns the process to the step S24, and terminates the acquisition mode when it is not necessary to measure the pressures.

According to the above-described embodiments and examples, the traveling motors 36L and 36R are braked (parking lock) at the step S3 and the step S22 in the acquisition mode; however, the rotation speed stages of the traveling motors (left traveling motor 36L and right traveling motor 36R) are shifted to the second speed stage at the step S4 and the step S23. Accordingly, the rotation torque of the traveling motors can be reduced at the same load pressure generated by the hydraulic fluid in comparison with the case where rotation speed stages of the traveling motors are the first speed stage. This reduction in rotation torque reduces the load applied to the brake mechanisms 330L and 30R.

In the description of the above-described embodiments and modified examples, the automatic deceleration unit 361 executes the acquisition mode. However, instead of the automatic deceleration unit 361, the controller 360 may have a computer program or electronic circuit that executes the acquisition mode independently of the automatic deceleration.

When the controller 360 has a configuration capable of independently executing the acquisition mode regardless of the automatic deceleration, the traveling relief pressure can be measured for each individual working machine 1 without introducing special equipment even when the HST pump and undercarriage parts, for example, are replaced at a dealer or the like.

Fourth Embodiment

Figure 14:
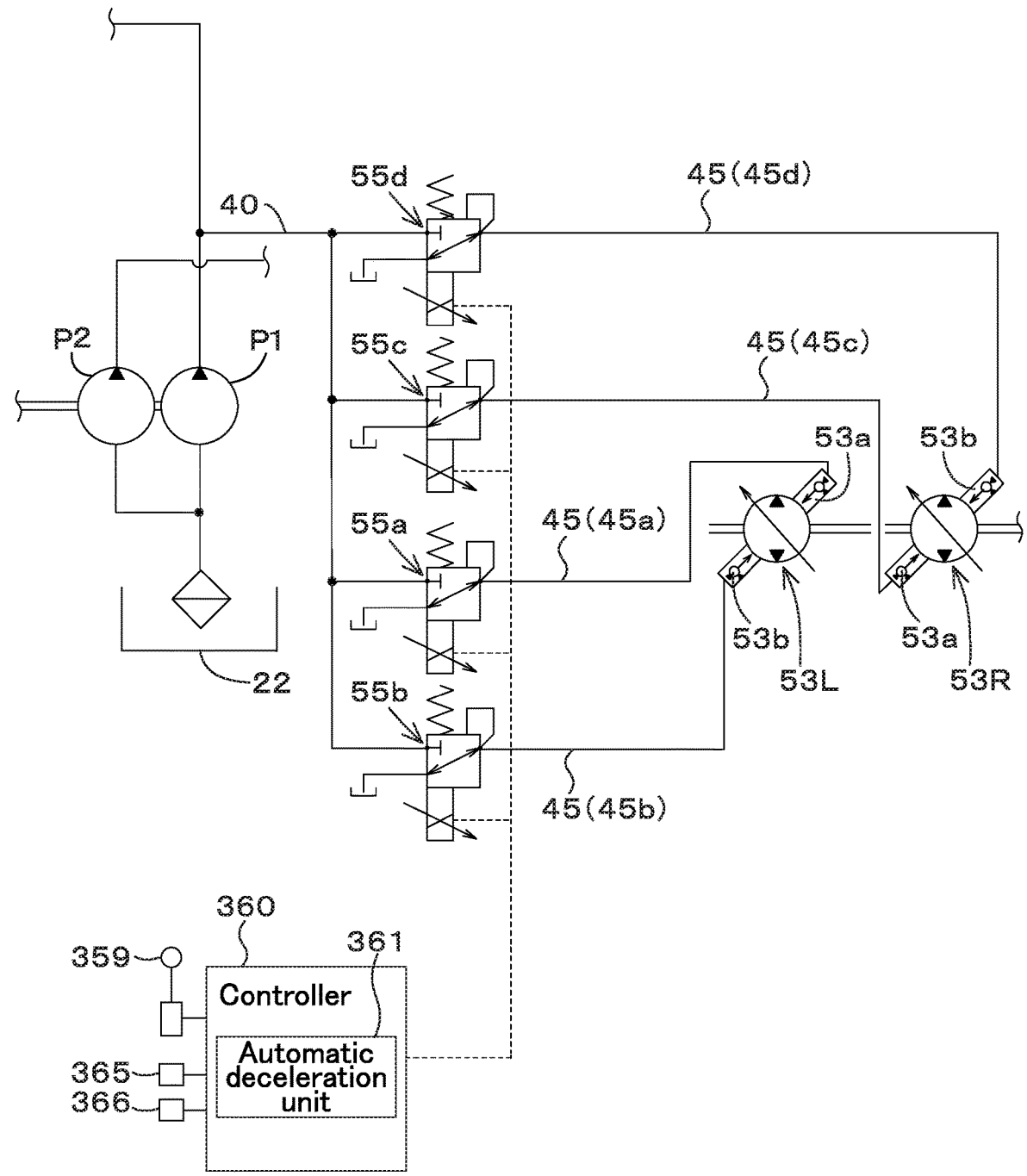
FIG. 14 is a view showing a part of a hydraulic system (hydraulic circuit) for the working machine according to a fourth embodiment of the invention.

Referring to FIG. 14, a fourth embodiment of the invention will be described. FIG. 14 is a view showing a part of the hydraulic system (hydraulic circuit) for the working machine according to the fourth embodiment of the invention. In this embodiment, components similar to those described in the first and third embodiments are represented with the same reference numerals, and descriptions thereof are omitted.

Although not shown in the drawings, as in FIG. 9 of the third embodiment, the left traveling pump 53L is connected to the connecting fluid passage (first circulation fluid passage) 57*h*, and the right traveling pump 53R is connected to the connecting fluid passage (second circulation fluid passage) 57*i*. Moreover, the first and second relief valves 381*a* and 381*b* are disposed in the connecting fluid passage 57*h*, and the third and fourth relief valves 381*c* and 381*d* are disposed in the connecting fluid passage 57*i*.

In the third embodiment, the operation device 54 is a hydraulic system in which the pilot pressure acting on the traveling pumps (first traveling pump 53L and second traveling pump 53R) is changed by the operation lever 59 and the operation valves 55.

As shown in FIG. 14, the fourth embodiment adopts an operation lever 59 constituted of an electrically-operable joystick and a controller 360 described below, and operation valves (actuation valves) 55 (operation valves 55*a*, 55*b*, 55*c*, and 55d) constituted of electromagnetic proportional valves. The operation lever 59 is an operation lever that swings in the lateral direction (machine width direction) or the fore-and-aft direction. The operation lever 59 has a sensor (operation detection sensor) that detects the operation amount (swinging amount) thereof and the operation direction (swinging direction) thereof. This operation detection sensor is connected to the controller 360.

The control device 360 outputs control signals to the operation valves (actuation valves) 55 (operation valve 55a, 55b, 55c, and 55d) according to the operation amount and operation direction of the operation lever 59, which are output by the operation detection sensor. The operation valves 55 (operation valves 55a, 55b, 55c, and 55d) are respectively assigned to the operating directions (directions A1 to A4 shown in FIG. 10) of the operation lever 59.

In the embodiment, the operation valves 55 (operation valves 55a, 55b, 55c, and 55d) are operated by the operation lever 59 and the controller 360 to achieve the operations performed by the operation valves 55 (operation valves 55A, 55B, 55C, and 55D) according to the third embodiment.

The technique and configuration for measuring the traveling relief pressure in the above-described configuration according to the embodiment is similar to the technique and configuration described in the third embodiment of FIGS. 9 to 13. By replacing the operation valves 55 (operation valves 55A, 55B, 55C, and 55D) with the operation valves 55 (operation valves 55a, 55b, 55c, and 55d), the traveling relief pressure can be measured in similar manner of the third embodiment.

Fifth Embodiment

Figure 15:
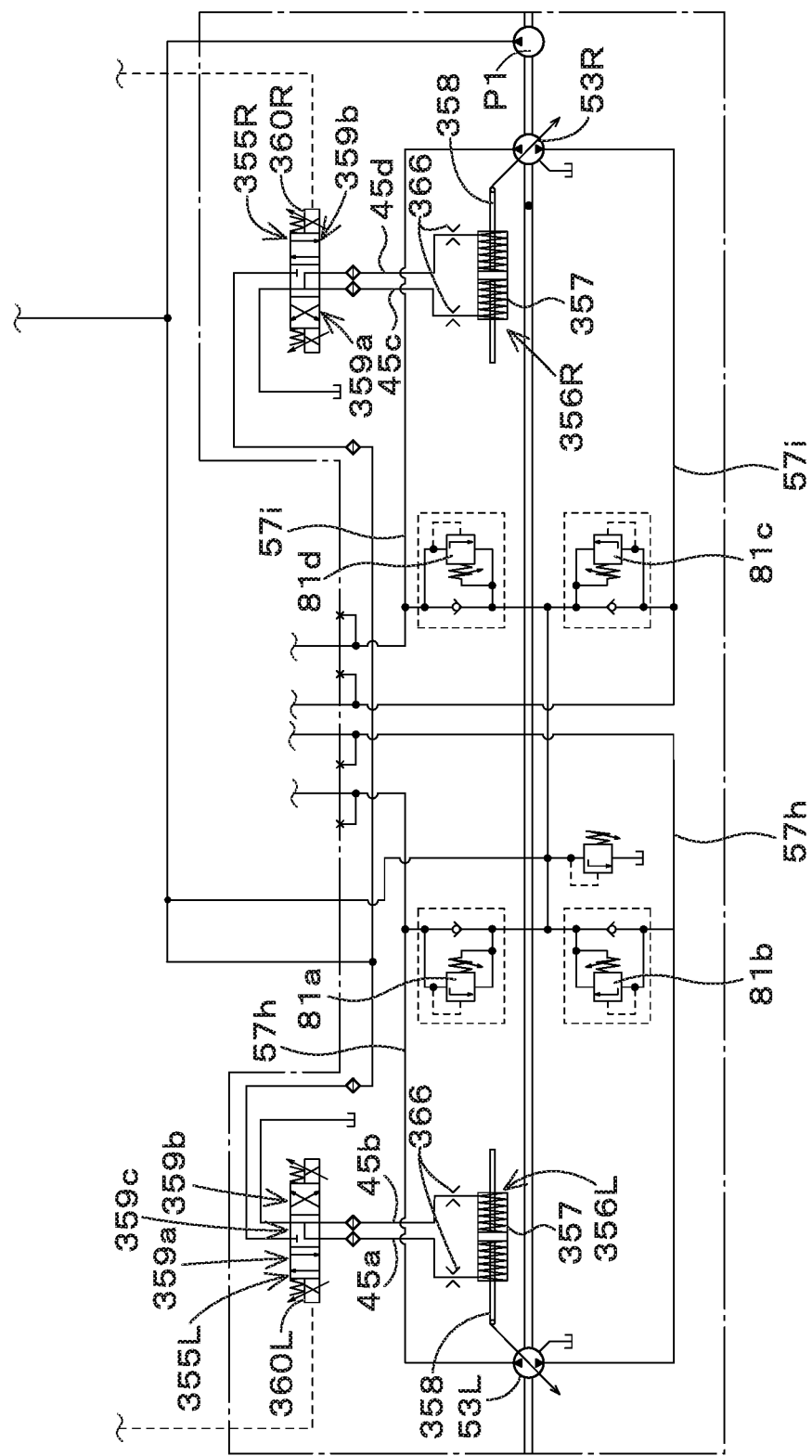
FIG. 15 is a view showing a part of a hydraulic system (hydraulic circuit) for the working machine according to a fifth embodiment of the invention.

Referring to FIGS. 14 and 15, a fifth embodiment of the invention will be described. FIG. 15 is a view showing a part of the hydraulic system (hydraulic circuit) for the working machine according to the fifth embodiment of the invention. In this embodiment, components similar to those described in the third and fourth embodiments are represented with the same reference numerals, and descriptions thereof are omitted.

Although not shown in FIG. 15, as in FIG. 14, the fifth embodiment adopts the operation lever 59 constituted of an electrically-operable joystick and the controller 360. In the embodiment, instead of the operation valves 55 (operation valves 55a, 55b, 55c, and 55d) shown in FIG. 14, operation valves (actuation valves) 355L and 355R constituted of solenoid proportional valves and hydraulic regulators 356L and 356R each shown in FIG. 15 are adopted.

Similar to the fourth embodiment, the operation lever 59 is an operation lever that swings in the lateral direction (machine width direction) or the fore-and-aft direction. The operation lever 59 has a sensor (operation detection sensor) that detects the operation amount (swinging amount) thereof and the operation direction (swinging direction) thereof. This operation detection sensor is connected to the controller 360.

The operation valves (actuation valves) 355L and 355R, which are constituted of solenoid proportional valves, are electrically connected to the control device 360. Similar to the operation valves 55 (operation valves 55a, 55b, 55c, and 55d) according to the fourth embodiment, shifting positions and an opening degree of each of the valves are controlled by a control signal from the control device 360 according to the operation of the operation lever 59, also in the operation valves 355L and 355R.

As shown in FIG. 15, the hydraulic regulators 356L and 356R are respectively connected to the swashplates of the traveling pumps (the first traveling pump 53L and the second traveling pump 53R). Each of the hydraulic regulators 356L and 356R is capable of changing the angle (swashplate angle) of the swashplate of each of the traveling pumps 53L and 53R (first traveling pump 53L and second traveling pump 53R), and includes a supply chamber 357 to which hydraulic fluid is supplied and a piston rod 358 disposed in the supply chamber 357. The piston rod 358 is connected to the swashplate, and movement (i.e., extension and contraction) of the piston rod 358 causes the swashplate to be swung, thereby changing the swashplate angle.

The supply chamber 357 of the hydraulic regulator 356L connected to the swashplate of the left traveling pump 53L is referred to as a first pressure receiving portion. In addition, the supply chamber 357 of the hydraulic regulator 356R that connects to the swashplate of the right traveling pump 53R is referred to as a second pressure receiving portion.

The operation valve 355L is a valve that operates the hydraulic regulator 356L and controls an amount of hydraulic fluid delivered by the traveling pump 53L through operation of the hydraulic regulator 356L. The operation valve 355L is constituted of a solenoid proportional valve having a solenoid 360L, and a spool of the operation valve 355L moves based on a control signal output from the controller 360 to the solenoid 360L. This movement of the spool changes an opening degree of the operation valve 355L. The operation valve 355L has a first position 359a, a second position 359b, and a neutral position 359c, and can be shifted to any one of these positions.

A first port of the operation valve 355L is connected to the supply chamber 357 of the hydraulic regulator 356L by the first traveling fluid passage 45a. A second port of the operation valve 355L is connected to the supply chamber 357 of the hydraulic regulator 356L by the second traveling fluid passage 45b.

The operation valve 355R is a valve that operates the hydraulic regulator 356R and controls an amount of hydraulic fluid delivered by the traveling pump 53R through operation of the hydraulic regulator 356R. The operation valve 355R is constituted of a solenoid proportional valve having a solenoid 360R, and a spool of the operation valve 355R moves based on a control signal given to the solenoid 360R from the controller 360. This movement of the spool changes an opening degree of the operation valve 355R. The operation valve 355R has a first position 359a, a second position 359b, and a neutral position 359c, and can be shifted to any one of these positions.

A first port of the operation valve 355R is connected to the supply chamber 357 of the hydraulic regulator 356R by the third traveling fluid passage 45c. A second port of the operation valve 355R is connected to the supply chamber 357 of the hydraulic regulator 356R by the fourth traveling fluid passage 45d.

When the operation valve 355L and the operation valve 355R are shifted to the first position 359a, the hydraulic regulators 356L and 356R are actuated to swing the swashplates of the traveling pumps 53L and 53R, and the traveling motors 36L, and 36R rotate normally. When the control valves 355L and 355R are shifted to the second position 359b, the hydraulic regulators 356L and 356R are operated to swing the swashplates of the traveling pumps 53L and 53R, and the traveling motors 36L and 36R rotate reversely.

When the operation valve 355L is shifted to the first position 359a and the operation valve 355R is shifted to the second position 359b, the swashplate of the first traveling pump 53L rotates normally, the swashplate of the second traveling pump 53R rotates reversely, the traveling motor 36L rotates normally, and the traveling motor 36R rotates reversely. When the operation valve 355L is shifted to the second position 359b and the operation valve 355R is shifted to the first position 359a, the swashplate of the first traveling pump 53L rotate reversely, the swashplate of the second traveling pump 53R rotate normally, the traveling motor 36L rotates reversely, and the traveling motor 36R rotates normally.

In this embodiment, the operation valves 355L and 355R are operated by the operation lever 59 and the controller 360 to actuate the hydraulic regulators 356L and 356R, thereby swing the swashplates of the traveling pumps 53L and 53R as in the fourth embodiment.

Accordingly, the technique and configuration for measuring the traveling relief pressure in the above-described configuration according to the embodiment is similar to the technique and configuration described in the fourth embodiment of FIG. 14. By replacing the operation valves 55 (operation valves 55a and 55b) with the operation valve 355 and the hydraulic regulator 356L and replacing the operation valves 55 (operation valves 55c and 55d) with the operation valve 355 and the hydraulic regulator 356R, the traveling relief pressure can be measured in similar manner of the fourth embodiment.

In the first to fourth embodiments described above, the controller 360 executes the braking with the brake mechanisms (brake) 30R and 30L, shifts at least one of the left traveling motor 36L and the right traveling motor 36R to the second speed stage, and thus a rotation speed of the prime mover 32 is increased and reduced is a state where hydraulic fluid is supplied to the traveling fluid passages 45a to 45d with the operation valves 55 or 355. By increasing or reducing the rotation speed of the prime mover 32, a pressure of hydraulic fluid supplied from the operation valve 55 or 355 to the traveling fluid passages 45a to 45d can be changed. As a result, the controller 360 can detect the actual rotation speed of the prime mover 32, at which the relief valves 381a to 381d start to be opened, by the prime mover rotation speed detection device 368.

At this time, the control device 360 associates an electric current value of a control signal output to the operation valve 55 or 355 with the prime mover rotation speed that has been reduced by the load.

In addition, when the acquisition mode is released, the controller 360 shifts the left traveling motor 36L and/or the right traveling motor 36R, which are at the second speed stage, to the first speed stage and releases the braking by the brake mechanisms (braking) 30R and 30L. In this manner, the working machine 1 can be operated normally based on the new relief pressures.

In the above-described first to fourth embodiments, a configuration in which the speed stage of the traveling motor has two levels: the first speed and the second speed that is higher than the first speed is exemplified. However, the speed stage of the traveling motor may be multiple, three or more stages. The purposes of the invention and the abovementioned embodiments are to measure the traveling relief pressures using a speed stage higher than the first speed stage. Accordingly, even in a working machine having a speed stage such as a third speed stage higher than the second speed, or a fourth speed higher than the third speed, the same control can be executed to measure the traveling relief pressures by applying the third speed stage or the fourth speed stage instead of the second speed in each of the above-described embodiments.

In the above description, the embodiment of the present invention has been explained. However, all the features of the embodiment disclosed in this application should be considered just as examples, and the embodiment does not restrict the present invention accordingly. A scope of the present invention is shown not in the above-described embodiment but in claims, and is intended to include all modifications within and equivalent to a scope of the claims.

What is claimed is:

1. A working machine comprising:
   a prime mover;
   a traveling device;
   a traveling motor configured to output power to the traveling device;
   a speed shifting valve configured to shift an output speed of the traveling motor between a first speed and a second speed faster than the first speed,
   an actuation valve configured to change a hydraulic pressure applied to the speed shifting valve;
   a first fluid passage fluidly connected to the speed shifting valve so that hydraulic fluid having the hydraulic pressure to be applied to the speed shifting valve flows through the first fluid passage;
   a drain fluid passage fluidly connected to the first fluid passage;
   a brake shiftable between a braking state to brake the traveling motor and a braking release state to release the braking; and
   a controller configured or programmed to control the actuation valve and the brake, and being capable of activating a warm-up mode, wherein
   the controller is configured or programmed to, when activating the warm-up mode, shift the brake into the braking state, and control the actuation valve so as to make the hydraulic pressure to be applied to the speed shifting valve equal to or greater than a value corresponding to the second speed,
   the controller is configured or programmed to, when the warm-up mode is activated while the output speed of the traveling motor is set to the second speed:
      control the actuation valve so as to reduce the hydraulic pressure from the value corresponding to the second speed to a value corresponding to the first speed;
      shift the brake from the braking release state to the braking state; and then
      control the actuation valve so as to increase the hydraulic pressure to the value corresponding to the second speed.

2. The working machine according to claim 1, wherein the controller is configured or programmed to increase the hydraulic pressure to the value corresponding to the second speed after a predetermined period elapses since the hydraulic pressure is reduced from the value corresponding to the second speed to the value corresponding to the first speed.

3. The working machine according to claim 2, wherein the controller is configured or programmed to, when the warm-up mode is activated while the output speed of the traveling motor is set to the first speed:
   shift the brake from the braking release state to the braking state; and
   control the actuation valve so as to increase the hydraulic pressure from the value corresponding to the first speed to the value corresponding to the second speed after a predetermined period elapses since the brake is shifted from the braking release state to the braking state.

4. The working machine according to claim 2, wherein the controller is configured or programmed to, when the warm-up mode ends while the output speed of the traveling motor is set to the second speed:
control the actuation valve so as to reduce the hydraulic pressure from the value corresponding to the second speed to the value corresponding to the first speed; and then
shift the brake from the braking state to the braking release state.

5. The working machine according to claim 1, wherein the controller is configured or programmed to, when the warm-up mode is activated while the output speed of the traveling motor is set to the first speed:
shift the brake from the braking release state to the braking state; and
control the actuation valve so as to increase the hydraulic pressure from the value corresponding to the first speed to the value corresponding to the second speed after a predetermined period elapses since the brake is shifted from the braking release state to the braking state.

6. The working machine according to claim 1, further comprising:
a measurement device configured to detect a temperature of the hydraulic fluid, wherein
the controller is configured or programmed to activate the warm-up mode when the temperature of hydraulic fluid measured by the measurement device becomes a predetermined value or less.

7. The working machine according to claim 1, wherein the controller is configured or programmed to, when the warm-up mode ends while the output speed of the traveling motor is set to the second speed:
control the actuation valve so as to reduce the hydraulic pressure from the value corresponding to the second speed to the value corresponding to the first speed; and then
shift the brake from the braking state to the braking release state.

8. The working machine according to claim 1, further comprising:
a mode switch manually operable to select either enabling or disabling of the warm-up mode.

9. A working machine comprising:
a prime mover;
a traveling device;
a traveling motor configured to output power to the traveling device;
a speed shifting valve configured to shift an output speed of the traveling motor between a first speed and a second speed faster than the first speed,
an actuation valve configured to change a hydraulic pressure applied to the speed shifting valve;
a first fluid passage fluidly connected to the speed shifting valve so that hydraulic fluid having the hydraulic pressure to be applied to the speed shifting valve flows through the first fluid passage;
a drain fluid passage fluidly connected to the first fluid passage;
a brake shiftable between a braking state to brake the traveling motor and a braking release state to release the braking; and
a controller configured or programmed to control the actuation valve and the brake, and being capable of activating a warm-up mode, wherein the controller is configured or programmed to, when activating the warm-up mode, shift the brake into the braking state, and control the actuation valve so as to make the hydraulic pressure to be applied to the speed shifting valve equal to or greater than a value corresponding to the second speed, and
the controller is configured or programmed to, when the prime mover is started, if a rotation speed of the prime mover becomes a predetermined value or more while the brake is maintained in the braking state, automatically activate the warm-up mode and control the actuation valve to increase the hydraulic pressure to a value equal to or greater than the value corresponding to the second speed.

10. The working machine according to claim 9, wherein the controller is configured or programmed to, when the warm-up mode is activated while the output speed of the traveling motor is set to the second speed:
control the actuation valve so as to reduce the hydraulic pressure from the value corresponding to the second speed to a value corresponding to the first speed;
shift the brake from the braking release state to the braking state; and then control the actuation valve so as to increase the hydraulic pressure to the value corresponding to the second speed.

11. The working machine according to claim 10, wherein the controller is configured or programmed to increase the hydraulic pressure to the value corresponding to the second speed after a predetermined period elapses since the hydraulic pressure is reduced from the value corresponding to the second speed to the value corresponding to the first speed.

12. The working machine according to claim 11, wherein the controller is configured or programmed to, when the warm-up mode is activated while the output speed of the traveling motor is set to the first speed:
shift the brake from the braking release state to the braking state; and
control the actuation valve so as to increase the hydraulic pressure from the value corresponding to the first speed to the value corresponding to the second speed after a predetermined period elapses since the brake is shifted from the braking release state to the braking state.

13. The working machine according to claim 11, wherein the controller is configured or programmed to, when the warm-up mode ends while the output speed of the traveling motor is set to the second speed:
control the actuation valve so as to reduce the hydraulic pressure from the value corresponding to the second speed to the value corresponding to the first speed; and then
shift the brake from the braking state to the braking release state.

14. The working machine according to claim 10, wherein the controller is configured or programmed to, when the warm-up mode is activated while the output speed of the traveling motor is set to the first speed:
shift the brake from the braking release state to the braking state; and
control the actuation valve so as to increase the hydraulic pressure from the value corresponding to the first speed to the value corresponding to the second speed after a predetermined period elapses since the brake is shifted from the braking release state to the braking state.

15. The working machine according to claim 10, wherein the controller is configured or programmed to, when the warm-up mode ends while the output speed of the traveling motor is set to the second speed:
- control the actuation valve so as to reduce the hydraulic pressure from the value corresponding to the second speed to the value corresponding to the first speed; and then
- shift the brake from the braking state to the braking release state.

16. The working machine according to claim 9, wherein the controller is configured or programmed to, when the warm-up mode is activated while the output speed of the traveling motor is set to the first speed:
- shift the brake from the braking release state to the braking state; and
- control the actuation valve so as to increase the hydraulic pressure from the value corresponding to the first speed to the value corresponding to the second speed after a predetermined period elapses since the brake is shifted from the braking release state to the braking state.

17. The working machine according to claim 9, wherein the controller is configured or programmed to, when the warm-up mode ends while the output speed of the traveling motor is set to the second speed:
- control the actuation valve so as to reduce the hydraulic pressure from the value corresponding to the second speed to a value corresponding to the first speed; and then
- shift the brake from the braking state to the braking release state.

\* \* \* \* \*